US012592405B2

(12) United States Patent
Lee et al.

(10) Patent No.: US 12,592,405 B2
(45) Date of Patent: Mar. 31, 2026

(54) CONNECTIONS FOR REDOX BATTERY INTEGRATION

(71) Applicant: Standard Energy Inc., Daejeon (KR)

(72) Inventors: Dongyoung Lee, Seoul (KR); Bugi Kim, Sejong (KR); Kihyun Kim, Daejeon (KR)

(73) Assignee: Standard Energy Inc., Daejeon (KR)

( * ) Notice: Subject to any disclaimer, the term of this patent is extended or adjusted under 35 U.S.C. 154(b) by 676 days.

(21) Appl. No.: 17/819,744

(22) Filed: Aug. 15, 2022

(65) Prior Publication Data

US 2023/0057780 A1     Feb. 23, 2023

Related U.S. Application Data

(60) Provisional application No. 63/261,074, filed on Sep. 10, 2021, provisional application No. 63/260,328, filed on Aug. 17, 2021.

(30) Foreign Application Priority Data

Apr. 11, 2022     (KR) ........................ 10-2022-0044730

(51) Int. Cl.
*H01M 8/18*          (2006.01)
*H01M 8/0247*          (2016.01)
(Continued)

(52) U.S. Cl.
CPC ......... *H01M 8/188* (2013.01); *H01M 8/0247* (2013.01); *H01M 8/04246* (2013.01); *H01M 8/248* (2013.01); *H01M 2200/00* (2013.01)

(58) Field of Classification Search
CPC ......... H01M 8/18–188; H01M 8/0247; H01M 8/004246; H01M 8/248
See application file for complete search history.

(56) References Cited

U.S. PATENT DOCUMENTS 7,238,441 B2     7/2007  Andreas-Schott et al.
9,905,830 B2     2/2018  Kim et al.
(Continued)

FOREIGN PATENT DOCUMENTS

EP           3 696 878 A1     8/2020
KR     10-2014-0023908 A     2/2014
KR           101519499 B1 *  5/2015     .............. H01M 8/18

OTHER PUBLICATIONS

KR101519499B1. May 12, 2015. English machine translation by EPO. (Year: 2015).*

(Continued)

*Primary Examiner* — James Lee

(74) *Attorney, Agent, or Firm* — Knobbe, Martens, Olson & Bear, LLP

(57)          ABSTRACT

A redox battery comprises a plurality of redox battery cells stacked in a stacking direction, wherein each of the redox battery cells comprises a first half cell connected to a positive current collector, a second half cell connected to a negative current collector and an ion exchange membrane separating the first and second half cells. The redox battery additionally comprises a positive conducting bus bar extending in the stacking direction and electrically connecting the positive current collectors of the redox battery cells in parallel, and a negative conducting bus bar extending in the stacking direction and electrically connecting the negative current collectors of the redox battery cells in parallel. One or both of the positive and negative bus bars are configured as fastening means for mechanically fastening the stacked redox battery cells in the stacking direction.

15 Claims, 48 Drawing Sheets

(51) Int. Cl.
  H01M 8/04223     (2016.01)
  H01M 8/248      (2016.01)

(56)           References Cited

U.S. PATENT DOCUMENTS

| | | | |
|---|---|---|---|
| 9,997,758 | B2 | 6/2018 | Kim et al. |
| 10,461,382 | B2 | 10/2019 | Benz et al. |
| 10,797,282 | B2 | 10/2020 | Liu |
| 2011/0200867 | A1 | 8/2011 | Culver et al. |
| 2012/0052347 | A1* | 3/2012 | Wilson ................. H01M 12/08 |
| | | | 429/72 |
| 2013/0177789 | A1* | 7/2013 | Kampanatsanyakorn ................... |
| | | | H01M 8/20 |
| | | | 429/70 |
| 2015/0099213 | A1 | 4/2015 | Martinchek et al. |
| 2020/0259154 | A1 | 8/2020 | Jan et al. |
| 2021/0036389 | A1 | 2/2021 | Wang et al. |

OTHER PUBLICATIONS

Office Action dated Jan. 23, 2025 in Korean Application No. 10-2022-0102304, 16 pages.

Arribas et al., "Vanadium Redox Flow Battery Storage System Linked to the Electric Grid", RE&PQJ, vol. 1, No. 14, pp. 1025-1030, May 2016.

Fuelcell Store, "How to Build a Fuel Cell", pp. 1-11, Apr. 10, 2018, https://www.fuelcellstore.com/blog-section/how-to-build-a-fuel-cell.

Lee et al., "Joining Technologies for Automotive Lithium-Ion Battery Manufacturing—A Review", Proceedings of the ASME 2010 International Manufacturing Science and Engineering Conference, MSEC2010, pp. 1-9, Oct. 12-15, 2010.

Sterz et al., "Nickel-Hydrogen (NiH$_2$), Single Pressure Vessel (SPV), Battery Development Update", pp. 729-732, 1997 NASA Aerospace Battery Workshop.

Tian Tuo Machinery, "SGL successfully developed and tested large-size SIGRACELL® composite bipolar plates", pp. 1-4, Jul. 20, 2018, http://www.chinacompositesexpo.com/cn/news-detail-244-6753.html.

* cited by examiner

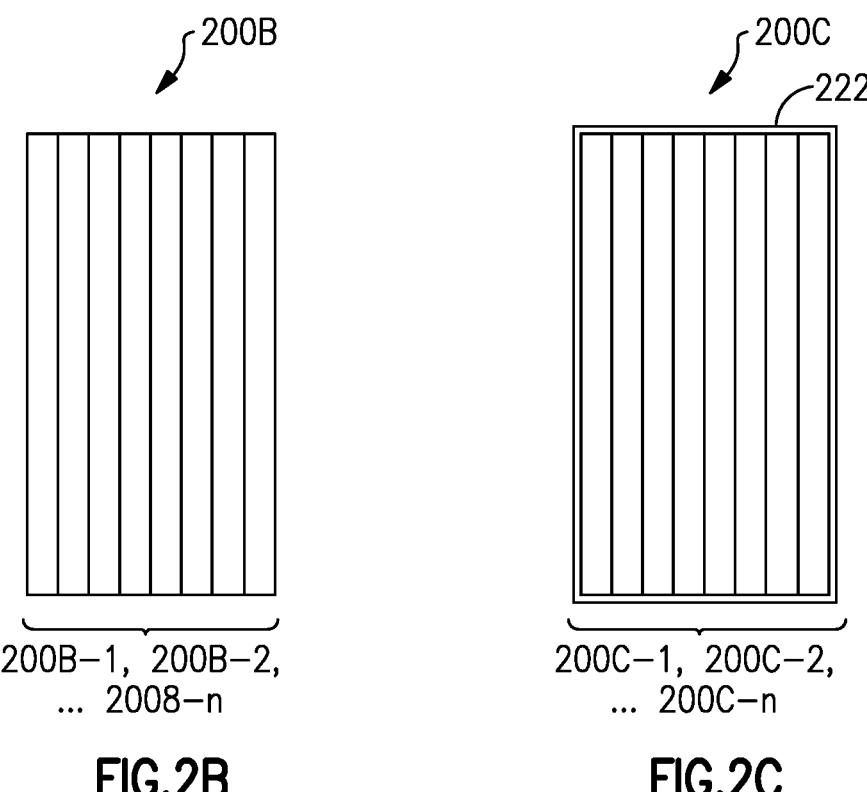
200B
200B-1, 200B-2, ... 2008-n
FIG.2B
200C
222
200C-1, 200C-2, ... 200C-n
FIG.2C
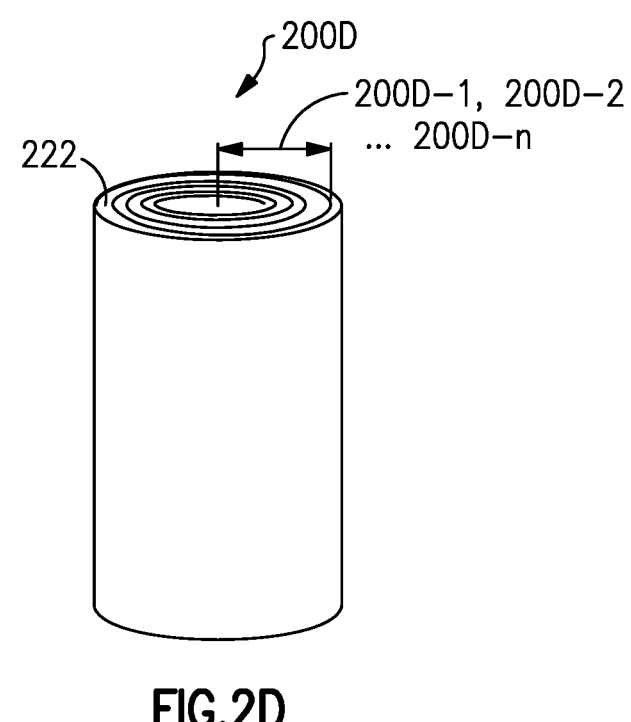
200D
200D-1, 200D-2 ... 200D-n
222
FIG.2D

500I 510L-1

510L-2

510L-ℓ

572A

576A

572B

576B

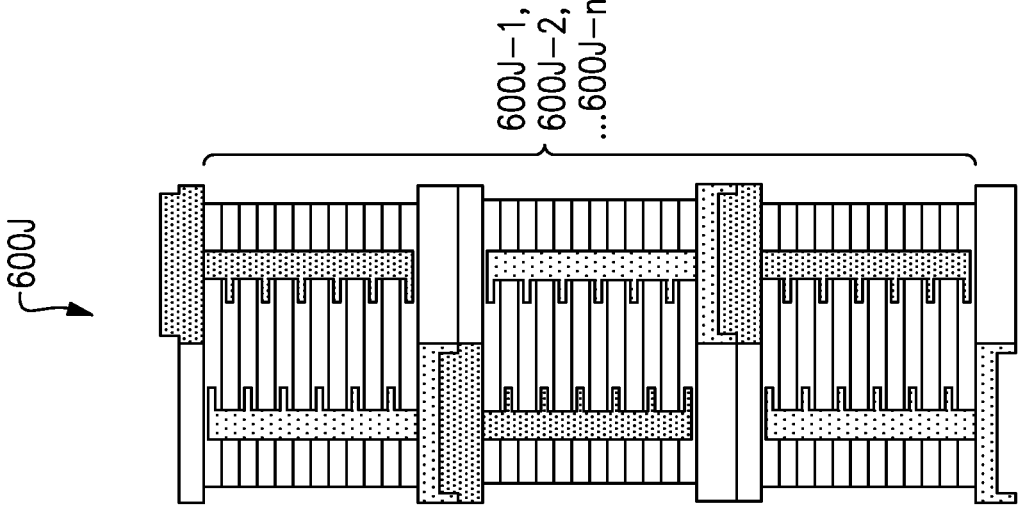
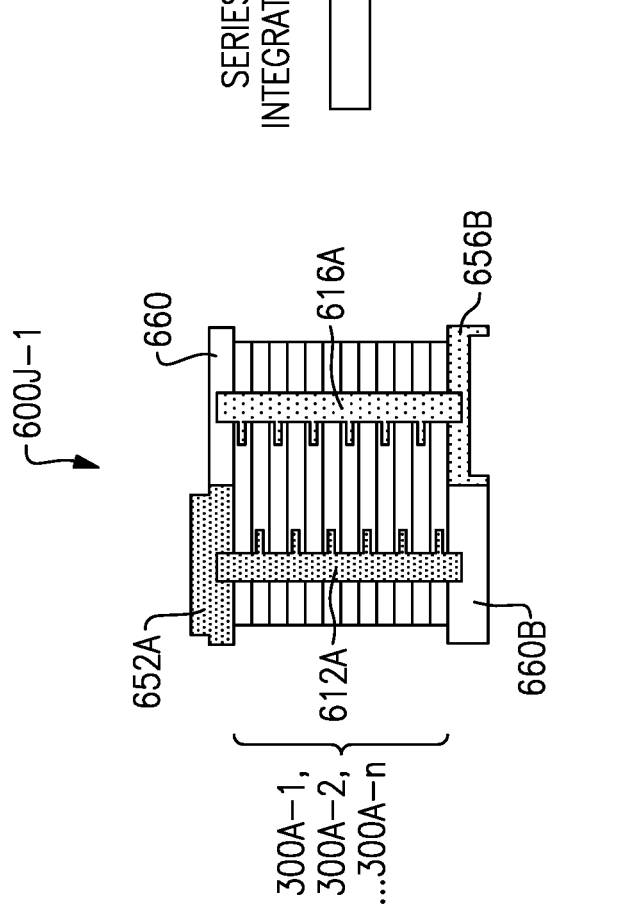
FIG.6J

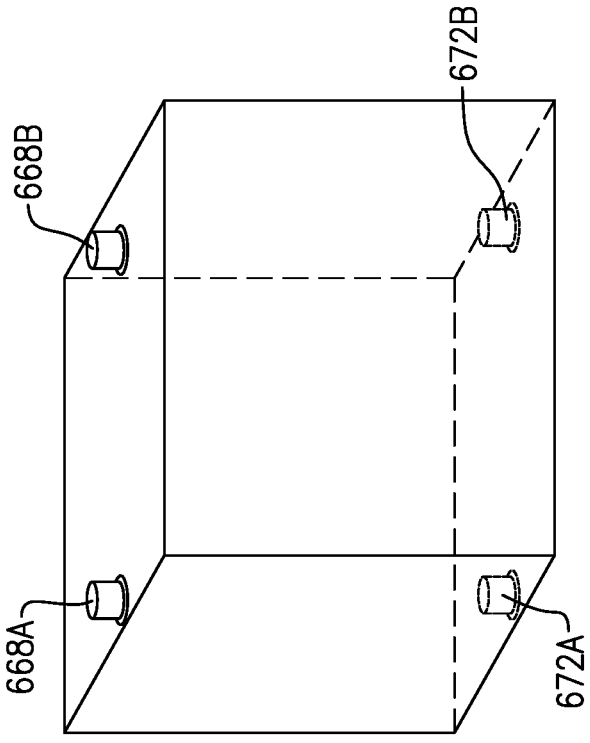
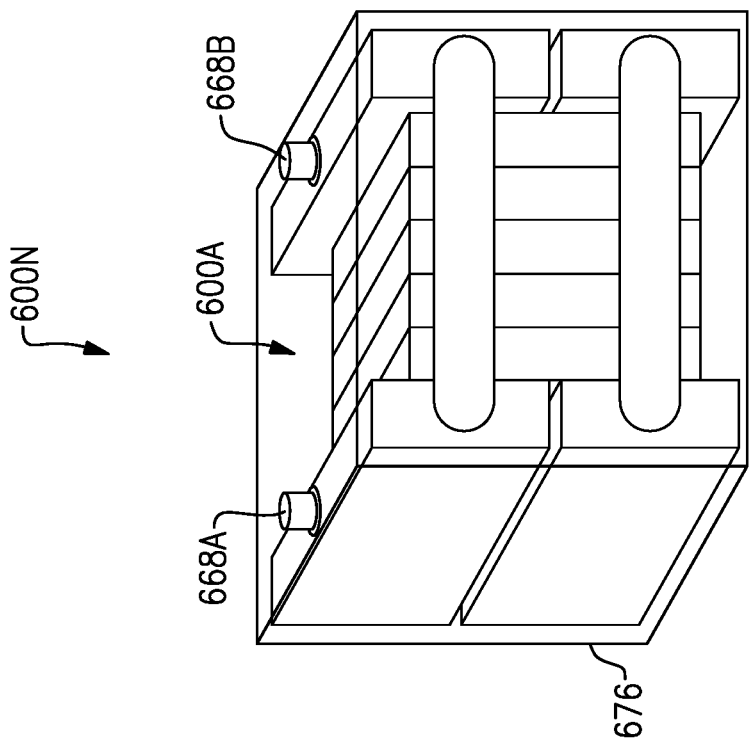
FIG.6N

BUS BAR (−)

BUS BAR (+)

<FRONT VIEW>

BUS BAR (−)

BUS BAR (+)

<SIDE VIEW>

<FRONT VIEW>

<SIDE VIEW>

400

150

110

MODULE 2
(200)

MODULE 1
(100)

120

<FRONT VIEW>

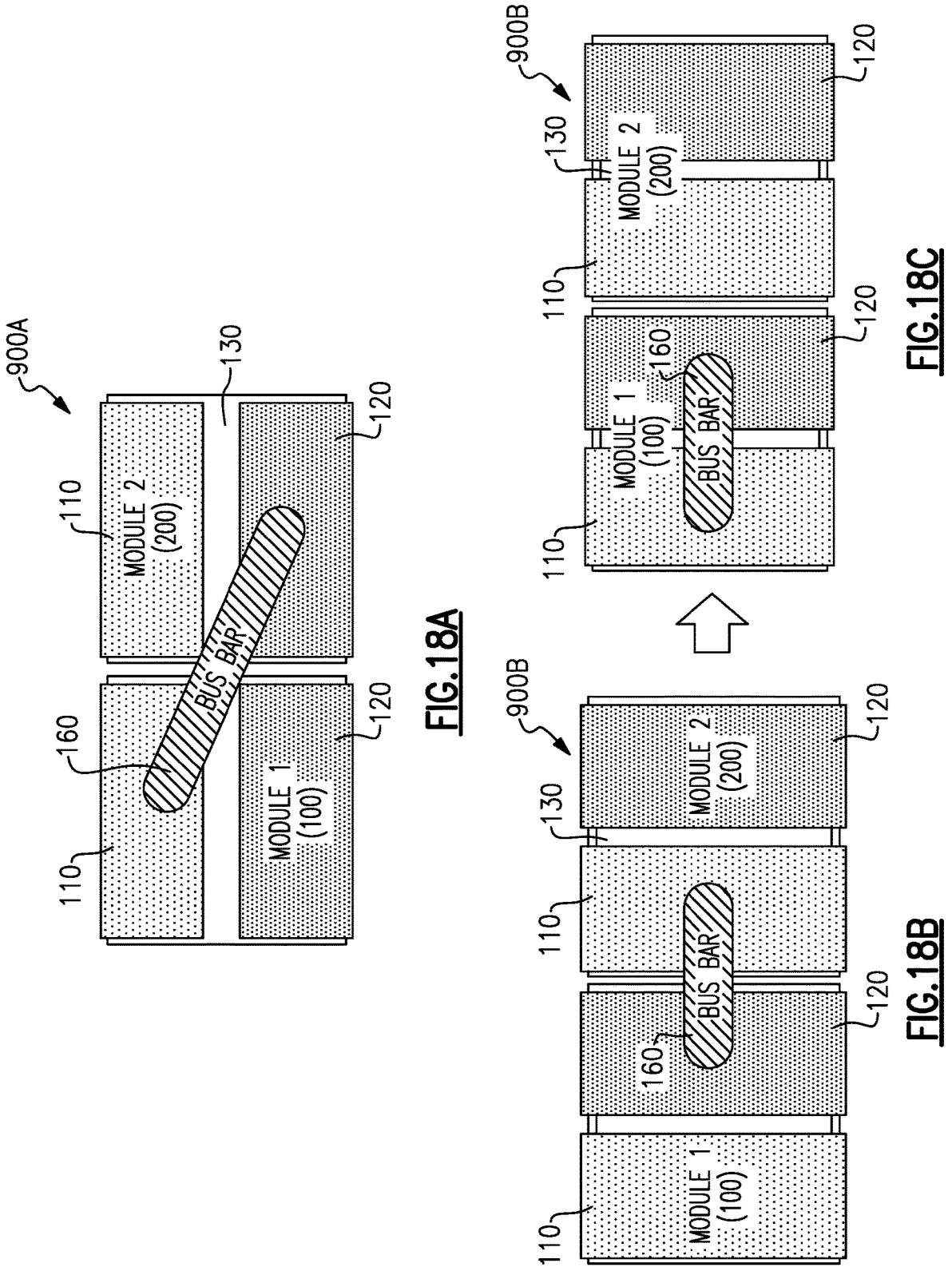

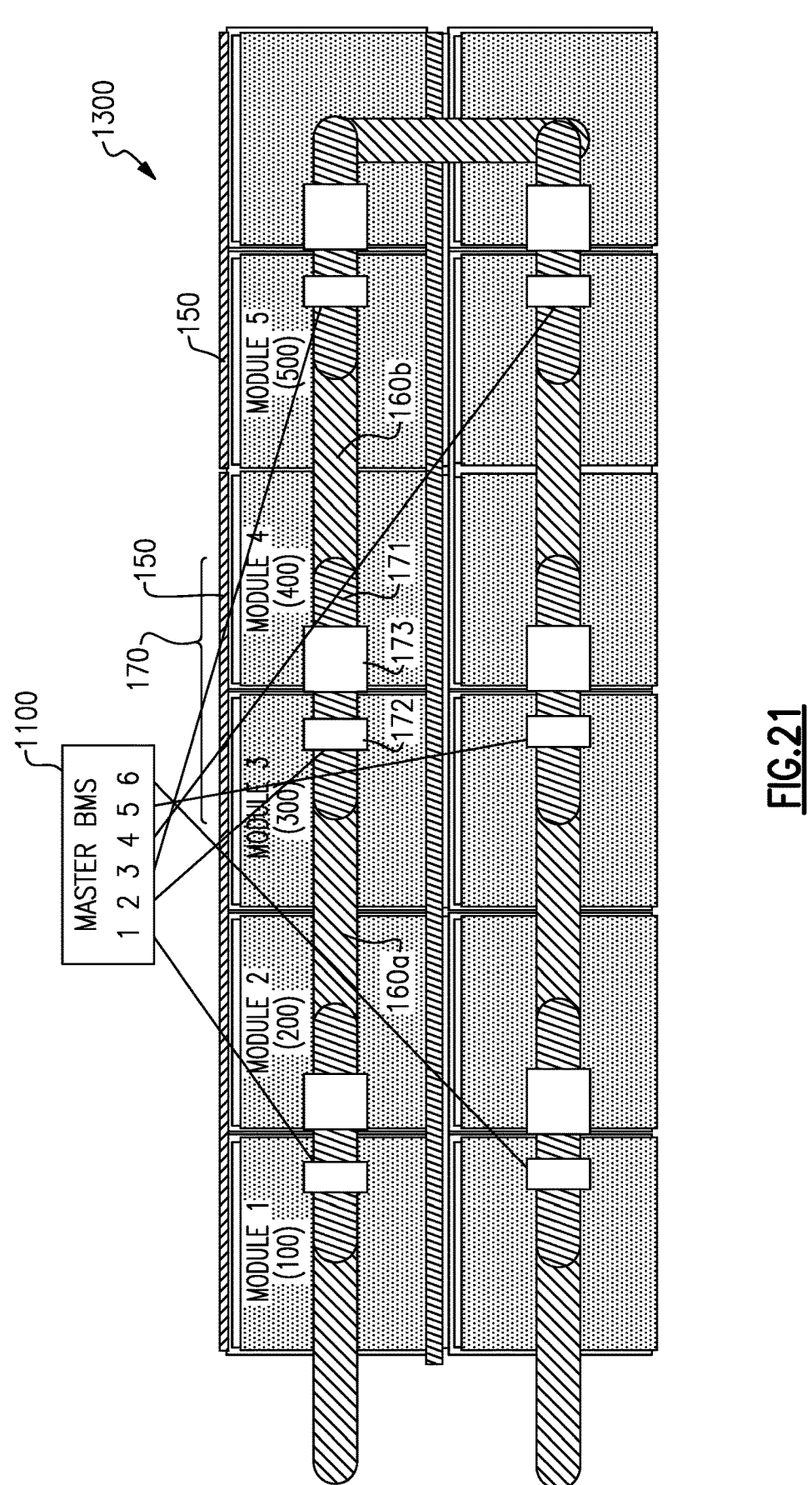
_FIG.21_

CONNECTIONS FOR REDOX BATTERY INTEGRATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the priority benefit under 35 U.S.C. § 119(e) to U.S. Provisional Patent Application No. 63/260,328, filed Aug. 17, 2021, entitled "CONNECTIONS FOR REDOX BATTERY INTEGRATION," and U.S. Provisional Patent Application No. 63/261,074, filed Sep. 10, 2021, entitled "CONNECTIONS FOR REDOX BATTERY INTEGRATION." This application claims foreign priority to Korean Provisional Patent Application No. 10-2022-0044730, filed Apr. 11, 2022, entitled "BATTERY MODULE AND ENERGY STORAGE SYSTEM COMPRISING THEREOF." The content of each of the above applications is hereby expressly incorporated by reference in its entirety.

BACKGROUND

Field

The disclosed technology generally relates to energy storage devices, and more particularly to redox batteries and connections for redox batteries.

Description of the Related Art

The global economic growth accompanied by global warming continues increase the urgency of a need for renewable and sustainable energy systems based on renewable energy, e.g., solar and wind energy. To enhance the stability of grid networks against fluctuations due to intermittent availability such forms of energy, advances in energy storage systems (ESS) are used for storing surplus electricity, which can be delivered to end customers or to power grids when needed. Among others, ESS based on electrochemical energy, e.g., rechargeable or secondary batteries, can provide cost effective and clean forms of energy storage solutions. Examples of electrochemical energy storage systems include lithium-ion, lead-acid, sodium-sulfur and redox-flow batteries. Different storage times are needed for different applications: short-term storage, medium-term storage and long-term storage. The different types of electrochemical energy storage systems have different physical and/or chemical properties. Factors that determine the suitability for a particular application of the electrochemical energy storage systems include investment cost, power, energy, lifetime, recyclability, efficiency, scalability and maintenance cost, to name a few. Competing factors are weighed in the selection and design of a suitable electrochemical storage system.

SUMMARY

In one aspect, a redox battery comprises a plurality of redox battery cells stacked in a stacking direction, wherein each of the redox battery cells comprises a first half cell connected to a positive current collector, a second half cell connected to a negative current collector and an ion exchange membrane separating the first and second half cells. The redox battery additionally comprises a positive conducting bus bar extending in the stacking direction and electrically connecting the positive current collectors of the redox battery cells in parallel, and a negative conducting bus bar extending in the stacking direction and electrically connecting the negative current collectors of the redox battery cells in parallel. One or both of the positive and negative bus bars are configured as fastening means for mechanically fastening the stacked redox battery cells in the stacking direction.

In another aspect, a redox battery comprises a plurality of redox battery cells stacked in a stacking direction, wherein each of the redox battery cells comprises a first half cell connected to a positive current collector, a second half cell connected to a negative current collector and an ion exchange membrane separating the first and second half cells. The redox battery additionally comprises a positive conducting bus bar extending in the stacking direction and electrically connecting the positive current collectors of the redox battery cells in parallel, and a negative conducting bus bar extending in the stacking direction and electrically connecting the negative current collectors of the redox battery cells in parallel. The redox battery further comprises a positive end plate and a negative end plate disposed at opposing ends of the stacked redox battery cells, wherein the positive end plate is connected to the positive conducting bus bar, and wherein the negative end plate is connected to the negative conducting bus bar.

In yet another aspect, a redox battery comprises a plurality of redox battery cells stacked in a stacking direction, wherein each of the redox battery cells comprises a first half cell connected to a positive current collector, a second half cell connected to a negative current collector and an ion exchange membrane separating the first and second half cells. The redox battery additionally comprises a positive conducting bus bar extending in the stacking direction and electrically connecting the positive current collectors of the redox battery cells in parallel, and a negative conducting bus bar extending in the stacking direction and electrically connecting the negative current collectors of the redox battery cells in parallel. The redox battery further comprises a positive end plate and a negative end plate disposed at opposing ends of the stacked redox battery cells, wherein the positive and negative end plates are connected to the positive conducting bus bar. The redox battery further comprises a third end plate and a fourth end plate disposed at opposing ends of the stacked redox battery cells, wherein the third and fourth end plates are connected to the negative conducting bus bar.

In yet another aspect, a redox battery system comprises a plurality of redox batteries, wherein each of the redox batteries is in accordance with any of the above Embodiments. Each of the redox batteries comprises a pair of conductive positive end plates disposed at opposing ends of the redox battery cells stacked in a cell stacking direction and electrically connected to the positive conducting bus bar, and a pair of conductive negative end plates disposed at opposing ends of the redox battery cells stacked in the cell stacking direction and electrically connected to the negative conducting bus bar. One or more subsets of the redox batteries are stacked in at least one other direction orthogonal to the cell stacking direction and electrically connected to each other.

In yet another aspect, a redox battery system comprises a plurality of redox batteries, wherein each of the redox batteries is in accordance with any of the above Embodiments and comprises one or more conductive positive end plates and one or more conductive negative end plates. A conductive shorting structure is configured to form an electrical short between structures connected by a first end and a second end thereof, wherein the first end is configured to be removably fixed and electrically connected to one of the conductive positive end plates or the conductive negative end plates of the plurality of redox batteries, and wherein the second end is configured to be removably fixed and electrically connected to another one of the conductive positive end plates or the conductive negative end plates of the plurality of redox batteries.

In yet another aspect, a redox battery comprises a plurality of redox battery cells stacked in a stacking direction, wherein each of the redox battery cells comprises a first half cell connected to a positive current collector, a second half cell connected to a negative current collector and an ion exchange membrane separating the first and second half cells. The redox battery additionally comprises a positive conducting bus bar extending in the stacking direction and electrically connecting the positive current collectors of the redox battery cells in parallel and a negative conducting bus bar extending in the stacking direction and electrically connecting the negative current collectors of the redox battery cells in parallel. An end portion of the positive conducting bus bar is bent and disposed at an end of the stack of redox battery cells, and an end portion of the negative conducting bus bar is bent and disposed at the end or another end of the stack of redox battery cells.

BRIEF DESCRIPTION OF THE DRAWINGS

FIG. 2B is a schematic illustration of sealed redox battery comprising a plurality of sealed redox battery cells in a stacked configuration, according to some embodiments.

FIG. 2C is a schematic illustration of sealed redox battery comprising a plurality of sealed redox battery cells in a stacked configuration, according to some other embodiments.

FIG. 2D is a schematic illustration of sealed redox battery comprising a plurality of sealed redox battery cells in a cylindrically stacked configuration, according to embodiments.

FIGS. 6J-6M schematically illustrate a plurality of redox batteries each comprising a stack of redox battery cells between conductive end plates, wherein the redox batteries themselves are stacked and electrically connected through conductive end plates, according to embodiments.

FIG. 6N illustrates a final redox battery including a pair of external electrodes, as a user may receive, according to embodiments.

Figure 7A:
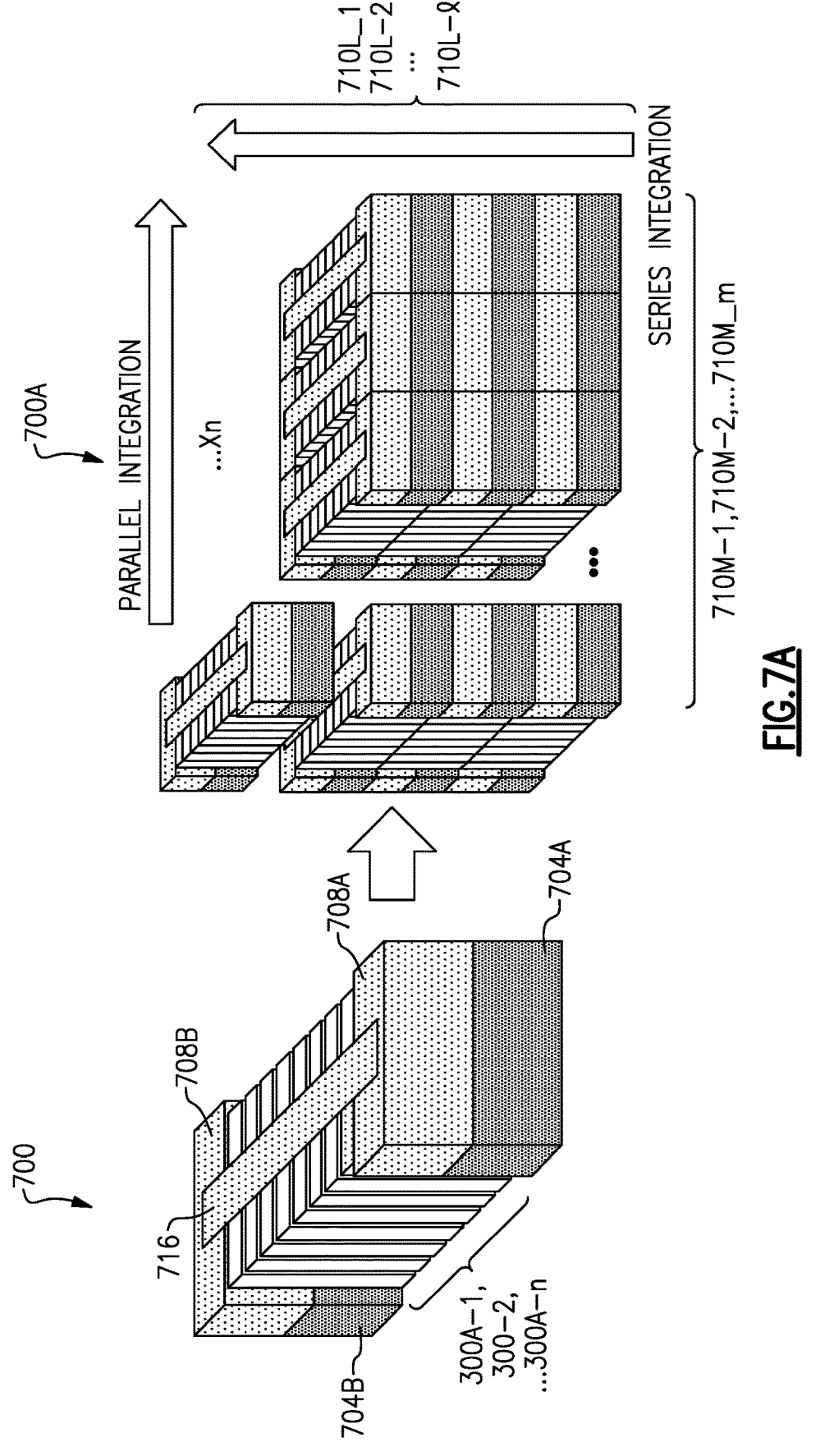

FIG. 7A schematically illustrates a plurality of redox batteries each comprising a stack of redox battery cells between conductive end plates, wherein the redox batteries themselves are stacked and electrically connected through conductive end plates, according to some embodiments.

Figure 7B:
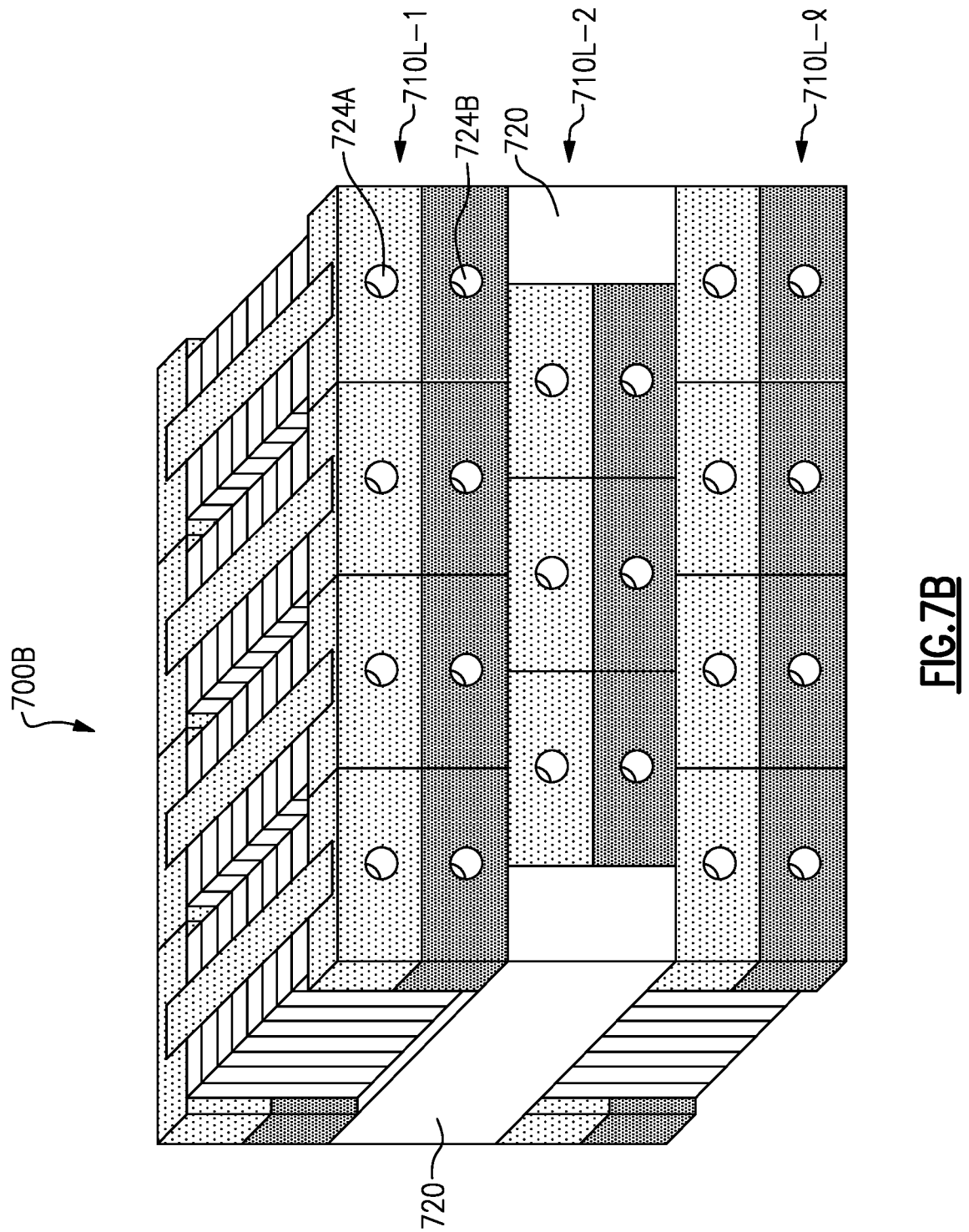

FIG. 7B schematically illustrates a plurality of redox batteries each comprising a stack of redox battery cells between conductive end plates, wherein the redox batteries themselves are stacked and electrically connected through conductive end plates, according to some other embodiments.

Figure 7C:
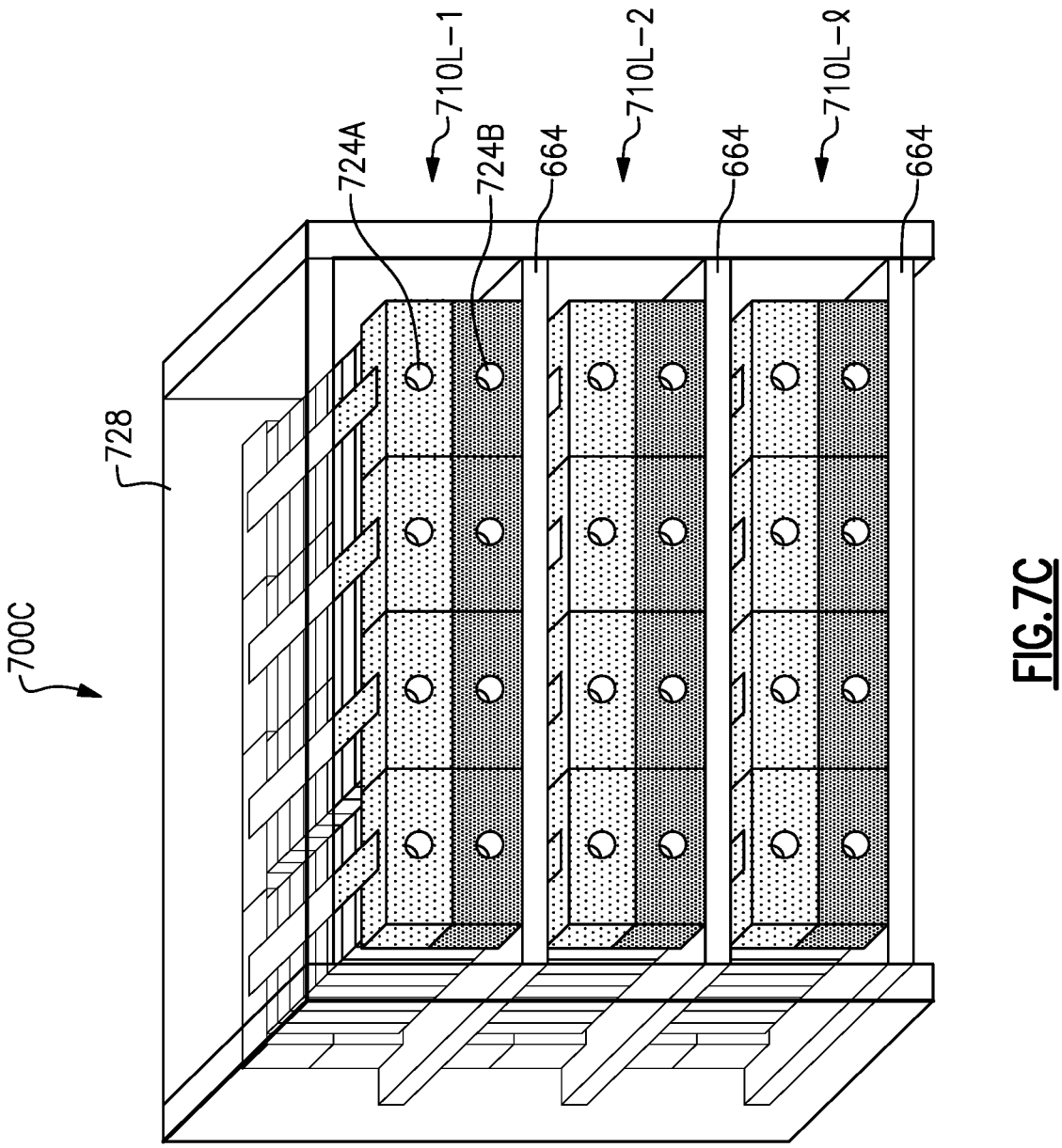

FIG. 7C schematically illustrates a plurality of redox batteries each comprising a stack of redox battery cells between conductive end plates, wherein the redox batteries themselves are stacked and electrically connected through conductive end plates, according to some other embodiments.

Figure 7D:
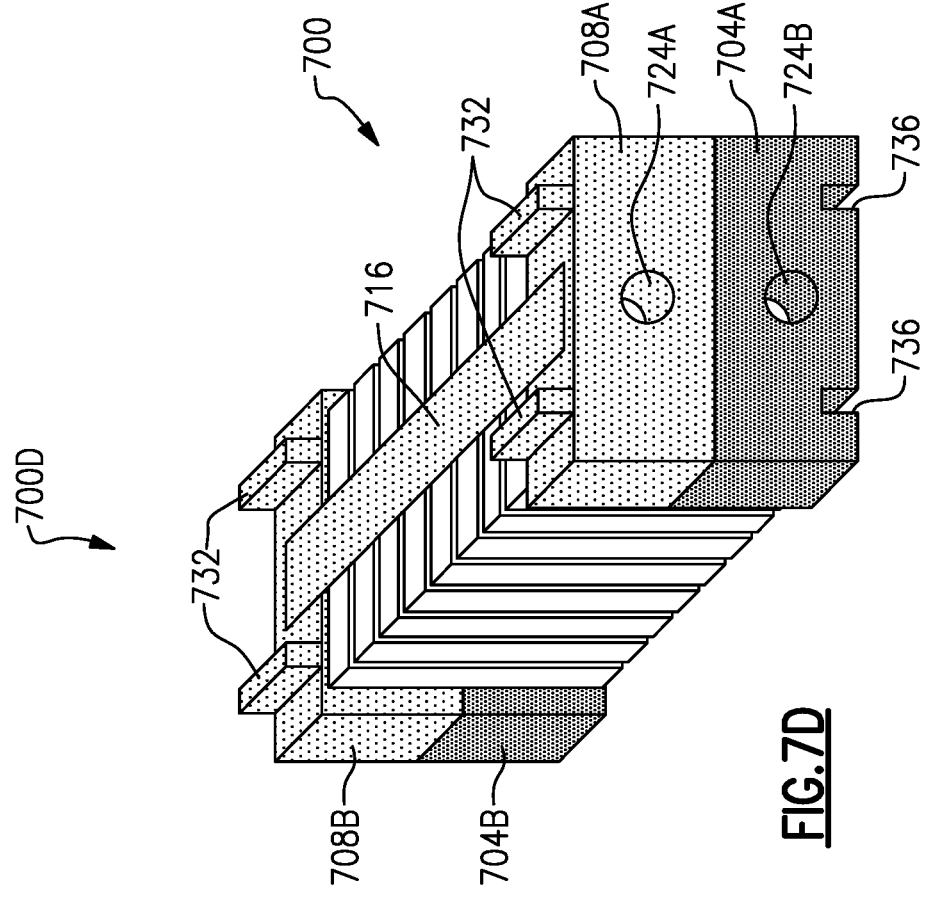
Figure 7E:
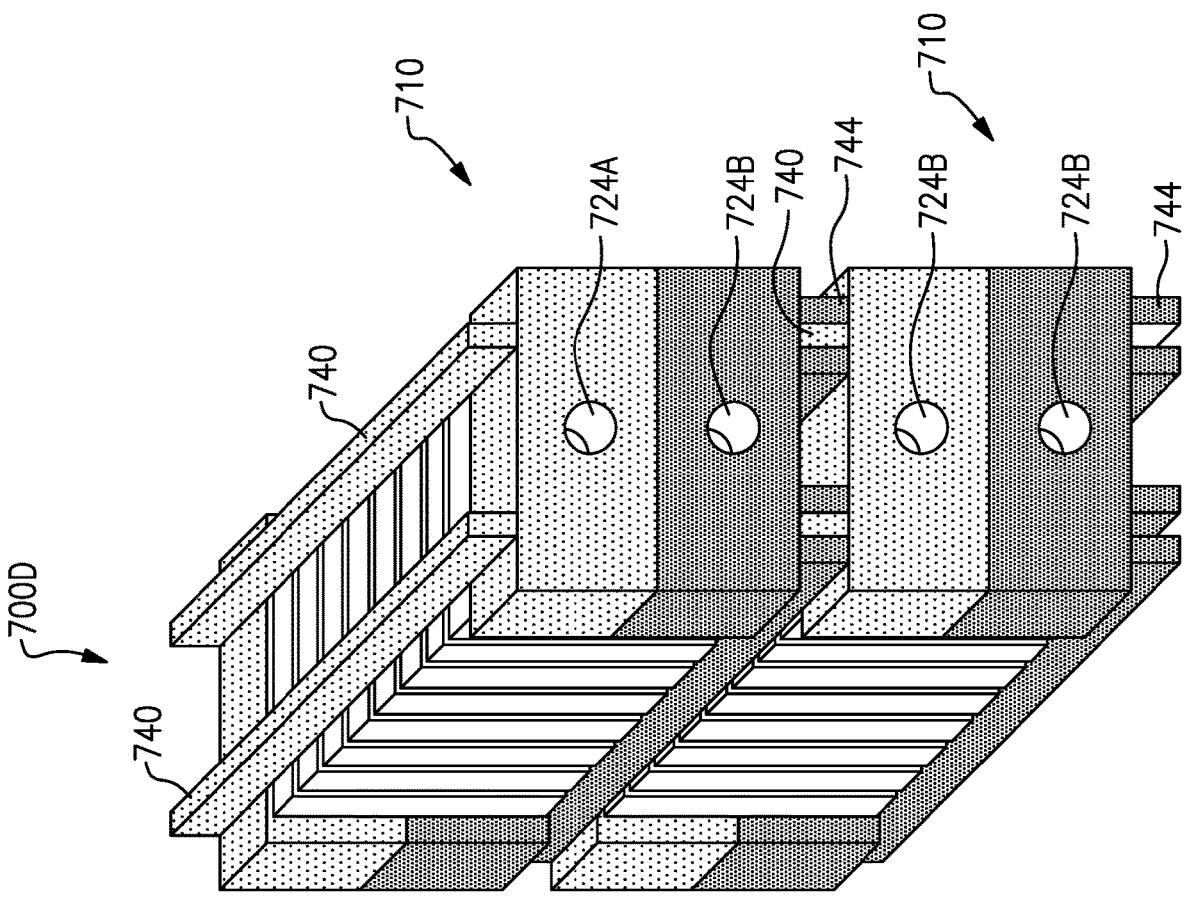

FIGS. 7D and 7E schematically illustrate example coupling mechanisms for preventing coupled redox batteries from sliding relative to one another, according to some other embodiments.

Figure 8A:
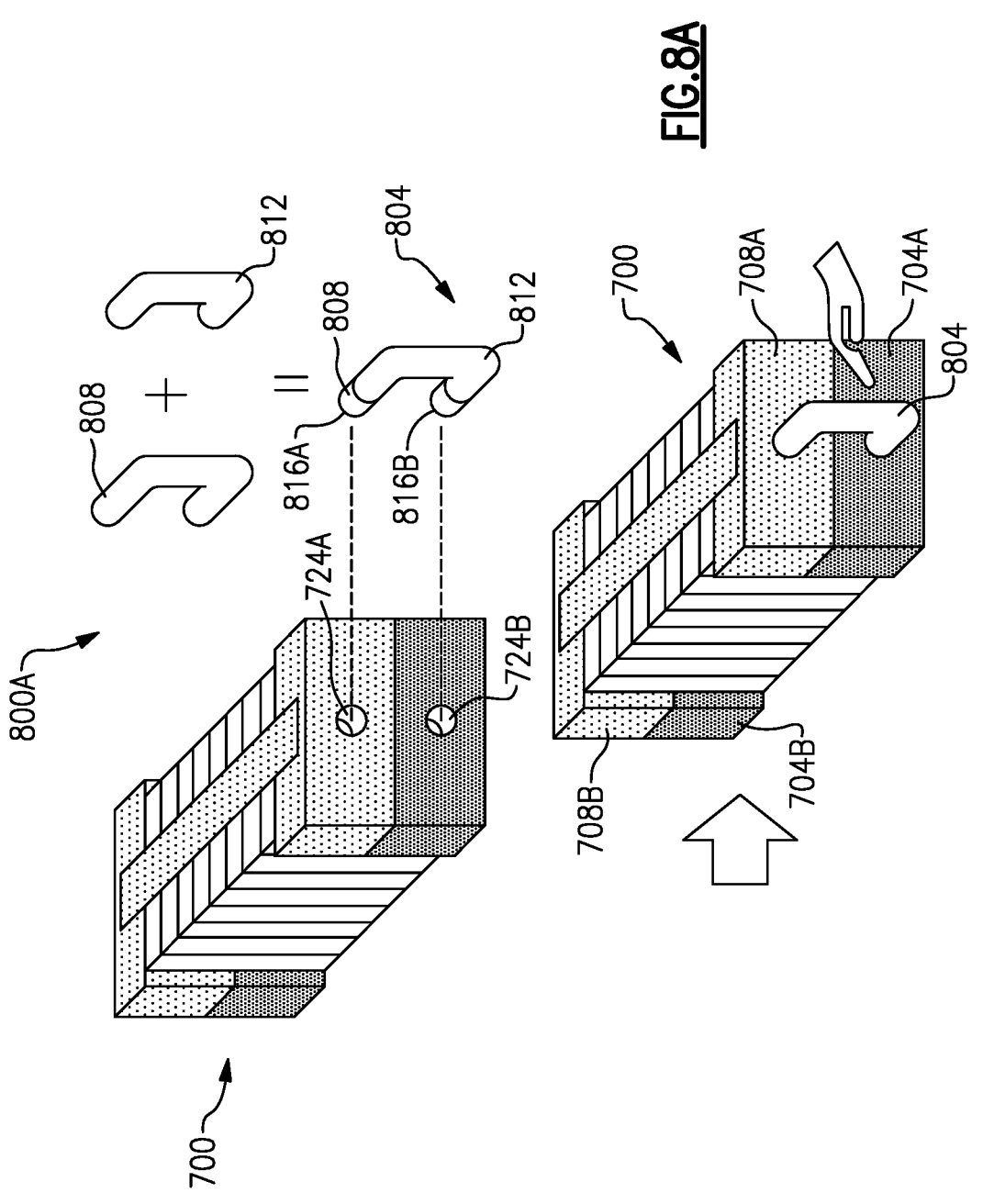

FIG. 8A schematically illustrates a redox battery having conductive end plates of opposite polarities that are configured to be electrically shorted using a conductive shorting structure.

Figures 8B, 8C:
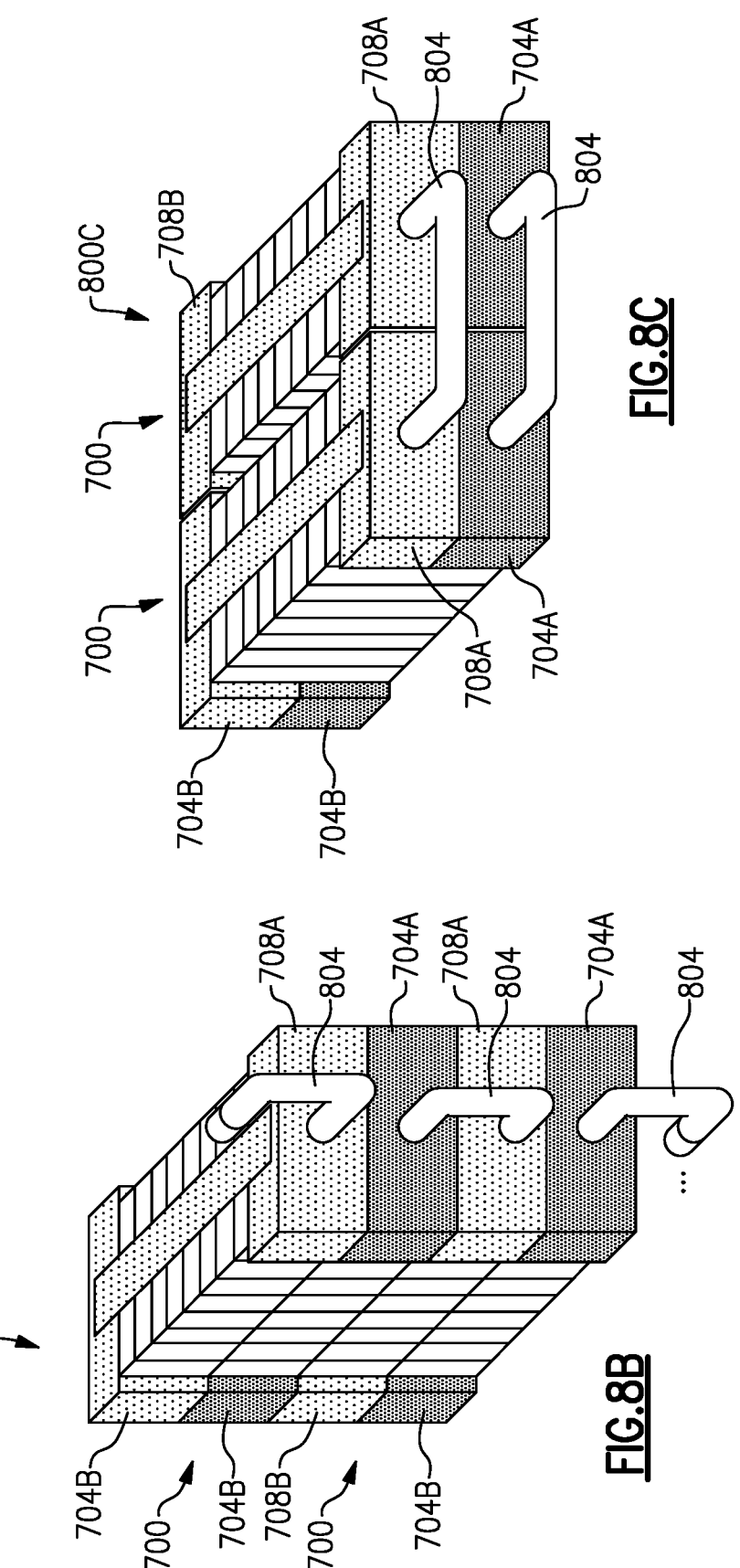

FIG. 8B schematically illustrates vertically stacked redox batteries having conductive end plates of opposite polarities that are configured to be electrically shorted using a conductive shorting structure.

FIG. 8C schematically illustrates horizontally stacked redox batteries having conductive end plates of the same polarity that are configured to be electrically shorted using a conductive shorting structure.

Figure 8D:
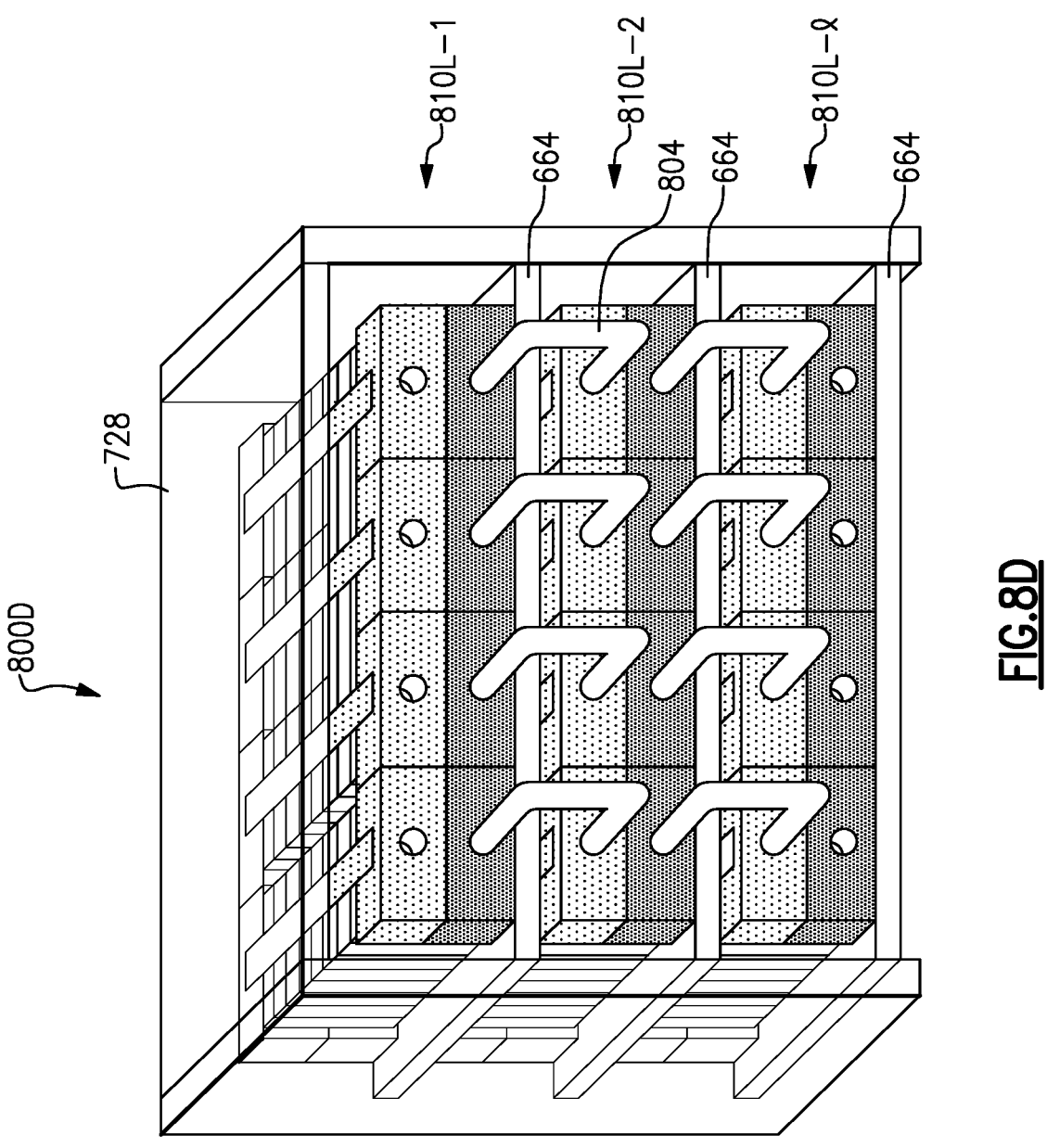

FIG. 8D schematically illustrates a plurality of redox batteries each comprising a stack of redox battery cells between conductive end plates, wherein the redox batteries themselves are stacked and electrically connected through conductive end plates, according to some other embodiments.

Figure 9B:
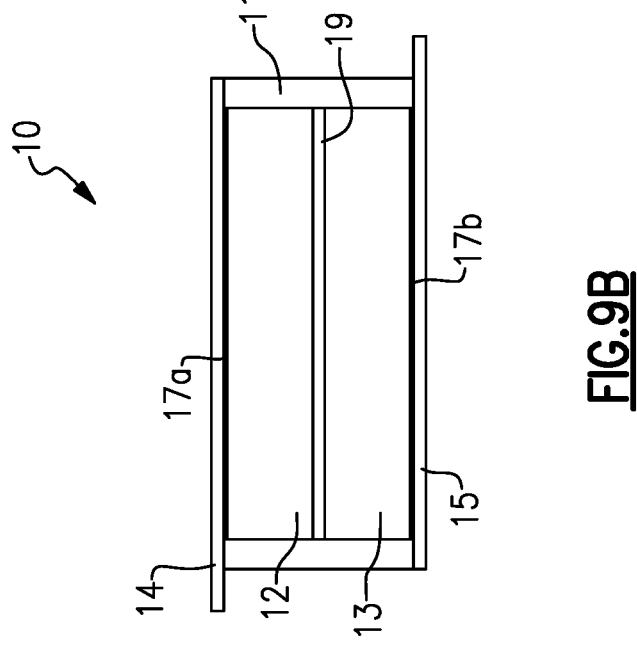
Figure 9A:
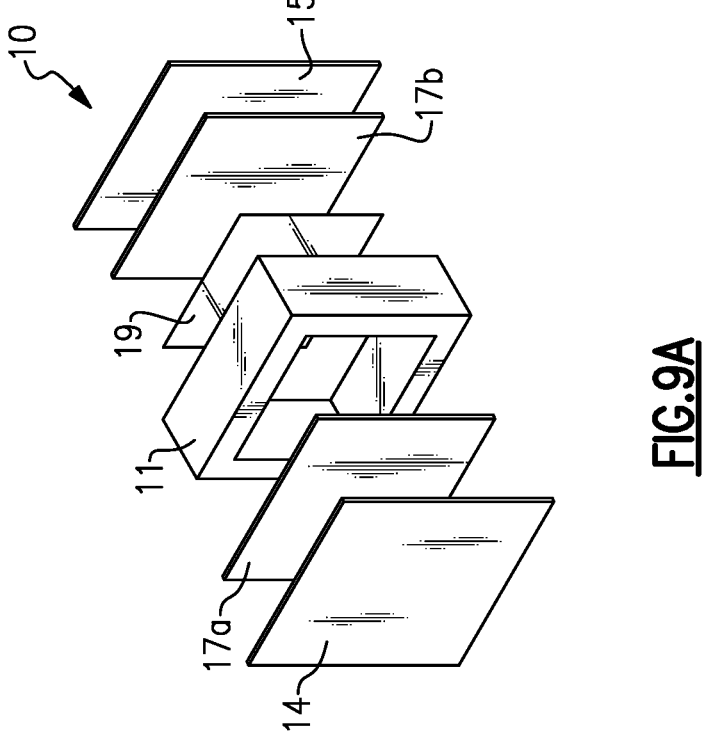

FIGS. 9A and 9B illustrate a disassembled perspective view and a side view of a redox battery cell 10, respectively, according to some embodiments.

Figure 10B:
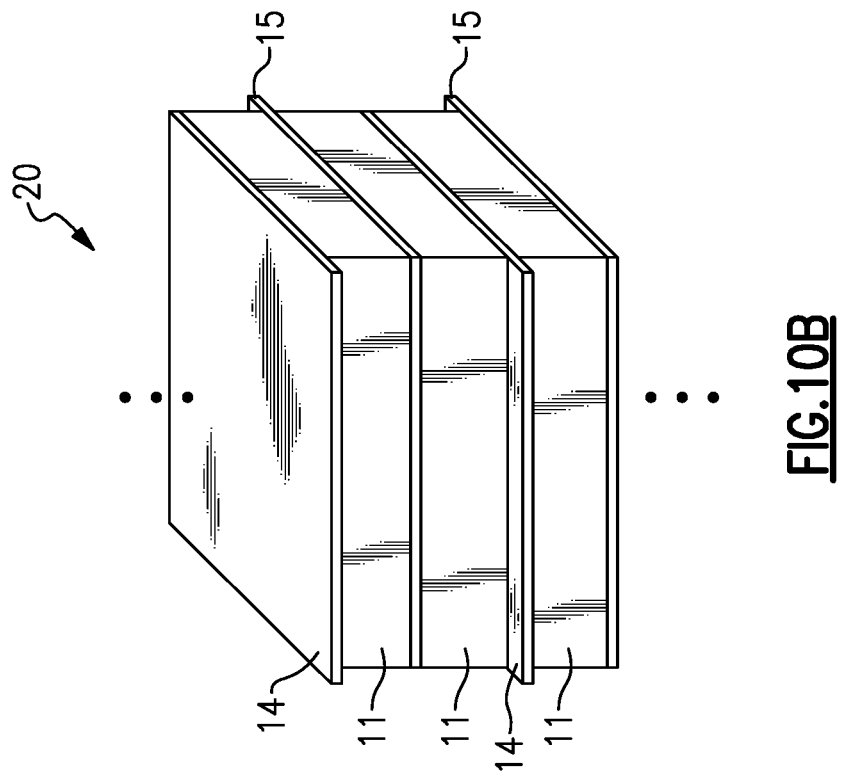
Figure 10A:
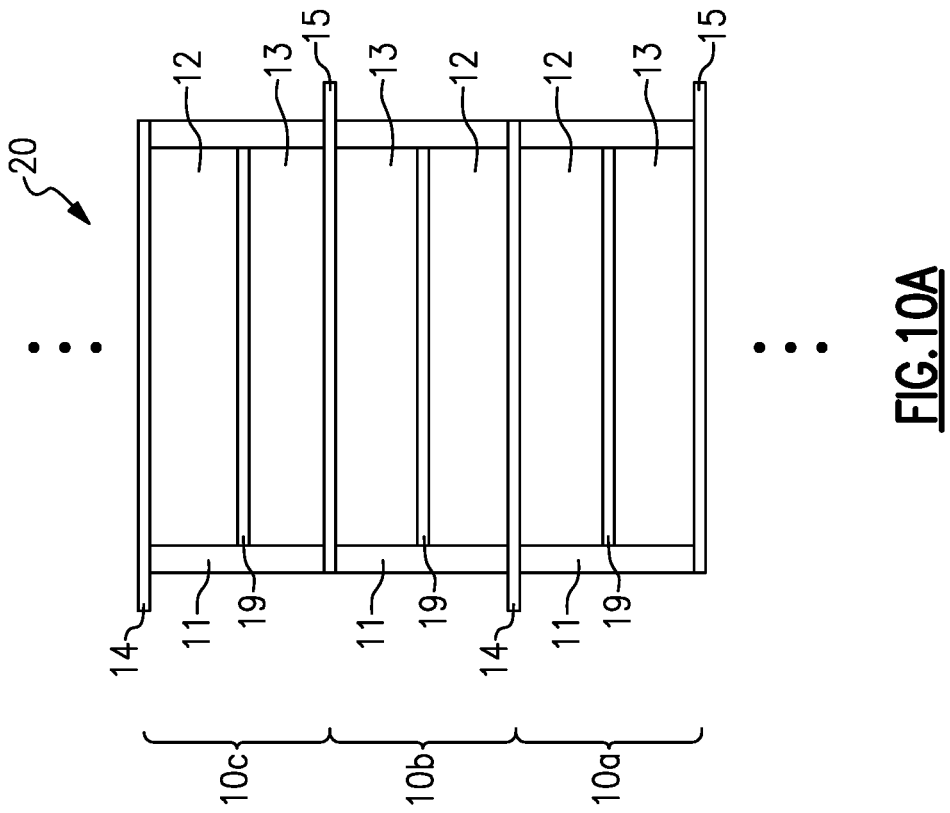

FIGS. 10A and 10B illustrate a side view and a perspective view of a redox battery comprising a plurality of stacked redox battery cells, according to some embodiments.

Figure 11B:
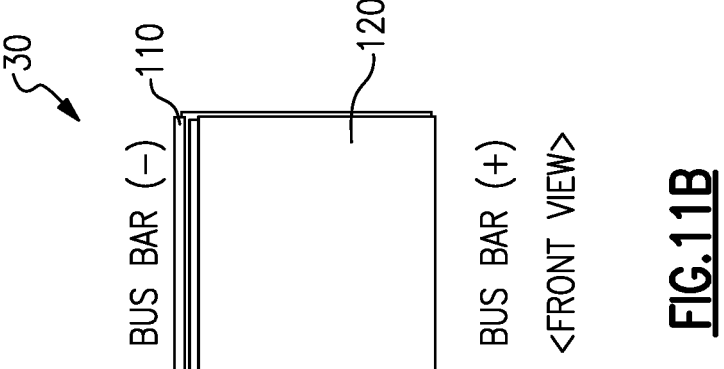
Figure 11A:
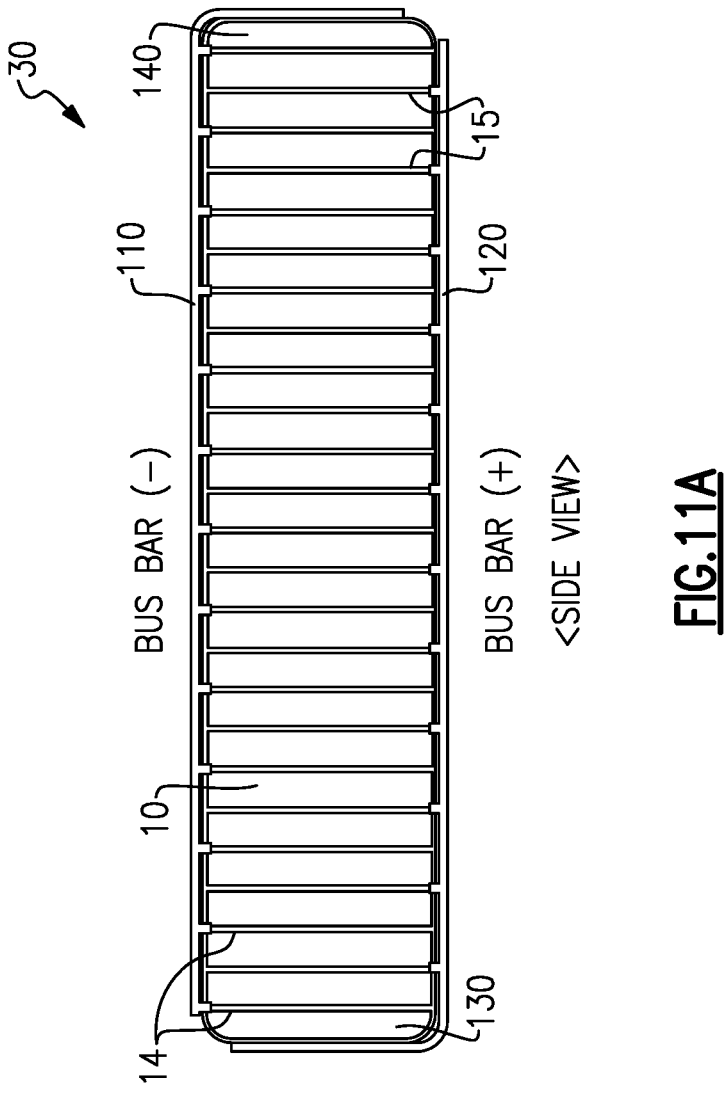

FIGS. 11A and 11B illustrate a side view and a top view of a redox battery comprising a plurality of stacked redox battery cells, according to some embodiments.

Figures 12A, 12B:
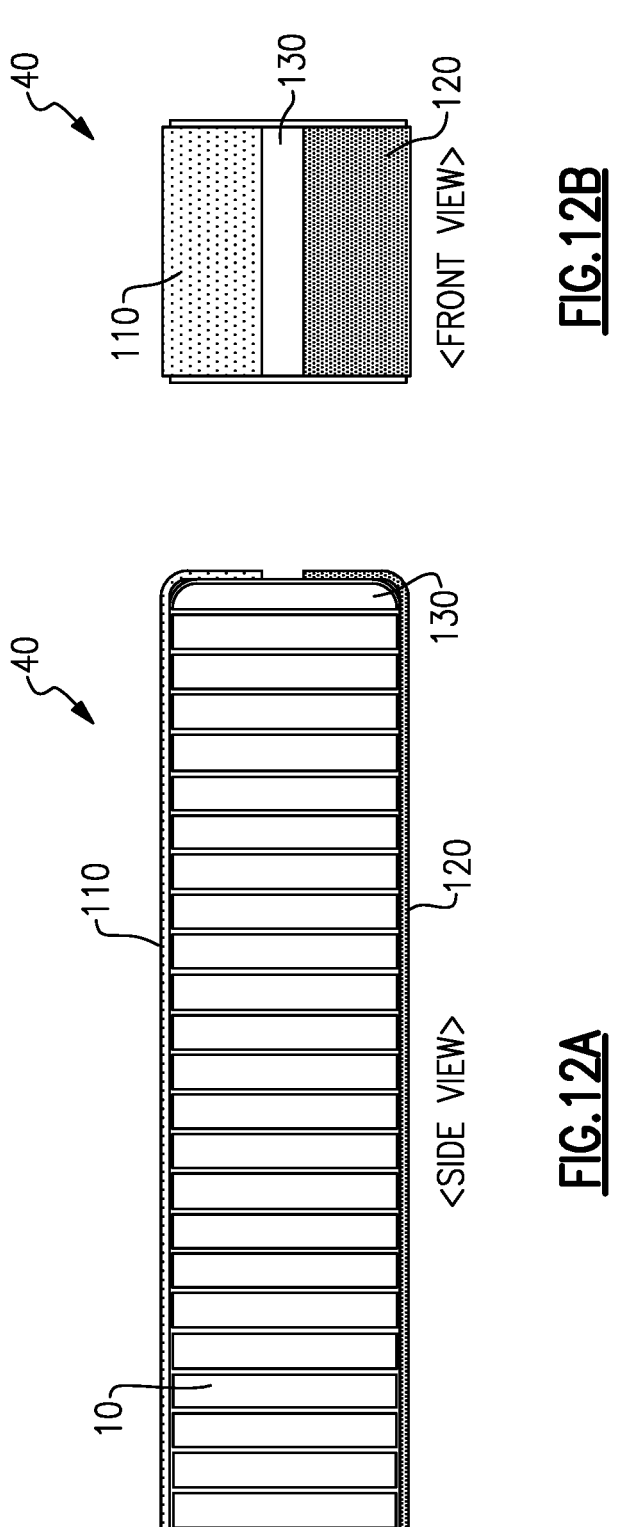

FIGS. 12A and 12B illustrate a side view and a top view of a redox battery comprising a plurality of stacked redox battery cells, according to some other embodiments.

Figure 13:
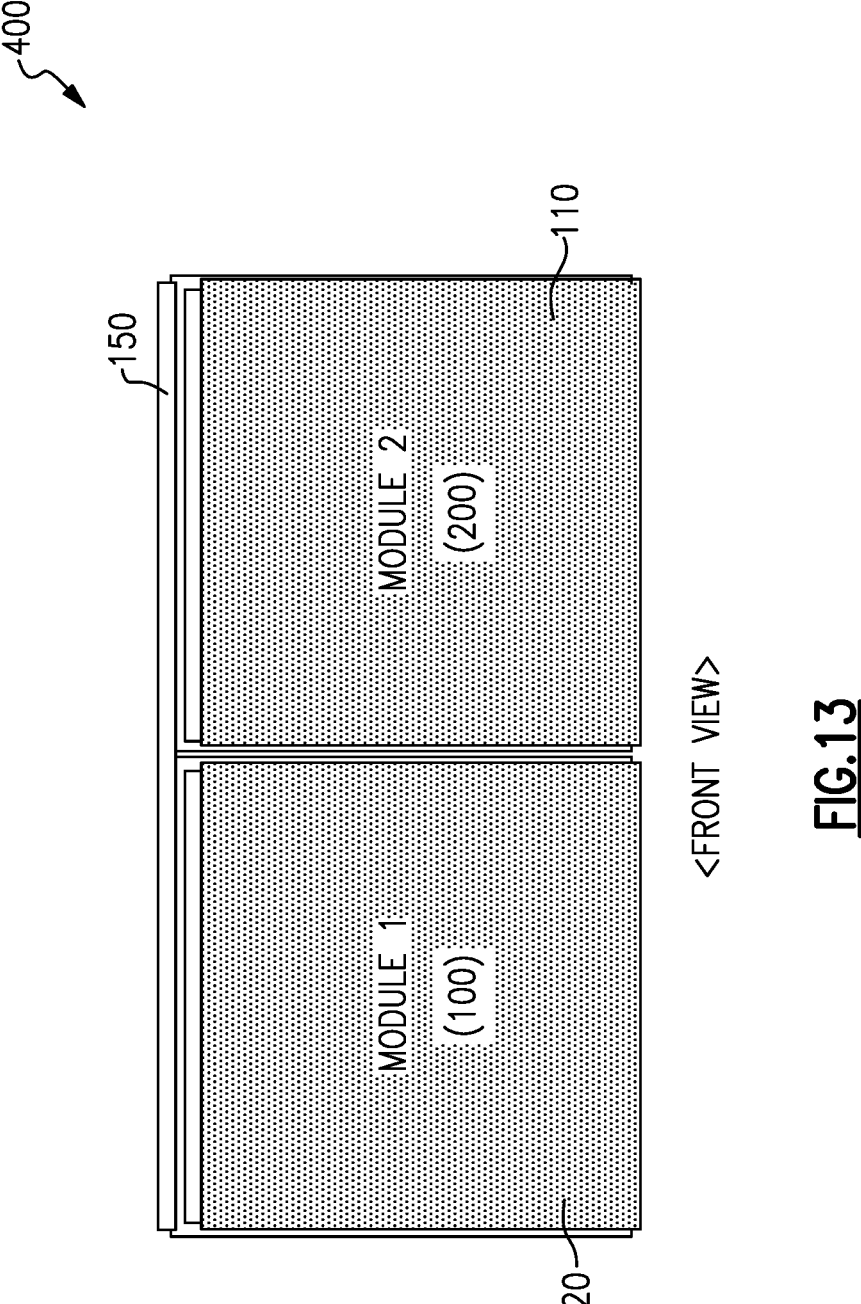

FIG. 13 illustrates a top view of an energy storage device comprising a plurality of redox batteries, according to some embodiments.

Figure 14:
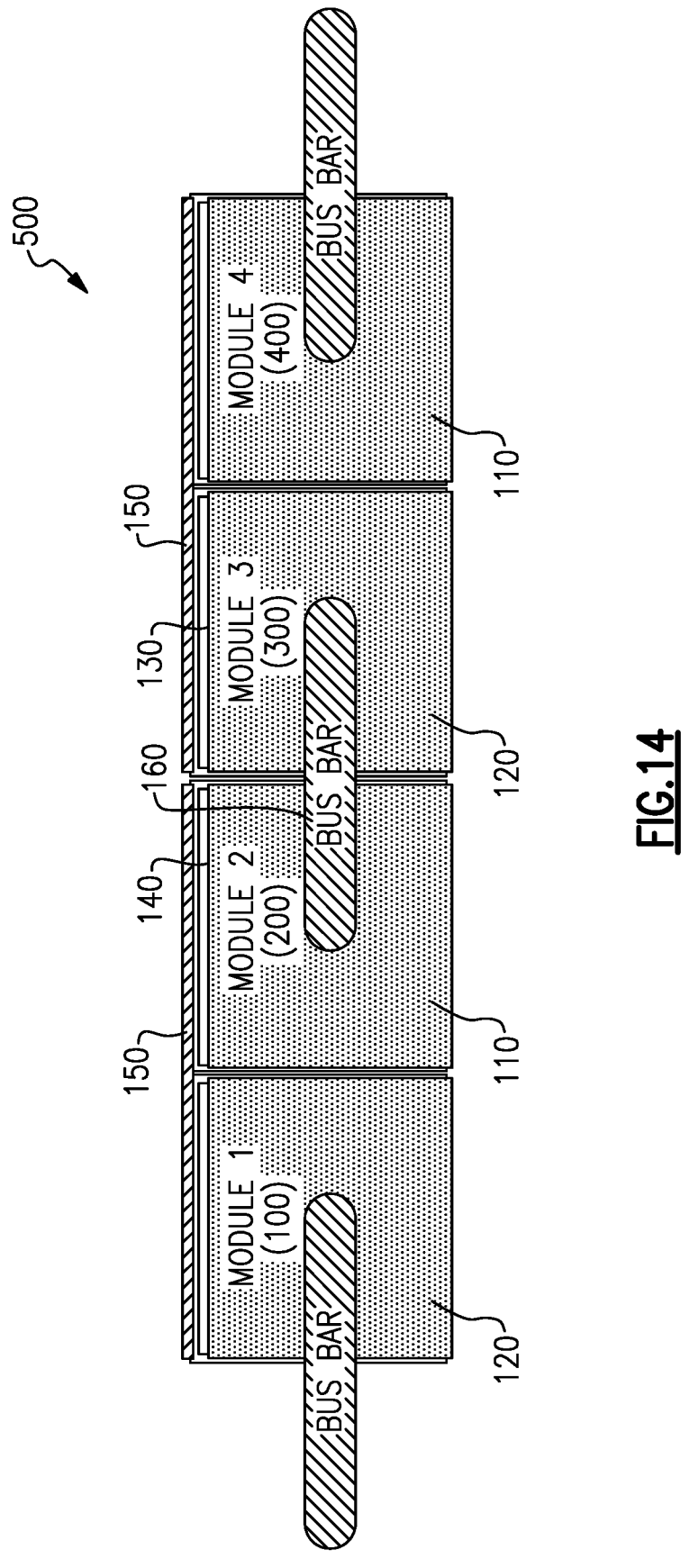

FIG. 14 illustrates a top view of an energy storage device comprising a plurality of redox batteries, according to some embodiments.

Figures 15A, 15B:
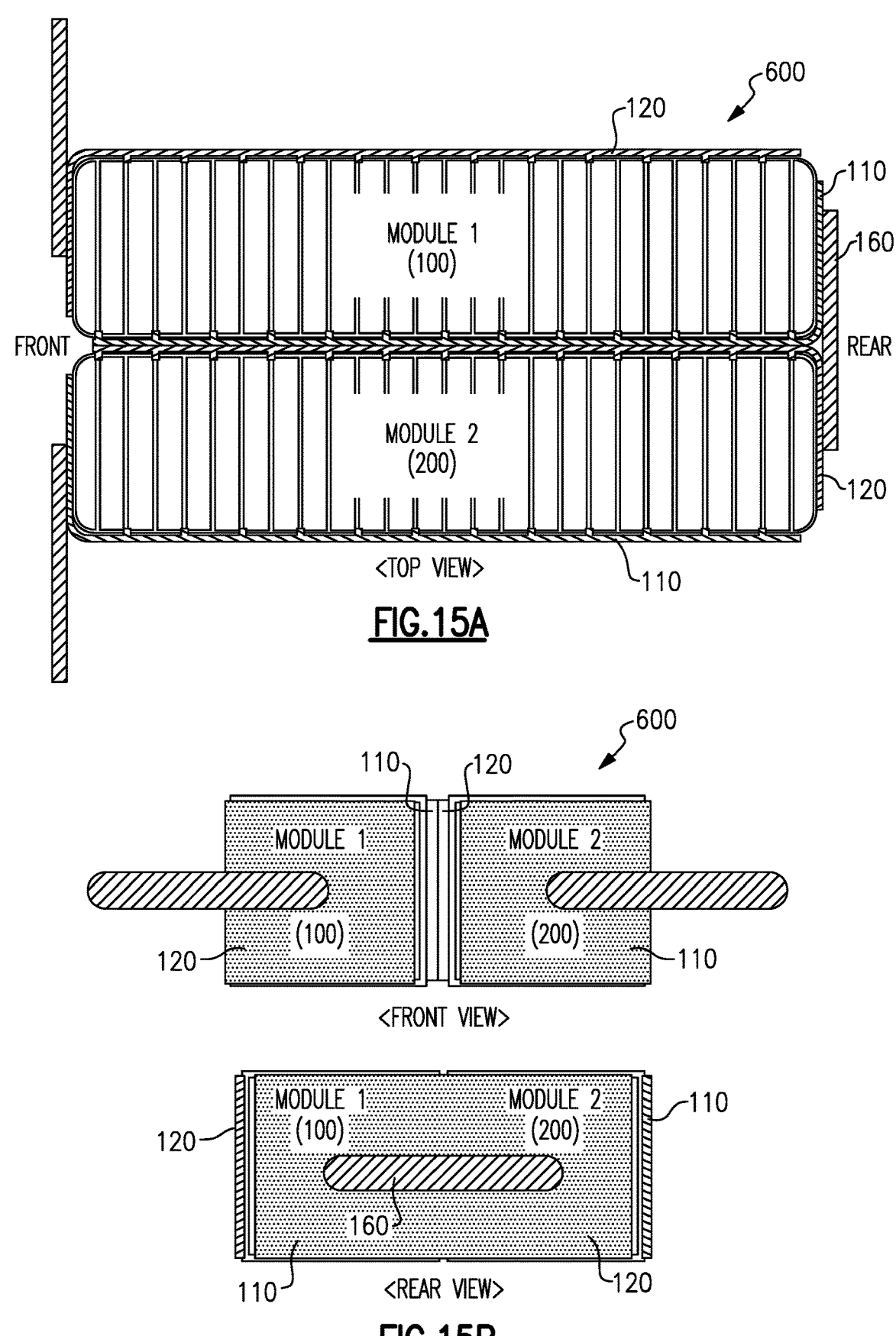

FIG. 15A illustrates a side view of a storage device comprising a plurality of redox batteries, according to some embodiments.

FIG. 15B illustrates a top and bottom view of the storage device illustrated in FIG. 15A.

Figure 16:
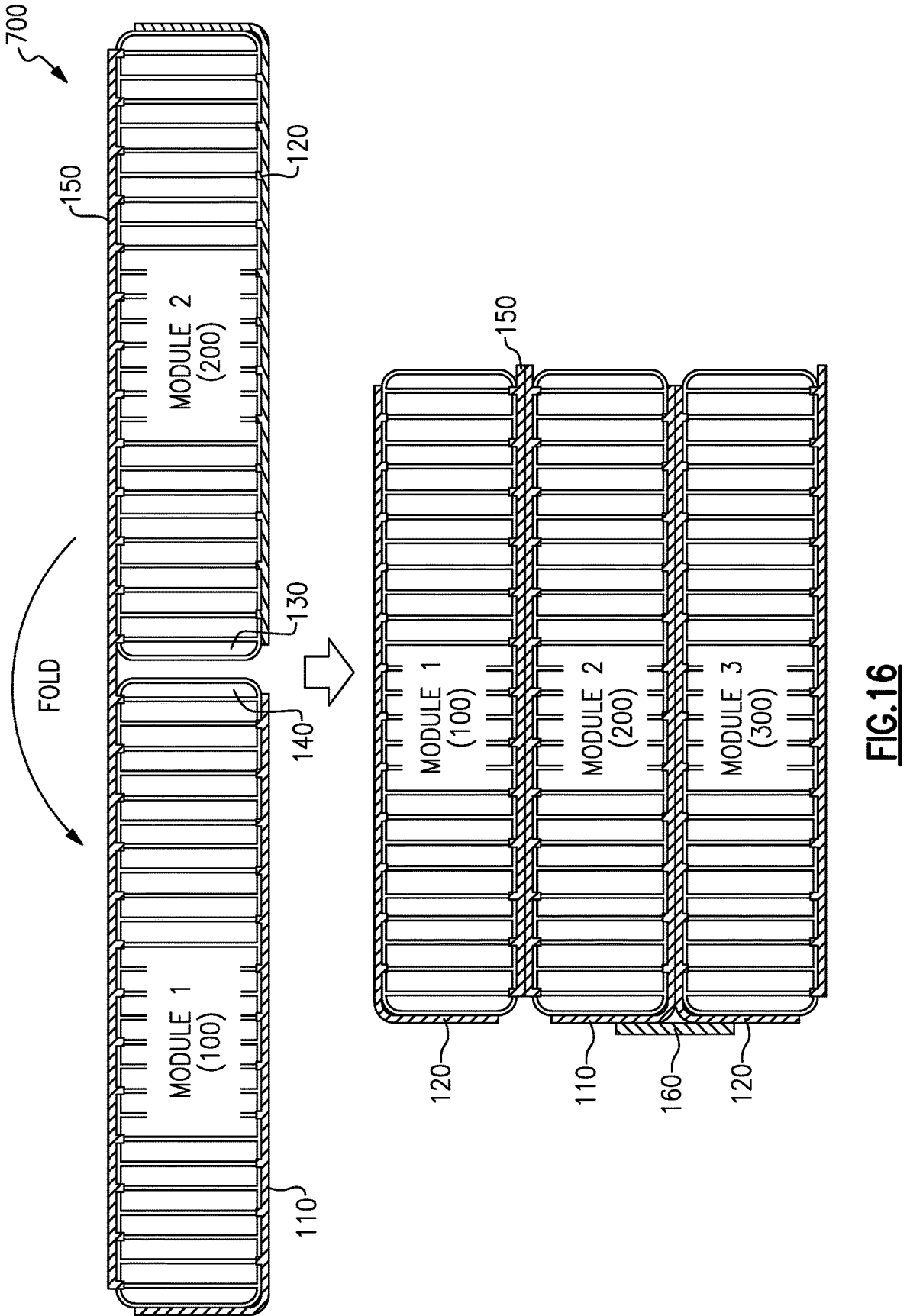

FIG. 16 illustrates side views of an energy storage device comprising a plurality of redox batteries, according to some embodiments.

Figures 17A, 17B:
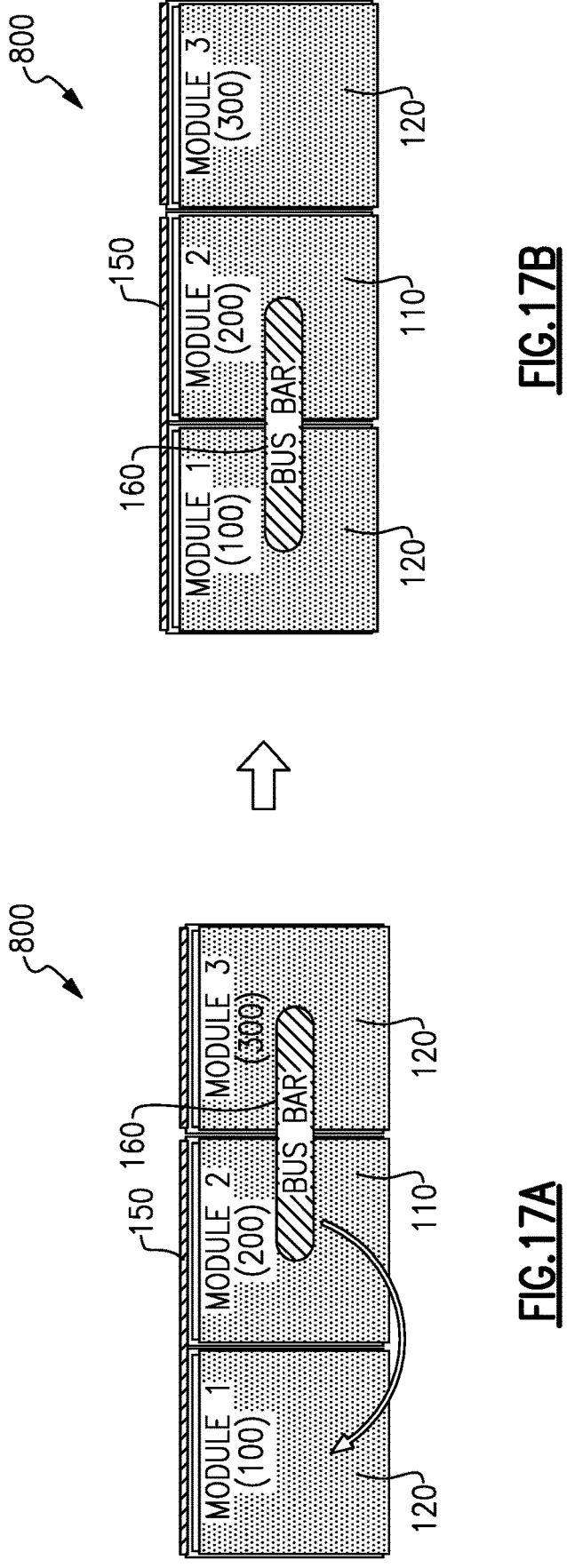

FIGS. 17A and 17B illustrate top views of two different states of an energy storage device comprising a plurality of redox batteries, according to some embodiments.

FIG. 18A illustrates a top view of an energy storage devices comprising a plurality of redox batteries, according to some embodiments.

FIGS. 18B and 18C illustrate top views of energy storage devices comprising a plurality of redox batteries, according to some embodiments.

Figures 19A, 19B:
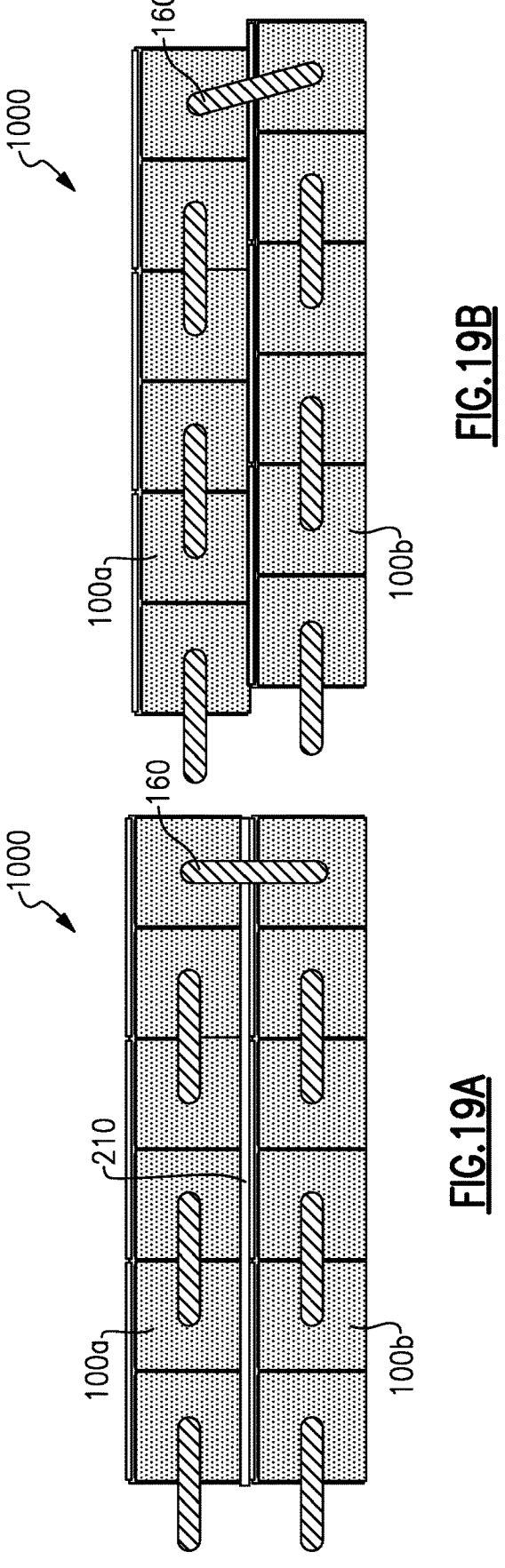

FIGS. 19A and 19B illustrate top views of energy storage devices comprising a one or more rows of redox batteries, according to some embodiments.

Figure 20:
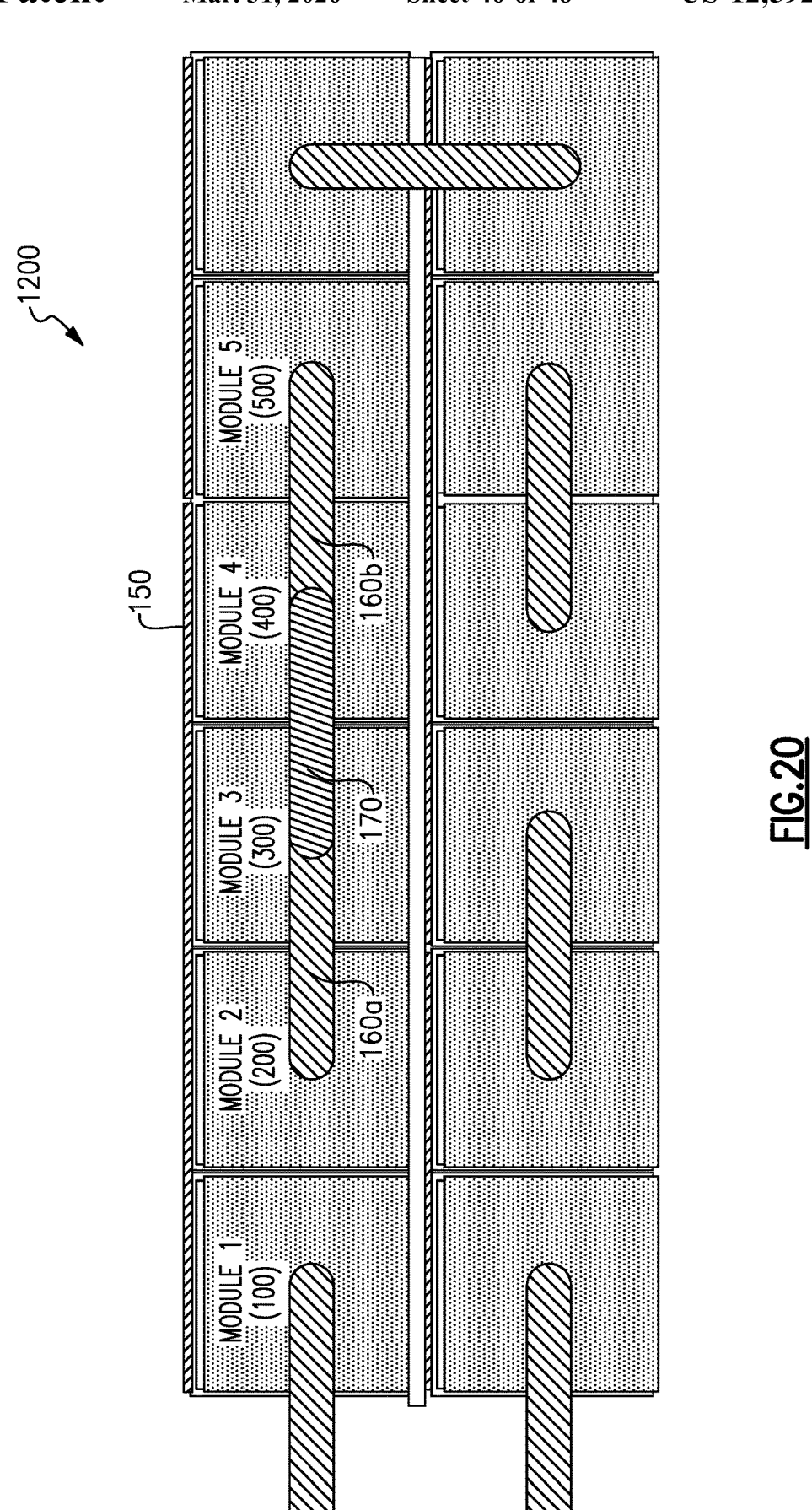

FIG. 20 illustrates a top view of an energy storage device comprising one or more rows of redox batteries, according to some embodiments.

FIG. 21 illustrates a top view of an energy storage device comprising one or more rows of redox batteries, according to some embodiments.

Figure 22:
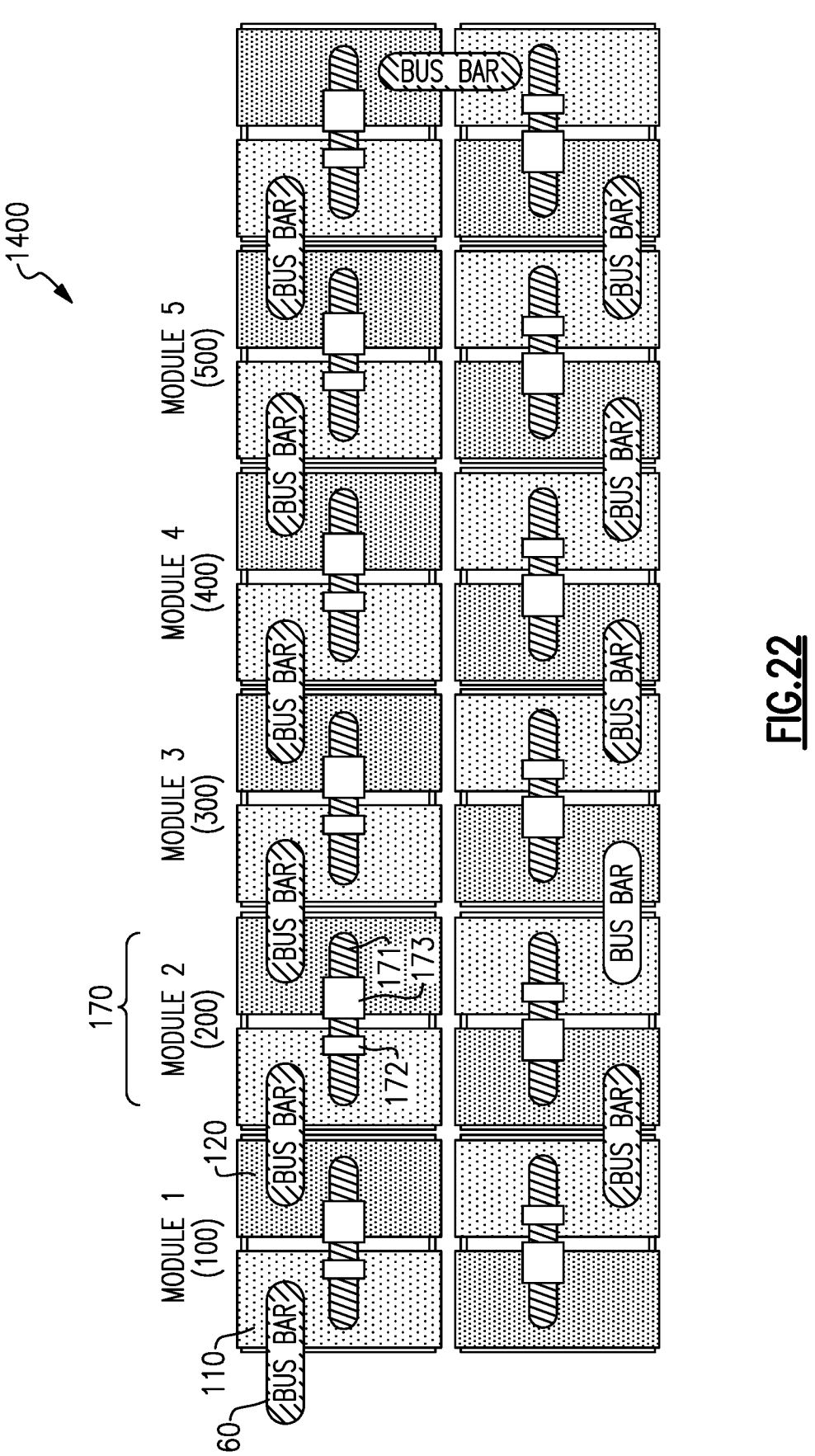

FIG. 22 illustrates a top view of an energy storage device comprising one or more rows of redox batteries, according to some embodiments.

DETAILED DESCRIPTION

As discussed above, competing factors that are weighed in the selection and design of a suitable electrochemical energy storage system for a particular application includes investment cost, power, energy, lifetime, recyclability, efficiency, scalability and maintenance costs, among others. Among various electrochemical energy storage systems, redox flow batteries (RFBs) are considered to be promising for stationary energy storage. RFBs are electrochemical energy conversion devices, that exploit redox processes of redox species dissolved in a solution. The solution is stored in external tanks and introduced into the RFB cell when needed. Some of the advantageous features of the RFB technology are: independent scalability of power and energy, high depth of discharge (DOD), and reduced environmental impact. Such features allow for wide ranges of operational powers and discharge times, making RFBs desirable for storage of electricity generated from renewable sources.

Particular disadvantages of some secondary batteries known in the art, such as a lithium-ion batteries, include excessive heat and internal pressure generation during operation thereof. To mitigate these effects, some secondary batteries employ a gap between the battery cells and/or a separate cooling device. Advantageously, in batteries according to embodiments disclosed herein, heat and pressure generation is significantly lower, which in turn lowers the risk of an explosion, such that a gap or a cooling device between the battery cells may not be needed, thereby enabling compact integration of the battery cells and batteries themselves.

Various batteries use a bus bar to electrically connect the battery cells and/or the batteries themselves. For compact integration, there is a need to reduce the amount of space occupied by the bus bars by efficiently disposing them. In addition to electrically connecting the battery cells and batteries, there is a separate need for physically and mechanically holding the battery cells or batteries together in an efficient manner. To address these and other needs, various embodiments disclosed herein provide bus bars to enable high-density integration of the battery cells and/or batteries, and an energy storage device including the same.

In addition, embodiments disclosed herein provide a battery that is easy to maintain after installation and an energy storage device including the same.

Figure 1:
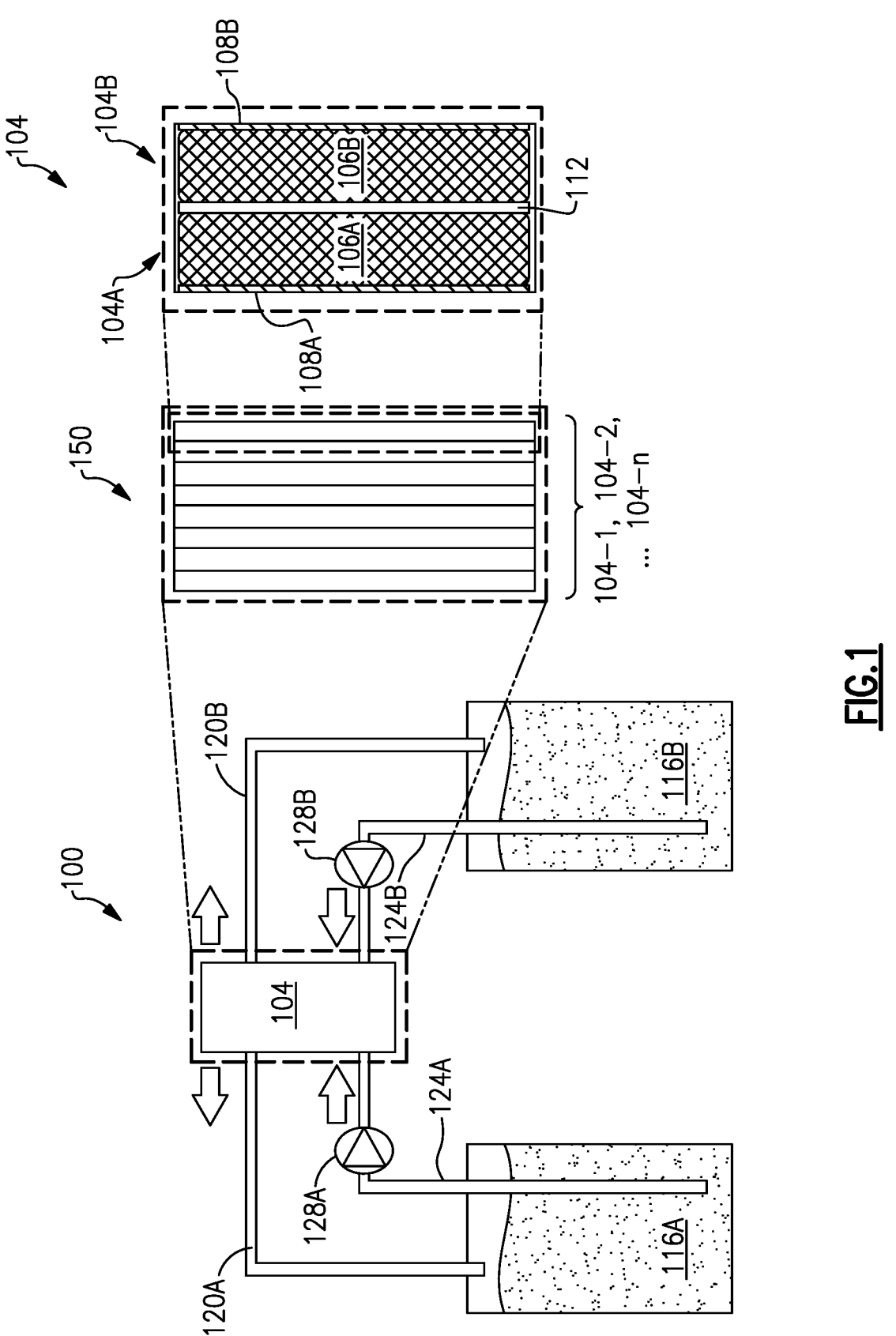
FIG. 1 is a schematic illustration of an example redox flow battery.

FIG. 1 is a schematic illustration of an example redox flow battery (RFB). The RFB 100 comprises a battery cell 104. The battery cell 104 has a first half cell 104A and a second half cell 104B separated by a separator or an ion exchange membrane 112. The first half cell 104A includes a positive electrolyte reservoir 106A having disposed therein a first or positive electrolyte and a positive electrode and the second half cell 104B includes a negative electrolyte reservoir 106B having disposed therein a second or negative electrolyte and a negative electrode. The positive electrode is electrically connected to a positive current collector 108A and the negative electrode is electrically connected to a negative current collector 108B. The positive electrolyte reservoir 106A is in fluidic communication and physically connected to a positive electrolyte tank 116A, and the negative electrolyte reservoir 106B is in fluidic communication and physically connected to a negative electrolyte tank 116B. In operation, the positive electrolyte is circulated between the positive electrolyte tank 116A and the positive electrolyte reservoir 106A via outlet and inlet conduits 120A, 124B, as shown by arrows using a positive electrolyte pump 128A. Similarly, the negative electrolyte is circulated between the negative electrolyte tank 116B and the negative electrolyte reservoir 106B via outlet and inlet conduits 120B, 124B.

In some configurations, a plurality of battery cells 104-1, 104-2, . . . , 104-*n* are stacked for form a RFB cell 150, where each cell is configured in a similar manner as the battery cell 104. The plurality of battery cells 104-1, 104-2, . . . , 104-*n* include respective ones of positive electrolyte reservoirs 106A, which may be in fluidic communication with each other, and respective ones of negative electrolyte reservoirs 106B, which may be in fluidic communication with each other. The connected ones of the positive electrolyte reservoirs 106A are in turn in fluidic communication with the positive electrolyte tank 116A, and the connected ones of the negative electrolyte reservoirs 106B are in turn are in turn in fluidic communication with the negative electrolyte tank 116B.

Compared to other electrochemical storage technologies such as lithium-ion, lead-acid and sodium-sulfur batteries, RFBs offer several advantages including separation of power conversion from energy storage, thus allowing for independent power and energy scaling. For example, RFBs can be adapted in a flexible and decentralized manner depending on the application, and be scaled to provide power and energy ranging from a few kW/kWh for e.g., domestic storage, up to systems of several to tens of MW/MWh for grid storage. In addition, unlike fuel cells, reactions in RFBs are reversible, thereby enabling the same cell to operate as converter of electricity into chemical energy and vice-versa. RFBs operate by changing the metal ion valence, without consuming ion metals, thereby allowing for long cycle service life. Cell temperature can be controlled relatively easily by regulating the electrolyte flow, in part due to the relatively high thermal mass of electrolytes. The state of charge (SOC) can be easily monitored through the cell voltage while very deep depth of discharge (DOD) can be achieved.

Despite various advantages of RFBs, their commercialization has not been widespread relative to other electrochemical storage technologies, despite relatively large capital, research and development investments that have been made in the technology through several decades. In particular, notwithstanding the recent surge in battery demand for ESS application and the apparent fitness of RFBs for such application including higher safety against fire and explosion, a widespread commercialization has yet to be realized, suggesting that there remain long felt need but substantial obstacles to commercialization of RFBs. The inventors have recognized several such obstacles, including relatively low reliability, low efficiency, large system footprint and high system complexity.

First obstacle to widespread commercialization of RFBs relates to relatively high complexity and the associated reliability issues of RFBs such as the RFB 100 described above with respect to FIG. 1. As described above, RFBs include multiple conduits 120A, 120B, 124A, 124B for transferring electrolytes to and from the battery cell 104, pumps 128A, 128B for circulating the electrolytes and tanks 116A, 116B for storing the electrolytes. Due to the relatively high complexity, various connection points associated with the conduits 120A, 120B, 124A, 124B between the battery cell 104 and the tanks 116A, 116B can lead to reliability failures, e.g., leakage. The likelihood and frequency of failures increases proportionally with the number of such conduits, which scales with the size of the ESS. When they occur, the failures lead to unscheduled repairs as well as safety hazard. In addition, reducing the likelihood of such failures and ensuring uninterrupted operation through preventive maintenance leads to added operating cost.

Second obstacle to widespread commercialization of RFBs relates to relatively low efficiency of RFBs. One cause of the relatively low efficiency relates to the energy expended in circulating the electrolytes. For example, the electrolyte for vanadium-based RFBs includes sulfuric acid, which can have relatively high viscosity. Circulating an electrolyte, especially an electrolyte having a relatively high viscosity, through fine porous structure of randomly oriented carbon fiber felt-based electrode can expend relatively high amounts of external energy, thereby lowering the extrinsic efficiency of the RFB s. The lower extrinsic efficiency of the RFB system is one of the main reasons for lower commercial competitiveness relative to competing secondary battery technologies such as lithium-ion battery (LIB) technology.

Third obstacle to widespread commercialization of RFBs relates to relatively lower power density and energy density compared to other electrochemical storage technologies, hindering their mobile applications. As described herein, power and energy densities refer to the power output and energy storage, respectively, of a storage device relative to the total volume of the energy storage device. Thus, for an RFB, the power and energy densities refer to ratios of power output and energy storage to the total volume including the cell volume, the tank volumes and the volumes of conduits for transferring the electrolytes. To partly compensate the lower power and energy densities, RFBs often have cell active areas and membranes that are relatively large, resulting in increased cell dimensions, which can in turn cause high transverse gradients of electrolytes inside the electrolyte reservoirs 116A, 116B. Consequently, the average current density and nominal current of RFBs can be substantially lower compared to the maximum theoretical values based on uniform maximum current density. In addition, the overall system-level space efficiency is further reduced by the need for a circulation system including separate tanks and conduits.

Fourth obstacle to widespread commercialization of RFBs relates to the system complexity, which can be comparable to that of a chemical plant. The complexity of designing the RFB systems is high, which in turn increases the development cycle, which in turn results in significantly slow technology development. In addition, the system complexity is labor- and capital-intensive and requires a high level of expertise in installation, maintenance and demolition at an ESS site. The system complexity deters consumers due to the potential need for increased staffing and training required to build and maintain the systems, as well as the accompanying increase in the overall cost.

To address these and other limitations while retaining most of the benefits conferred by the RFBs, the present disclosure is directed to sealed redox batteries which may not be connected to separate electrolyte tanks. In addition, the present disclosure is additionally directed to bus bars that enable efficient integration of a plurality of redox battery cells, which may be sealed. However, it will be appreciated that the inventive concepts including sealed redox batteries and bus bars may be practiced individually or in combination.

Sealed Redox Battery

In an aspect, various embodiments of a redox battery disclosed herein are directed to a redox battery. The redox battery according to embodiments retain the advantages of RFBs while at least partly overcoming or mitigating some of all of the commercialization obstacles of RFBs discussed above. In particular, while using redox couples that participate in redox reactions, unlike some RFBs, embodiments of a redox battery disclosed herein include a sealed redox battery cell and do not have a separate electrolyte tank connected to the redox battery cell, nor an electrolyte circulating device such as a pump for supplying the electrolyte from outside of the redox battery cell.

Figure 2A:
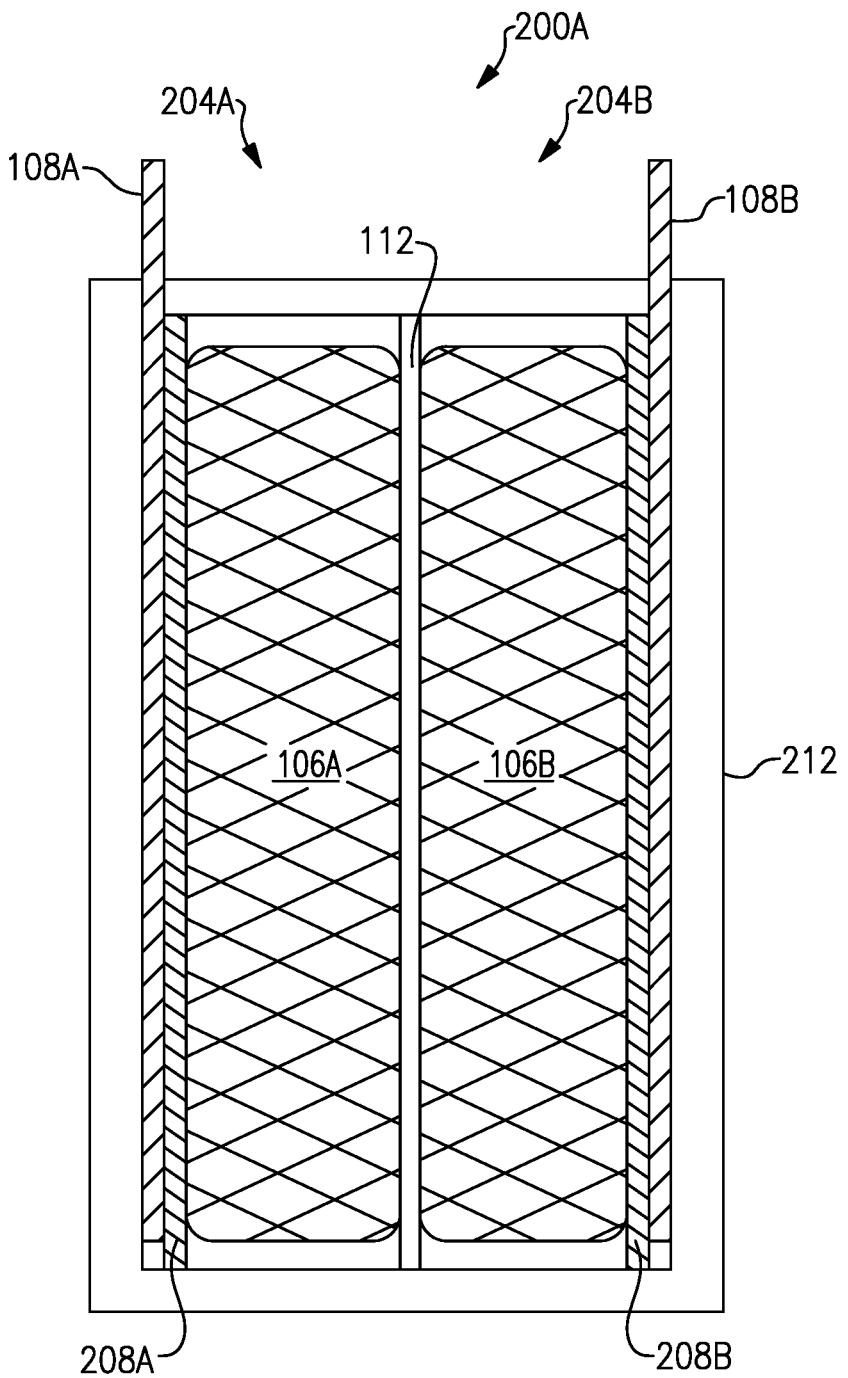
FIG. 2A is a schematic illustration of a sealed redox battery, according to embodiments.

FIG. 2A is a schematic illustration of a sealed redox battery, according to embodiments. The illustrated sealed redox battery 200A comprises a first half cell 204A and a second half cell 204B. The first half cell 204A comprises a positive electrolyte reservoir 106A having disposed therein a first or positive electrolyte contacting a positive electrode. The first electrolyte has dissolved therein a first redox couple configured to undergo a first redox half reaction. The second half cell 204B comprises a negative electrolyte reservoir 106B having disposed therein a second or negative electrolyte contacting a negative electrode. The second electrolyte has dissolved therein a second redox couple configured to undergo a second redox half reaction. The positive and negative electrolyte reservoirs 106A, 106B define reaction spaces for the respective half reactions. The sealed redox battery 200A additionally comprises an ion exchange membrane 112 separating the positive electrolyte reservoir 106A and the negative electrolyte reservoir 106B. The positive electrode is electrically connected to a positive current collector 108A and the negative electrode is electrically connected to a negative current collector 108B. In some implementations, a first bipolar plate 208A is interposed between the positive current collector 108A and the positive electrolyte reservoir 106A, and a second bipolar plate 208B is interposed between the negative current collector 108B and the negative electrolyte reservoir 106B.

Unlike conventional RFBs, in the sealed redox battery 200, the first half cell 204A, the second half cell 204B and the ion exchange membrane 112 define a redox battery cell that is sealed in a casing or a frame 212. The sealed casing 212 is such that under normal operation, internal contents thereof may not be physically accessible from the outside. That is, the positive and negative electrolytes are not in fluidic communication with external containers such as electrolyte tanks. The casing 212 may seal the redox battery 200A hermetically and/or permanently. Such configuration is in contrast to conventional redox flow batteries, in which the redox battery cell is in fluidic communication with external tanks. That is, in the sealed redox battery 200A, unlike the RFB 100 described above with respect to FIG. 1, neither of the positive electrolyte reservoir 106A or the negative electrolyte reservoir 106B in the enclosed cell is in fluidic communication with or physically connected to a separate electrolyte tank that stores a respective one of the first or second electrolytes. As such, substantially the entire volume of the positive and negative electrolytes is stored within the redox battery cell and sealed and enclosed by the casing 212. That is, the first electrolyte reservoir 106A stores substantially the entire volume of the first electrolyte for the first half cell 204A, and the second electrolyte reservoir 106B stores substantially the entire volume of the second electrolyte for the second half cell 204B. In part because the sealed redox battery 200A is not connected to a separate storage tank, unlike the RFB 100 illustrated in FIG. 1, the sealed redox battery 200A advantageously does not include the conduits 120A, 120B, 124A, 124B (FIG. 1) for transferring electrolytes to and from the redox battery cell, nor the pumps 128A, 128B (FIG. 1) for circulating the electrolytes.

As described above, a notable structural distinction of the sealed redox battery 200A is the omission of pumps 128A, 128B (FIG. 1). Instead, the sealed redox battery 200A according to embodiments are configured such that the first and second electrolytes self-circulate within respective ones of the positive electrolyte reservoir 106A of the first half cell 204A and the negative electrolyte reservoir 106B of the second half cell 204B. In various configurations, self-circulation of the first and second electrolytes is caused by one or more of: an osmotic pressure difference between the first and second electrolyte reservoirs; a density change in one or both of the first and second electrolytes; diffusion or migration of one or both of the first and second electrolytes; an affinity of one or both of the first and second electrolytes toward a respective ones of the first and second electrodes; the first and second redox half reactions; and thermal expansion or contraction of one or both of the first and second electrolytes. The inventors have discovered that self-circulation is effective to provide stability of the power and energy output when the thicknesses of the positive and negative electrolyte reservoirs 106A, 106B in the cross-sectional view of FIG. 2A do not exceed 20 cm, 15 cm, 10 cm, 5 cm, 2 cm, 1 cm or a value in a range defined by any of these values.

Still referring to FIG. 2A, the casing 212 is formed of a suitable corrosion resistant material to accommodate the positive and negative electrolytes, which can be highly acidic. In addition to providing corrosion resistance, the casing 212 may be a rigid casing to provide mechanical support for the sealed redox battery 200A. In some embodiments, at least portions of the casing 212 according to embodiments may be formed of a flexible material that is configured to deform to accommodate changes in internal pressure within the positive and negative electrolyte reservoirs 106A, 106B. The increase in internal pressure may be caused, e.g., due to various effects described infra with respect to pressure-controlled sealed redox batteries. In configurations where only portions of the casing are formed of a flexible material, remaining portions may be formed of a rigid material. The flexible portions may be configured to, e.g., expand in response to an increase in pressure such that one or both of the positive and negative electrolyte reservoirs 106A, 106B may accommodate in increase in respective volume that is greater than 0.1%, 0.2%, 0.5%, 1%, 2%, 5%, 10%, 20%, 50%. The suitable material of the casing 212 can include polyvinyl chloride (PVC), polyethylene (PE), polystyrene (PS), polypropylene (PP), polycarbonate (PC), ABS, reinforced plastics, and the like.

Thus configured, the sealed redox battery 200A provides various technical and commercial advantages. For example, various reliability failures associated with the conduits, e.g., pipe joints, between the redox battery cell and the tanks, as well as pumps for circulating the electrolytes, are substantially reduced or eliminated, which in turn reduces unscheduled repairs as well as safety hazard and operational cost associated with operation of the sealed redox battery 200A. In addition, extrinsic efficiency is substantially improved by obviating a need to circulate the electrolyte between the redox battery cell and the tanks using pumps, as described above with respect to the RFB 100 (FIG. 1). The inventors have realized that depending on the size of the system, the sealed redox battery 200A can improve the power or energy density by up to 2-50 times compared to conventional RFBs by obviating a need to circulate the electrolyte between the cell and the electrolyte tanks. As described above, a power or energy density refers to the power or energy output of a storage device relative to the total volume of the energy storage device, respectively. Thus, for a sealed redox battery, the power or energy density refers to a ratio of the power or energy output to the total volume of the sealed the redox battery, respectively. In addition, the space efficiency is greatly improved by the omission of a circulation system including separate tanks, pumps and conduits. Furthermore, the system complexity is greatly reduced, thereby greatly reducing the barrier to commercial implementation of the sealed redox battery 200A. For example, unlike conventional RFBs, the sealed redox battery 200A can be manufactured in packs similar to lithium-ion batteries for modularized implementation, rendering them more adapted for automation and mass production, without a need for intrusive construction that may be needed for installing conventional RFBs.

In the following, the operating principle and aspects of the sealed redox battery 200A are described using an example of a sealed vanadium (V) redox battery, which is based on vanadium-based redox pairs. However, it will be understood that embodiments are not so limited, and the principles described herein can be applied to redox batteries according to various other redox pairs.

In a sealed V redox battery according to embodiments, the first redox couple dissolved in the first or positive electrolyte of the first half cell 204A may be a $V^{4+}/V^{5+}$ redox couple, and the second redox couple dissolved in the second or negative electrolyte of the second half cell 204B may be a $V^{2+}/V^{3+}$ redox couple. The redox reactions during charging and discharging can be described using the following equations, where $\rightarrow$ denotes a discharge reaction direction and $\leftarrow$ denotes a charging reaction direction:

Second half cell/Negative electrode: $V^{2+4} \xleftarrow{} \xrightarrow{} V^{3+} + e^-$ First half cell/Positive electrode: $V^{5+} + e^- \xleftarrow{} \xrightarrow{} V^{4+}$ Overall reaction: $V^{2+} + V^{5+} \xleftarrow{} \xrightarrow{} V^{3+} + V^{4+}$ During charging, in the first half cell 204A, tetravalent vanadium ions $V^{4+}$ is oxidized to pentavalent vanadium ions $V^{5+}$, while in the second half cell 204B, trivalent ions $V^{3+}$ are reduced to bivalent ions $V^{2+}$. During discharging, in the first half cell 204A, pentavalent vanadium ions $V^{5+}$ is reduced to tetravalent vanadium ions $V^{4+}$, while in the second half cell 204B, bivalent ions $V^{2+}$ are oxidized to trivalent ions $V^{3+}$. While these redox reactions occur, electrons are transferred through an external circuit and certain ions diffuse across the ion exchange membrane 112 to balance electrical neutrality of positive and negative half cells, respectively.

Other redox reactions can be implemented in the sealed redox battery 200A according to embodiments. According to various embodiments, the first redox couple or the second redox couple includes ions of one or more of vanadium (V), zinc (Zn), bromine (Br), chromium (Cr), manganese (Mn), titanium (Ti), iron (Fe), cerium (Ce) and cobalt (Co). In some embodiments, the first and second redox couples include ions of the same metal, as in the sealed V redox battery described above. In these embodiments, advantageously, mixing of the positive and negative electrolytes does not lead to cross-contamination of the electrolytes.

As described herein, an electrolyte of a redox battery is a solution that conducts current through ionization. The electrolyte serves to support the reduced and oxidized forms of a redox couple and also supports the corresponding cations and anions in order to balance the charge of the ions in solution during the oxidation and reduction of the redox couple. The positive and negative electrolytes according to embodiments comprise an aqueous acidic solution. For a sealed V redox battery, the concentration of V ions relates to the energy density of the electrolytes. Higher energy density can advantageously serve to reduce the volume of the positive and negative electrolyte reservoirs 106A, 106B needed for a given amount of energy and power output. However, the concentration of V ions that is too high can lower the stability of the V ions. Thus, there is an optimum range of V ions for a given application. For example, vanadium ions dissolved in the one or both of the first and second electrolyte can be greater than 1.0 M, 1.5 M, 2.0 M, 2.5 M or a value in a range defined by any of these values. On the one hand, V ion concentrations that are lower than 1.0 M can result in energy levels that are not suitable for some applications. On the other hand, V ion concentrations that are greater than 2.5 M can result in lower stability of the $V^{5+}$ ions, e.g., at operating temperatures above 50° C., and can approach the solubility limit of $V^{2+}$ and $V^{3+}$ ions in the electrolyte, e.g., at operating temperatures below −20° C.

Advantageously, according to embodiments, the positive and negative electrolytes can include the same solvent(s) and/or ions of the same metal. In these embodiments, mixing of the positive and negative electrolytes through the ion exchange membrane 112 does not result in contamination of the respective half cells. In addition, the positive and negative electrolytes may be prepared from the same starting solvent(s) and solute(s). For example, for a sealed V redox battery according to some embodiments, both the positive and negative electrolytes comprise sulfuric acid. The electrolytes can be prepared by, e.g., dissolving 0.1 M to 2.5 M $VOSO_4$ (vanadylsulfate) in 0.1 M to 6 M $H_2SO_4$ in aqueous solution, to form tetravalent vanadium ions ($V^{4+}$) and/or trivalent vanadium ions ($V^{3+}$). The tetravalent/trivalent vanadium ions can be electrochemically oxidized to form the positive electrolyte (catholyte), which contains a solution of pentavalent vanadium ions ($V^{5+}$). Conversely, the tetravalent/trivalent vanadium ions can be electrochemically reduced to form the negative electrolyte (anolyte), which contains a solution of a divalent vanadium ions ($V^{2+}$).

Still referring to FIG. 2A, in various embodiments, the positive and negative electrodes disposed in the positive and negative electrolyte reservoirs 106A, 106B, respectively, comprise carbon-based materials, such as carbon or graphite felts, carbon cloth, carbon black, graphite powder and graphene, to name a few. The carbon-based materials advantageously provide relatively high operation range, good stability and a high reversibility. The electrodes are optimized for relatively high electrochemical activity, low bulk resistivity and large specific area. The improvement of the electrochemical activity of the electrode increases the energy efficiency of the sealed redox battery 200A. To improve the performance of the sealed redox battery 200A, the surfaces of the electrode may be modified, e.g., by coating with a metal, increasing surface roughness, or doping with additives.

The positive and negative electrolyte reservoirs 106A, 106B defining the reaction spaces are partly or completely filled with respective electrodes between the ion exchange membrane 112 and the first and second bipolar plates 208A, 208B respectively when present, or between the ion exchange membrane 112 and the positive and negative current collectors 108A, 108B respectively. The remaining spaces of the positive and negative electrolyte reservoirs 106A, 106B after filling with respective electrodes are partly or completely filled with respective electrolytes between the ion exchange membrane 112 and the first and second bipolar plates 208A, 208B when present, or between the ion exchange membrane 112 and the positive and negative current collectors 108A, 108B. In various embodiments, except when intentionally perforated or rendered porous as described below, the ion exchange membrane 112 serves to substantially separate the two half-cells, and to substantially prevent the mixing of the two electrolytes and the redox couples, while allowing the transport of ions such as $H^+$ to balance the charge between the two half cells to complete the circuit during passage of current. The ion exchange membrane 112 can be an anion exchange membrane or a cation exchange membrane. The ion exchange membrane 112 can include perfluorinated ionomers, partially fluorinated polymers and non-fluorinated hydrocarbons to name a few categories of materials. Particular examples of ion exchange membrane 112 include Nafion®, Flemion®, NEOSEPTA-F® and Gore Select®, which provide good chemical stability, high conductivity and mechanical strength.

While various illustrated embodiments include an ion exchange membrane 112 that can be selective to a particular type of ion, e.g., a cation or an anion, embodiments are not so limited. For example, in various embodiments, the ion exchange membrane 112 can be a non-selective membrane, e.g., a porous membrane.

Still referring to FIG. 2A, in some embodiments, the output power may be scaled by connecting a number of single redox battery cells, e.g., in series, to form a cell stack. In these configurations, first and second bipolar plates 208A, 208B may facilitate the series connection of the single cells and the current collecting plate 108A, 108B between adjacent bipolar plates can be removed. The first and second bipolar plates 208A, 208B may be formed of a suitable material such as graphite, carbon, carbon plastic or the like to provide high electrical conductivity and low internal resistance of the cell stack. Additionally, the first and second bipolar plates 208A, 208B support the contact pressure to which they are subjected when pressed against the electrodes to increase electrical conductivity. In addition, the first and second bipolar plates 208A, 208B are provided to have high acid resistance to prevent corrosion or oxidation of the current collecting plates 108A, 108B.

The positive and negative current collectors 108A, 108B comprise a metal having high electrical conductivity, such as copper or aluminum, and serve to flow electrical current during the charging and discharging processes.

As a single sealed redox battery 200A described above has an output voltage that is characteristic of the electrochemical reaction, e.g., about 1.65 V or less additional cells may be connected in electrical series or in electrical parallel to achieve higher voltages and currents, respectively, as described herein.

FIG. 2B is a schematic illustration of a sealed redox battery comprising a plurality of sealed redox battery cells in a stacked configuration, according to some embodiments. The illustrated sealed redox battery 200B includes a plurality of redox battery cells 200B-1, 200B-2, . . . , 200B-n, which can be stacked, where each cell is configured in a similar manner as the sealed redox battery 200A (FIG. 2A). Each of the plurality of redox battery cells 200B-1, 200B-2, . . . , 200B-n includes a positive electrolyte reservoir 106A, a negative electrolyte reservoir 106B and an ion exchange membrane 112. In the illustrated embodiment, each of the plurality of redox battery cells 200B-1, 200B-2, . . . , 200B-n is enclosed by a separate casing 212. The plurality of redox battery cells 200B-1, 200B-2, . . . , 200B-n may be connected in electrical series to increase the output voltage.

FIG. 2C is a schematic illustration of sealed redox battery comprising a plurality of sealed redox battery cells in a stacked configuration, according to some other embodiments. The illustrated sealed redox battery 200C includes a plurality of redox battery cells 200C-1, 200C-2, . . . , 200C-n, which can be stacked, where each of the plurality of redox battery cells 200C-1, 200C-2, . . . , 200C-n is configured in a similar manner as the sealed redox battery 200A (FIG. 2A), including a positive electrolyte reservoir 106A, a negative electrolyte reservoir 106B and an ion exchange membrane 112. However, unlike the sealed redox battery 200B (FIG. 2B), in the illustrated embodiment, the plurality of redox battery cells 200C-1, 200C-2, . . . , 200C-n are enclosed by a common casing 222. In a similar manner as the sealed redox battery 200B (FIG. 2B), the plurality of redox battery cells 200C-1, 200C-2, . . . , 200C-n may be connected in electrical series to increase the output voltage. Furthermore, in some embodiments, the positive electrolyte reservoirs 106A of the plurality of redox battery cells 200C-1, 200C-2, . . . 200C-n may be in fluidic communication with each other, and the negative electrolyte reservoirs 106B of the plurality of redox battery cells 200C-1, 200C-2, . . . , 200C-n may be in fluidic communication with each other. The sealed redox battery 200C may be configured as a pouch type redox battery or a rigid case type redox battery.

FIG. 2D is a schematic illustration of sealed redox battery comprising a plurality of sealed redox battery cells in a cylindrically stacked configuration, according to embodiments. The illustrated sealed redox battery 200D includes a plurality of redox battery cells 200D-1, 200D-2, . . . , 200D-n, which can be cylindrically stacked, where each of the plurality of redox battery cells 200D-1, 200D-2, . . . , 200D-n is configured in a similar manner as the sealed redox battery 200A (FIG. 2A), including a positive electrolyte reservoir 106A, a negative electrolyte reservoir 106B and an ion exchange membrane 112. The plurality of redox battery cells 200D-1, 200D-2, . . . , 200C-n may individually be enclosed in a casing in a similar manner as described above with respect to the sealed redox battery 200B (FIG. 2B). Alternatively, the plurality of redox battery cells 200D-1, 200D-2, . . . , 200C-n may be enclosed by a common casing 222 in a similar manner as described above with respect to the sealed redox battery 200C (FIG. 2C). In a similar manner as the sealed redox batteries 200B (FIG. 2B), the plurality of redox battery cells 200D-1, 200D-2, . . . , 200D-n may be connected in electrical series to increase the output voltage. Furthermore, in some embodiments, the positive electrolyte reservoirs 106A of the plurality of redox battery cells 200D-1, 200D-2, . . . , 200D-n may be in fluidic communication with each other, and the negative electrolyte reservoirs 106B of the plurality of redox battery cells 200D-1, 200D-2, . . . , 200D-n may be in fluidic communication with each other.

It will be appreciated that some or all of the plurality of redox battery cells in each of the stacked configurations described above with respect to FIGS. 2B-2C may be connected in electrical series, by suitably electrically connecting current collectors of opposite polarities of some or all of the cells, or in electrical parallel, by suitably electrically connecting current collectors of the same polarity of some of all of the cells.

Distinctions of Sealed Redox Battery Compared to Conventional Secondary Batteries The distinctions and advantages of sealed redox batteries according to embodiments against conventional RFBs have been described above, including the omission of electrolyte tanks, a pumping system and a network of conduits, which have contributed to the slow commercial implementation of conventional RFBs. While no separate electrolyte tanks may be present, the sealed redox batteries 200A-200D (FIGS. 2A-2D) retain some of the unique design flexibility available in conventional RFBs. For example, due to the intrinsic conformability of liquids, the design of cell geometry are substantially more flexible compared to conventional secondary batteries. Moreover, the power and energy storage capacity can be decoupled and scaled independently to a limited extent, e.g., by adjusting the ratio of electrolyte volume relative to the electrode surface area. The ratio can be adjusted using, e.g., the thickness of the positive and negative electrolyte reservoirs 106A, 106B, as described above. On the other hand, the sealed redox batteries according to embodiments also share major advantages of conventional batteries, because they are completely sealed to enable modularized implementation. While sealed redox batteries according to embodiments and conventional secondary batteries, e.g., LIBs, may have components referred to using similar terminologies, it will be appreciated that the components of the sealed redox batteries according to embodiments and their operational principles are distinguishable from those of conventional secondary batteries, as described herein. In the following, while comparisons may be made between sealed redox batteries according to embodiments and LIB s, it will be understood that the comparisons are applicable to other conventional secondary batteries.

First, the structure, functional role and operational principle of the electrolytes in the sealed redox battery according to embodiments are distinguishable from those of conventional secondary batteries, e.g., LIBs. In operation, in LIBs, the electrolyte does not itself store energy nor participate in the electrochemical reactions in the charge/discharge processes. Instead, the electrolyte in LIBs primarily serves to provide a path for lithium ions to be transported between the positive electrode and the negative electrode during the charging/discharging process. Therefore, the movement of the electrolyte is not substantially restricted by the separator. In contrast, in the sealed redox battery 200A according to embodiments, electrochemical energy is stored in the electrolytes in the form of dissolved active material, e.g., respective redox pairs dissolved in the positive and negative electrolytes that undergo electrochemical reactions during the charge/discharge processes. Thus, the electrolytes can be said to be the medium which stores the energy in the sealed redox batteries according to embodiments. In the example of V redox battery, as described above, the oxidation states of V ion species dissolved in the positive and negative electrolytes are changed by the respective half reactions. Thus, the chemical compositions of the positive and negative electrolytes in sealed redox batteries are different from the electrolyte of LIBs. Further unlike LIBs, in sealed redox batteries according to embodiments, since the electromotive force resulting from the difference in the chemical compositions of the positive electrolyte and the negative electrolyte leads to energy storage, mixing of the positive and negative electrolytes leads to a loss of stored energy.

Second, the structure, functional role and operational principle of the electrodes in the sealed redox battery according to embodiments are distinguishable from those of conventional secondary batteries, e.g., LIBs. In LIBs, the active materials, which are included in the electrodes, directly participate electrochemical reactions. In operation, in a LIB, lithium ions move between an active material of the positive electrode and an active material of the negative electrode to achieve electrochemical equilibrium, and the electrodes themselves serve as the main media for energy storage. In contrast, the electrodes of the sealed redox battery according to embodiments serve a very different role. The positive electrode of a sealed redox battery does not participate in the first redox half reaction and the negative electrode of the sealed redox battery does not participate in the second redox half reaction. As described herein, an electrode that does not participate in a redox half reaction does not preclude the electrode's function of providing a physical site for the electrochemical reaction in an analogous manner as a catalyst. However, the electrodes themselves are not involved in the electrochemical reactions and redox ions do not move between positive and negative electrodes during charging and discharging of the redox battery. Depending on the composition, a functional group acting as a catalyst may exist on the surface. However, this is distinguishable from the electrodes actively participating in the electrochemical reaction as in the case with LIBs. Rather, the electrodes substantially passively transport electrons generated by the electrochemical reactions.

Third, the structure, functional role, and operational principle of the ion exchange membrane in the sealed redox battery according to embodiments are distinguishable from those of a separator in conventional secondary batteries, e.g., LIBs. In a LIB, the active materials of electrodes where the electrochemical reactions take place are generally in the solid state, and a separator disposed between positive and negative electrodes primarily serves to prevent an electrical short therebetween. So, while the separator serves to prevent an electrical contact between the positive and negative electrodes, in a LIB the separator is not specifically designed to restrict the transport of lithium ions therethrough nor to restrict the electrochemical reactions therebetween. In other words, the separator in a LIB primarily serves to electrically insulate the positive and negative electrodes from each other without interfering the transport of ions as part of the electrochemical reactions for charging and discharging. Thus, a separator for a LIB is designed freely transport the lithium ions between the electrodes. In contrast, in the sealed redox battery according to embodiments, the redox active species are dissolved in the electrolyte, and the ion exchange membrane 112 (FIG. 2A) serves to electrically separate the positive and negative electrolytes and to prevent them from mixing with each other. In general, the ion exchange membrane 112 comprises a selective permeable membrane in which cations or anions are transported therebetween to balance the charge between the two half cells. For example, the ion exchange membrane may be configured to selectively pass therethrough cations or anions. Thus, in sealed redox batteries according to embodiments, since the electrolytes that store energy are liquids, without the ion exchange membrane 112, an electrical short by mixing of the positive and negative electrolytes occurs, regardless of whether the positive and negative electrodes contact each other. Therefore, in a sealed redox batteries according to embodiments, the first and second redox half reactions occur without substantial transfer of ions of the first redox couple or the second redox couple across the ion exchange membrane 112 separating the positive electrolyte reservoir 106A and the negative electrolyte reservoir 106B. As described herein, an ion exchange membrane 112 that substantially does not transfer ions of the redox couples refers an ion exchange membrane 112 that serves to substantially prevent the crossover of the electrolytes between the positive and negative electrolyte reservoirs 106A, 106B (FIG. 2A). Thus, a base material for the ion exchange membrane 112 may desirably be a membrane that blocks the movement of the redox species in the electrolyte, e.g., the V ions in a V redox battery, while selectively permitting the movement of other ions, e.g., $H^+$ ions in a V redox battery for the charge balance between the half cells. However, an ion exchange membrane 112 that substantially does not transfer ions of the redox couples can still permit unintended crossover, or limited intended mixing to relieve internal pressure build-up.

Bus Bars for Connecting Stacked Redox Battery Cells

As described above with respect to FIGS. 2A-2C, a plurality of redox battery cells, e.g., sealed redox battery cells, can be electrically connected, in electrical series or parallel, to scale one or more of voltage, power, and energy. FIGS. 3A-3D schematically illustrate redox batteries with electrical and mechanical connections for connecting a plurality of redox battery cells, according to some example implementations.

Figure 3A:
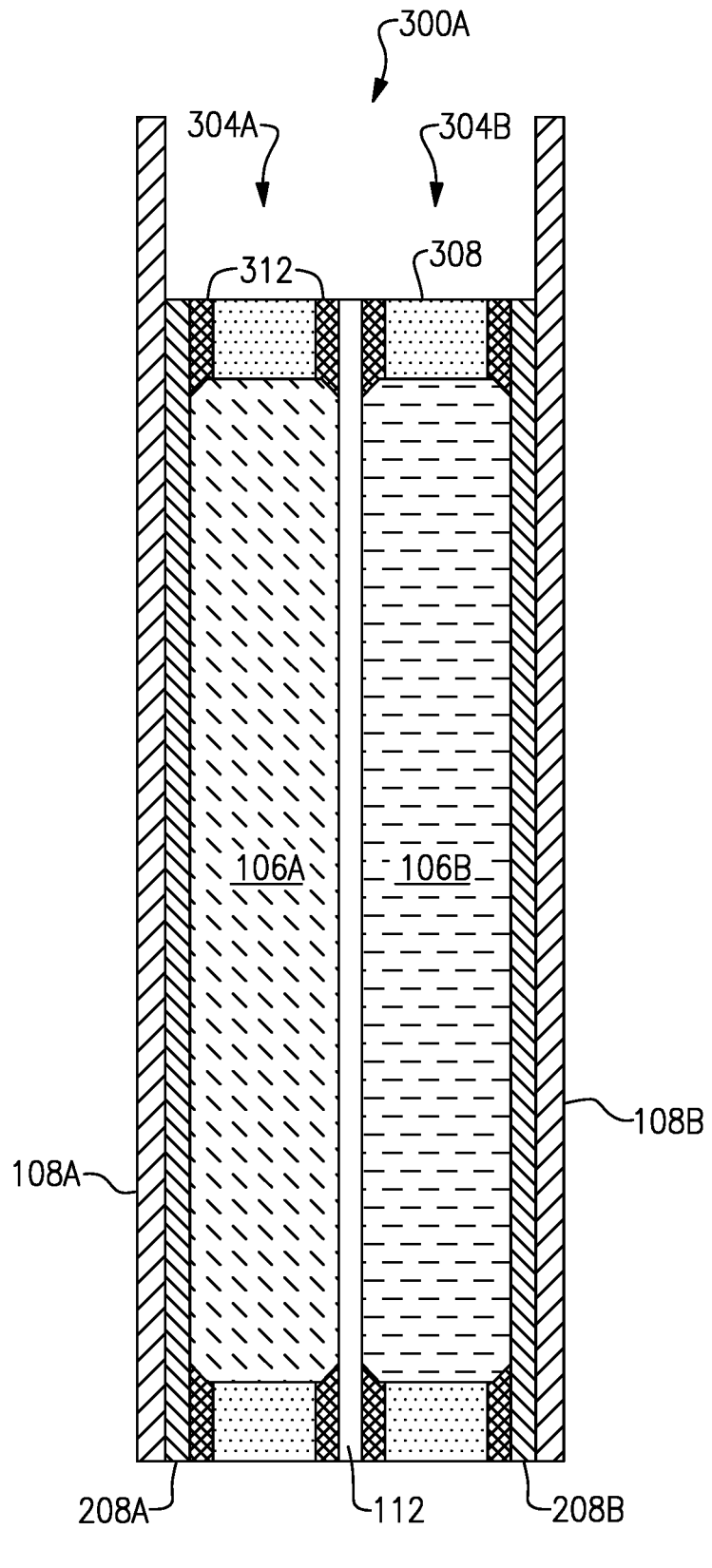
FIGS. 3A-3D schematically illustrate redox batteries with electrical and mechanical connections for connecting a plurality of redox battery cells.

FIG. 3A shows various components for a single redox battery cell that are similar in some respects to those described above with respect to FIG. 2A. The single redox battery cell 300A in the cross sectional side view comprises a first half cell 304A and a second half cell 304B. In addition to the various corresponding components described above, the details of which are not repeated herein for brevity, the illustrated redox battery cell 300A additionally includes a mechanical frame or a casing 308 and a sealant 312 filling the gaps between the mechanical frame 308 and abutting components, including the bipolar plates 208A, 208B and the ion exchange membrane 112, thereby preventing the leakage of the electrolytes from the respective reservoirs 106A, 106B.

Figure 3B:
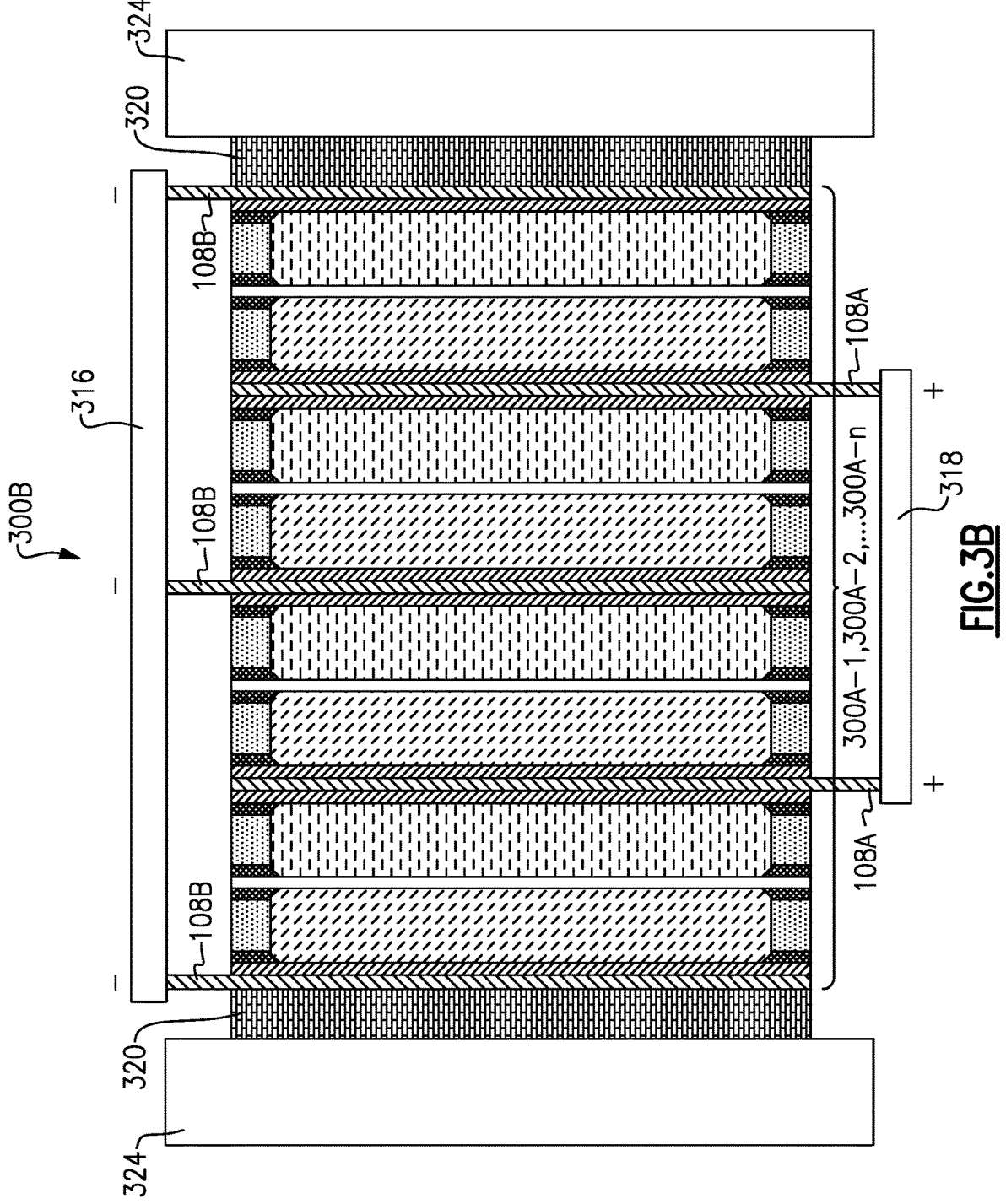

FIG. 3B shows a cross-sectional side view of a redox battery 300B including a stack of redox battery cells 300A-1, 300A-2, . . . , 300A-n that are arranged in a stacked configuration and electrically connected using bus bars 316, 318. The bus bar 316 may be a negative bus bar extending in a stacking direction over a top side surface of the stack, and the bus bar 318 may be a positive bus bar extending in the stacking direction over a bottom side surface of the stack. In a similar manner as the plurality of redox battery cells described above with respect to FIGS. 2B-2D, the illustrated redox battery cells 300A-1, 300A-2, . . . , 300A-n may be connected in electrical series to increase the output voltage. Furthermore, in some embodiments, the positive electrolyte reservoirs 106A of the plurality of redox battery cells 300A-1, 300A-2, . . . , 300A-n may be in fluidic communication with each other, and the negative electrolyte reservoirs 106B may be in fluidic communication with each other. The positive current collectors 108A are electrically connected to a positive bus bar 316 and the negative current collectors 108B are electrically connected to a negative bus bar 318. The illustrated redox battery 300B also includes an insulator 320 and a conductive end plate 324 on each end of the stack. Each of the positive and negative bus bars 316, 318 extend in a layer stack direction to electrically connect and overlap a plurality of cells.

Figure 3C:
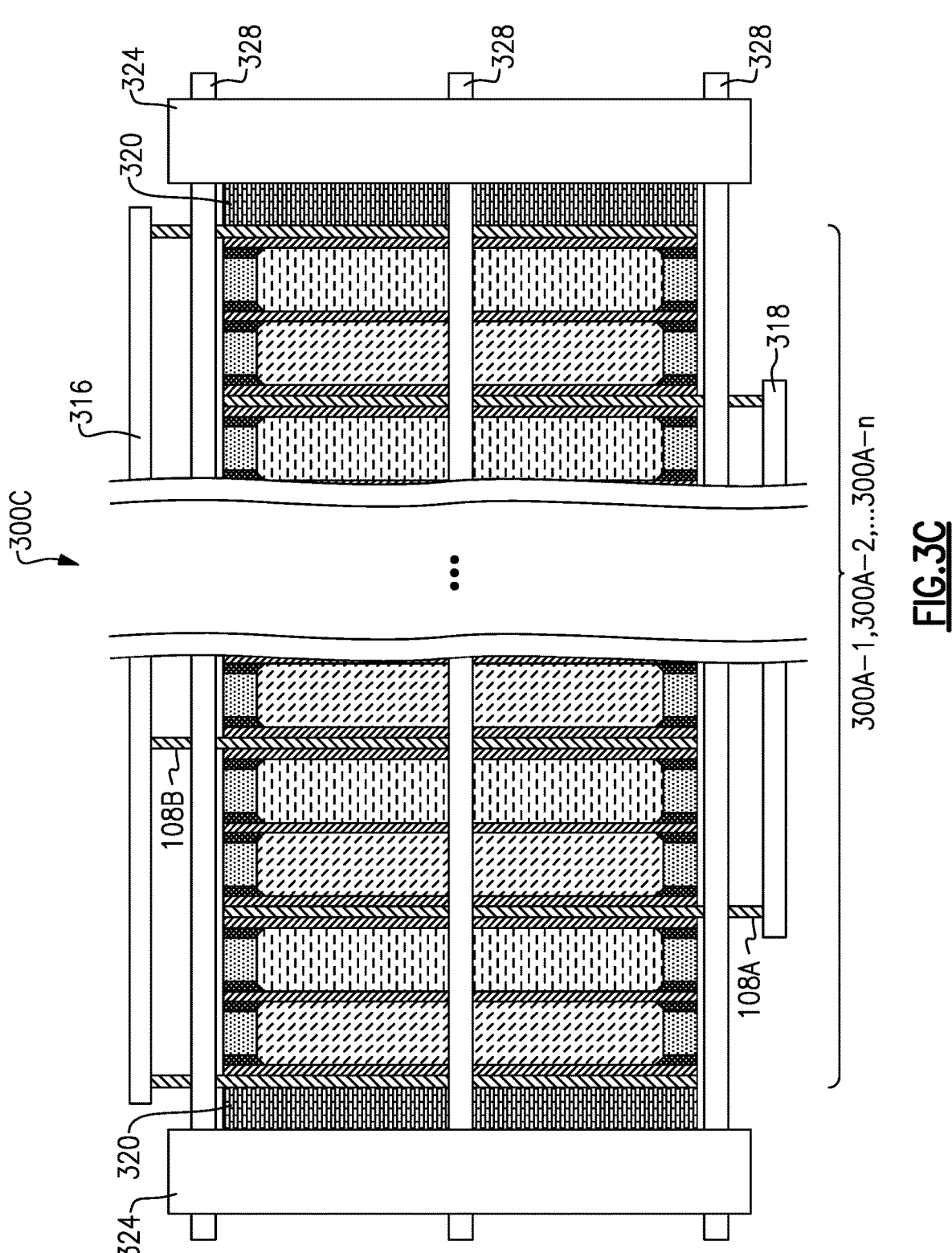

FIG. 3C shows a cross sectional side view of a redox battery 300C including a stack of redox battery cells 300A-1, 300A-2, . . . , 300A-n that are in a stacked configuration and electrically connected using the bus bars 316, 318, in a similar manner as the redox battery 300B illustrated in FIG. 3B, and descriptions of similar components are omitted herein for brevity. Unlike the illustrated example of FIG. 3B, in the illustrated redox battery 300C, in addition to the positive and negative bus bars 316 and 318 that are configured to provide for electrical connectivity across different redox battery cells 300A-1, 300A-2, . . . , 300A-n, separate mechanical connectivity means are provided for substantially holding or fastening the cells together to enhance the reliability thereof. For example, without a further fastening mechanism to compress the stack of redox battery cells, electrolytes may leak and/or the cells may become detached. Unlike the illustrated example illustrated in FIG. 3B, the redox battery 300C of FIG. 3C is physically held using fasteners 328, e.g., tie bars. That is, in addition to the positive and negative current collectors 108A, 108B that are electrically connected to positive and negative bus bars 316, 318, respectively, one or more fasteners 328 extend in the layer stack direction over a plurality of cells at one or more sides of the stack. The fasters 328 are fastened, anchored or fixed to conductive end plates 324 at both ends of the stack of cells using a suitable fastening mechanism, e.g., an adjustable fastening mechanism such as a screw mechanism. The fasteners 328 can be rigid or flexible and can have any suitable shape, e.g., a strap, line or rod. In the illustrated example, the fasteners 328 extend outside of the stack across four sides of the entire stack and further extends through the conductive end plates 324 and provides a compressive pressure therebetween. It will be appreciated that the fastener primarily serves the mechanical function of compressing the redox battery cells, and therefore can be formed of a suitable material, e.g., an elastic material that may not be electrically conductive.

Figure 3D:
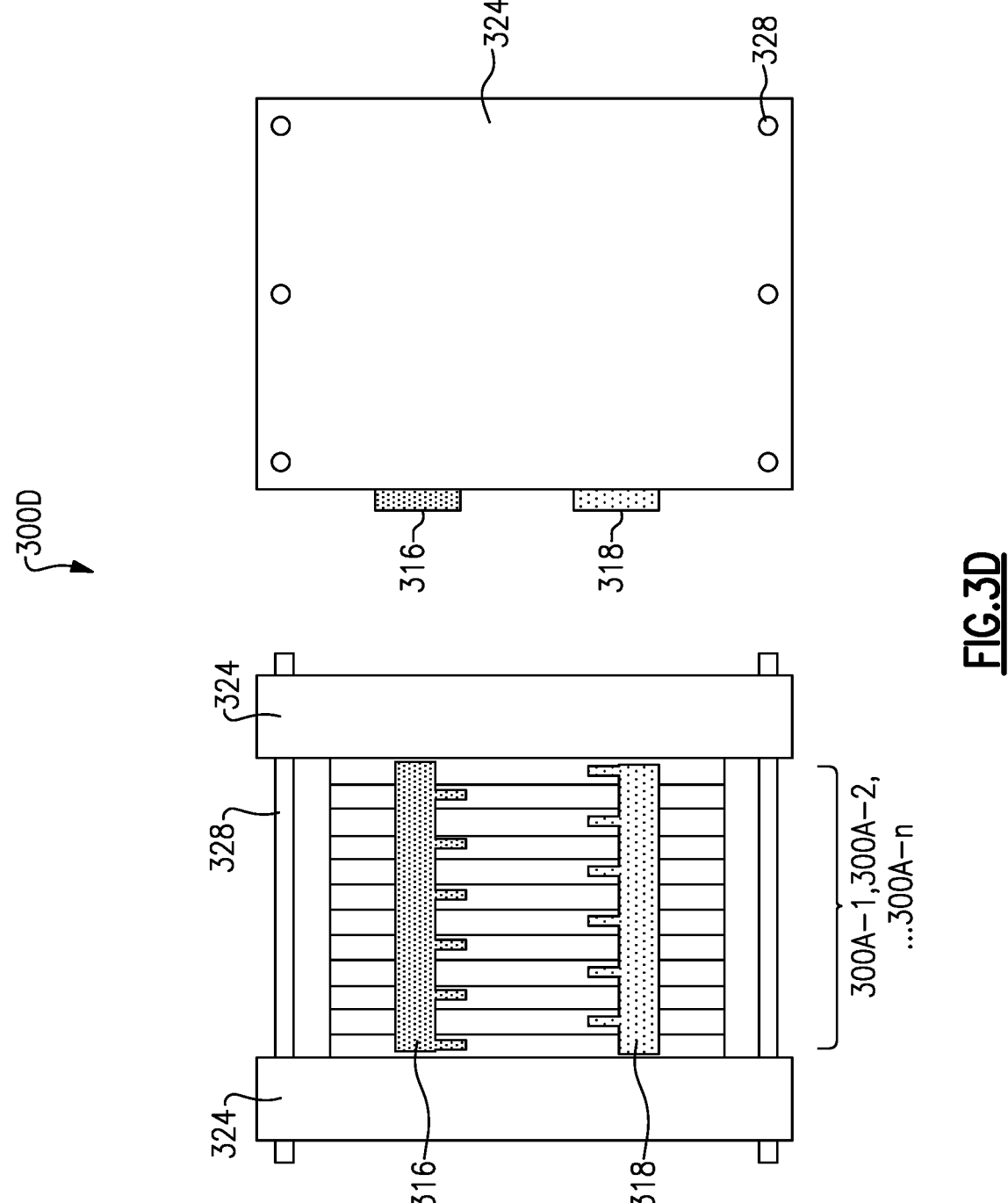

FIG. 3D shows a cross sectional side (left) and top (right) views of a redox battery 300D including a stack of redox battery cells 300A-1, 300A-2, . . . , 300A-n that are in a stacked configuration and electrically connected using the bus bars 316, 318. Except for the arrangement of the bus bars 316, 318, the redox battery 300C is arranged in a similar manner as the redox battery 300C illustrated in FIG. 3C, and descriptions of similar components are omitted herein for brevity. Unlike the redox battery 300C (FIG. 3C), in which the negative bus bar 316 and the positive bus bar 318 extend over opposing (top and bottom) sides of the stack of cells, in the illustrated redox battery cell 300D, the bus bars 316, 318 extend over the same (top) side of the stack of cells. The fasteners 328 extend over opposing sides over which bus bars 316, 318 do not extend.

The inventors have discovered that, for various reasons including reduction in the size and complexity of the plurality of integrated redox battery cells in a stacked configuration, there can be substantial advantage to consolidate both mechanical and electrical functions of bus bars to simplify the integration of the redox battery cells into a stack. Thus, in the following, various embodiments are described in which bus bars serve to electrically connect multiple cells while simultaneously serving as mechanical fasteners.

FIGS. 4A-4D schematically illustrate redox batteries including bus bars that serve as both electrical and mechanical/structural connections for connecting a plurality of redox battery cells. In each of FIGS. 4A-4D, in a similar manner as described above with respect to FIGS. 3A-3D, the illustrated redox batteries 400A-1, 400A-2, 400B, 400C and 400D comprise a plurality of redox battery cells 300A-1, 300A-2, . . . , 300A-n that are stacked in a stacking direction, wherein each of the redox battery cells 300A-1, 300A-2, . . . , 300A-n comprises a first half cell 304A contacting a positive current collector 108A, a second half cell 304B contacting a negative current collector 108B and an ion exchange membrane 112 separating the first and second half cells 304A, 304B. In addition, the redox batteries comprise one or more positive conducting bus bars extending lengthwise in the stacking direction and electrically connecting the positive current collectors 108A of the redox battery cells 300A-1, 300A-2, . . . , 300A-n, e.g., in parallel, and one or more negative conducting bus bars extending lengthwise in the stacking direction and electrically connecting the negative current collectors 108B of the redox battery cells 300A-1, 300A-2, . . . , 300A-n, e.g., in parallel. The descriptions of components that are configured similarly to those of the batteries of FIGS. 3A-3D are omitted herein for brevity. However, unlike the configurations described above and conventional configurations, in the redox batteries 400A-1, 400A-2, and 400B-400D illustrated in FIGS. 4A-4D, in addition to providing electrical connectivity between a plurality of redox battery cells, one or both of the positive and negative bus bars are additionally configured as fastening means for mechanically fastening the stacked redox battery cells 300A-1, 300A-2, . . . , 300A-n in the stacking direction.

The inventors have discovered that, when the positive bus bar(s) and the negative bus bar(s) provide a compressive force greater than about 1,000N, 5,000N, 10,000N, 15,000N, 20,000N or a value in a range defined by any of these values, the bus bars can provide adequate fastening compressive pressure to effectively hold the stack together. In these configurations, a separate fastener such as the fasteners 328 described above with respect to FIGS. 3C and 3D may not be needed and therefore be advantageously omitted for compact integration of the redox battery cells.

Figure 4A:
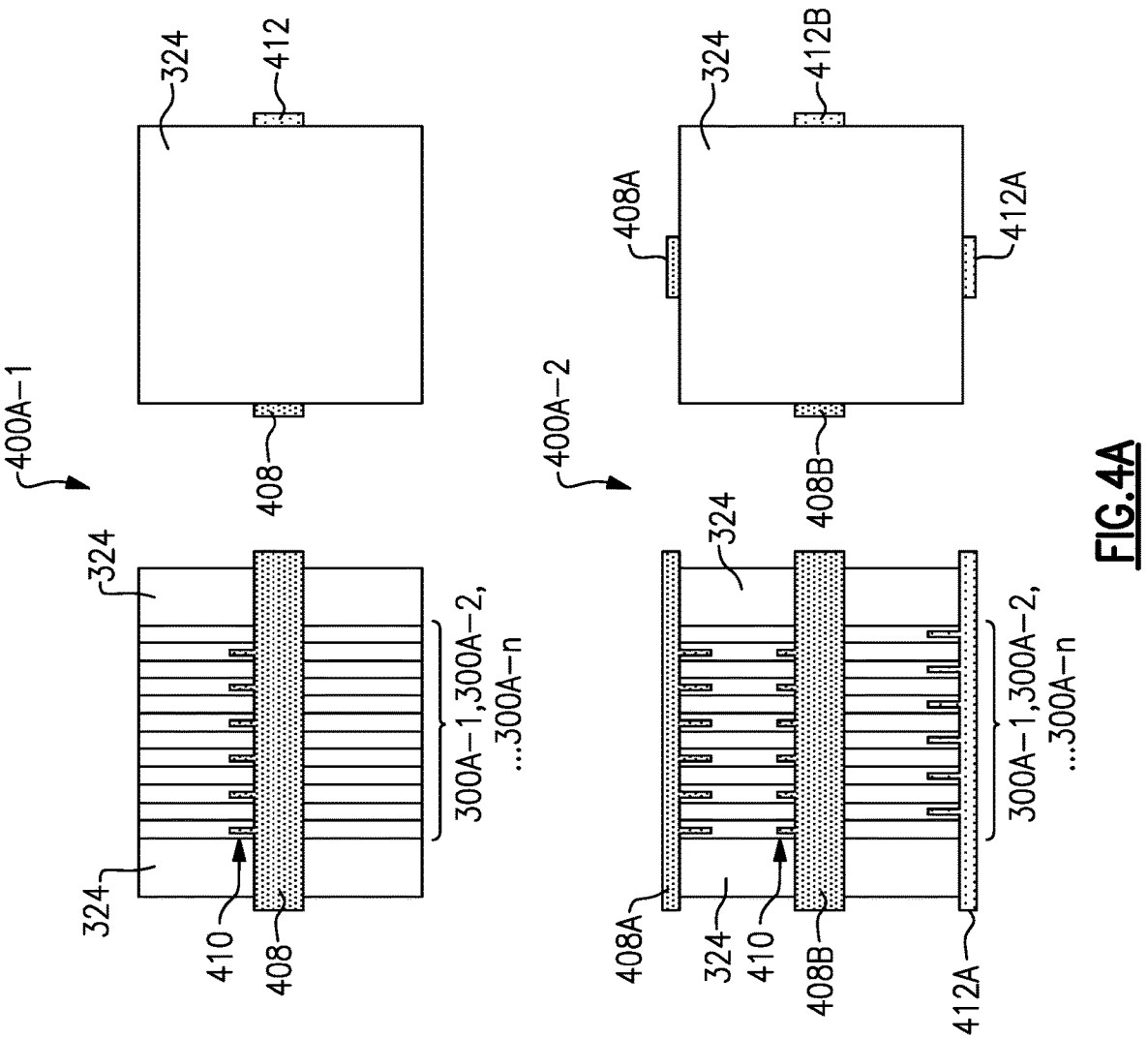
FIGS. 4A-4D schematically illustrate redox batteries with bus bars that serve as both electrical and mechanical connections for connecting a plurality of redox battery cells, according to embodiments.

The bus bar(s) can be disposed on any of the sides of the stack of redox battery cells. FIG. 4A shows side and top views of redox batteries 400A-1, 400A-2 having different configurations of the bus bars. Referring to the upper configuration illustrated in FIG. 4A, the redox battery 400A-1 comprises the positive and negative bus bars 408, 412 that are disposed on opposing sides of the stack. Referring to the lower configuration illustrated in FIG. 4A, the redox battery 400A-2 comprises a pair of positive bus bars 408A, 408B having one polarity disposed on adjacent sides that share an edge, while a pair of negative bus bars 412A, 412B having the other polarity disposed on opposing adjacent sides that share an opposite edge. In addition to serving as electrical connections between redox battery cells and/or batteries, the bus bars according to various embodiments can simultaneously serve as fastening means to provide the fastening or compressive force to the stack of redox battery cells, as described herein. In the illustrated configurations in FIG. 4A, the fastening or compressive force can be provided through a plurality of contact points 410 at which the bus bars 408A, 408B are fixedly or removably attached to a plurality of redox battery cells. The bus bars 408A, 408B can be configured such that they exert a compressive force across the stack in the stacking direction. The compressive force can be provided by a number of alternative suitable structures, as described below.

Figures 4B, 4C, 4D:
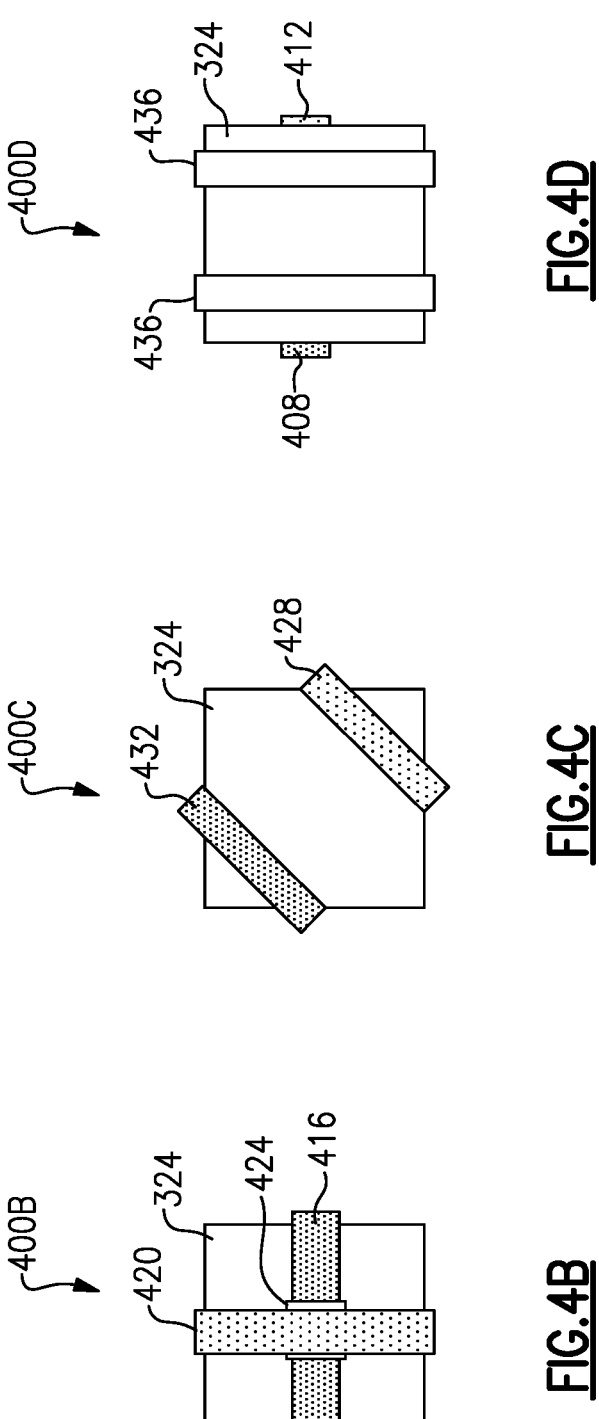

FIGS. 4B-4D show top views of redox batteries 400B-400D with bus bars that serve as both electrical and mechanical connections for connecting a plurality of redox battery cells, according to alternative embodiments. In the configurations illustrated in FIGS. 4B-4D, the bus bars serve as fastening means for compressing the stack in the form of a fastening strip forming a loop around the stacked redox battery cells along the stacking direction. The loop is formed around opposing side surfaces and outer major surfaces of the first and second conductive end plates.

In the configuration shown in FIG. 4B illustrating the redox battery 400B, the positive and negative bus bars 416, 420 form loops around the stack of redox battery cells in a lengthwise direction of the stack. The planes formed by the loops of the positive and negative bus bars 416, 420 cross each other, such that the positive and negative bus bars 416, 420 cross each over the outer major surfaces of the first and/or second conductive end plates 324. Because the bus bars also serve to electrically connect cells, the positive and negative bus bars 416, 420 may be electrically insulated from each other as shown, e.g., by an insulator 424 interposed between the positive and negative bus bars 416, 420 at the juncture therebetween.

In the configuration shown in FIG. 4C illustrating the redox battery 400C, the positive and negative bus bars 428, 432 form loops around the stack of redox battery cells in a lengthwise direction of the stack. However, unlike the arrangement illustrated in FIG. 4B, the positive and negative bus bars 428, 432 do not cross each other over the outer major surfaces of the first and second conductive end plates 324. Instead, each of the loops is formed around adjacent side surfaces and an adjoining edge thereof, as well as the corners of outer major surfaces of the first and second conductive end plates 324. Advantageously, because the positive and negative bus bars 428, 432 do not cross each other, an insulation such as that shown in FIG. 4B may not be needed and therefore be omitted.

In the configuration shown in FIG. 4D illustrating redox battery 400D, the positive and negative bus bars 408, 412 may not form a loop. Instead, in a similar manner as the redox battery 400A described above, the positive and negative bus bars 408, 412 are disposed on opposing sides of the stack. In addition, in the illustrated configuration, to provide additional fastening force, separate fastening strips 436 may form loops around the cell stack to provide the compressive force.

Redox Batteries Having Bus Bars Electrically Integrated with Conducting End Plates In existing stacked configuration of redox batteries, the end plates serve structural functions, e.g., providing compressive pressure to the stack of redox battery cells. For example, as described above with respect to FIGS. 3A-3D, the conductive end plates can be used to anchor fasteners thereto for applying compressive pressure to the stack. However, embodiments are not so limited, and the inventors have discovered that that the conductive end plates can be configured to additionally serve electrical functionalities. The conductive end plates can be formed of an electrically conductive material and can be electrically connected with the bus bars as part of an overall electrical network connecting the redox battery cells and/or batteries. For example, the conductive end plates can serve as positive or negative contact pads, which can in turn serve as connecting points for stacking multiple stacks of redox battery cell. Thus, in the following, various embodiments of conductive end plates are described, which can be electrically integrated with bus bars as part of a network of connection paths for redox battery cells.

FIGS. 5A-5F schematically illustrate redox batteries 500A-500F with electrically conductive end plates disposed at opposing ends of the stack of redox battery cells and electrically connected to bus bars, according to embodiments. In each of FIGS. 5A-5F, in a similar manner as described above with respect to FIGS. 4A-4D, redox batteries 500A-500F comprise a plurality of redox battery cells 300A-1, 300A-2, . . . , 300A-n that are stacked in a stacking direction, wherein each of the redox battery cells comprises a first half cell 304A contacting a positive current collector 108A, a second half cell 304B contacting a negative current collector 108B and an ion exchange membrane 112 separating the first and second half cells in a manner similar manner to the redox batteries described above with respect to FIGS. 3A-3D, the details of which are omitted herein for brevity. In addition, the redox batteries 500A-500F comprise a positive conducting bus 512 bar extending in the stacking direction and electrically connecting the positive current collectors 108A of the redox battery cells 300A-1, 300A-2, . . . , 300A-n, e.g., in parallel, and a negative conducting bus bar 516 extending in the stacking direction and electrically connecting the negative current collectors 108B of the redox battery cells 300A-1, 300A-2, . . . , 300A-n, e.g., in parallel. In a similar manner as the configurations described above with respect to FIGS. 4A-4D, in addition to providing electrical connectivity, the bus bars may also serve as fastening means for mechanically fastening the stacked redox battery cells in the stacking direction. However, unlike the configurations described above and conventional configurations, the redox batteries 500A-500F illustrated in FIGS. 5A-5F further comprise a first conductive end plate 504, e.g., a positive conductive end plate, and a second conductive end plate 508, e.g., a negative conductive end plate, disposed at opposing ends of the stacked redox battery cells 300A-1, 300A-2, . . . , 300A-n, wherein the first conductive end plate 504 is electrically conductive and connected to the positive conducting bus bar 512, and wherein the second conductive end plate 508 is electrically conductive and connected to the negative conducting bus bar 516. The illustrated bus bars are securely connected at both ends to the conductive end plates 504, 508 to provide, among other things, compressive force and pressure to the stack of cells in a stacking direction.

In a similar manner as the configurations described above with respect to FIGS. 4A-4D, the positive bus bar(s) 512 and the negative bus bar(s) 516 can provide fastening means such as a fastening strip. Also similarly, the bus bars 512, 516 can provide a compressive force in the stacking direction of the redox battery cells that is greater than about 1,000N, 5,000N, 10,000N, 15,000N, 20,000N or a value in a range defined by any of these values, to provide adequate fastening compressive pressure to effectively hold the stack together and prevent the leakage of electrolytes. In these configurations, the bus bars 512, 516 can provide sufficient compressive pressure, and a separate fastener such as that described above with respect to FIG. 3C may not be needed and therefore can be omitted.

Figure 5A:
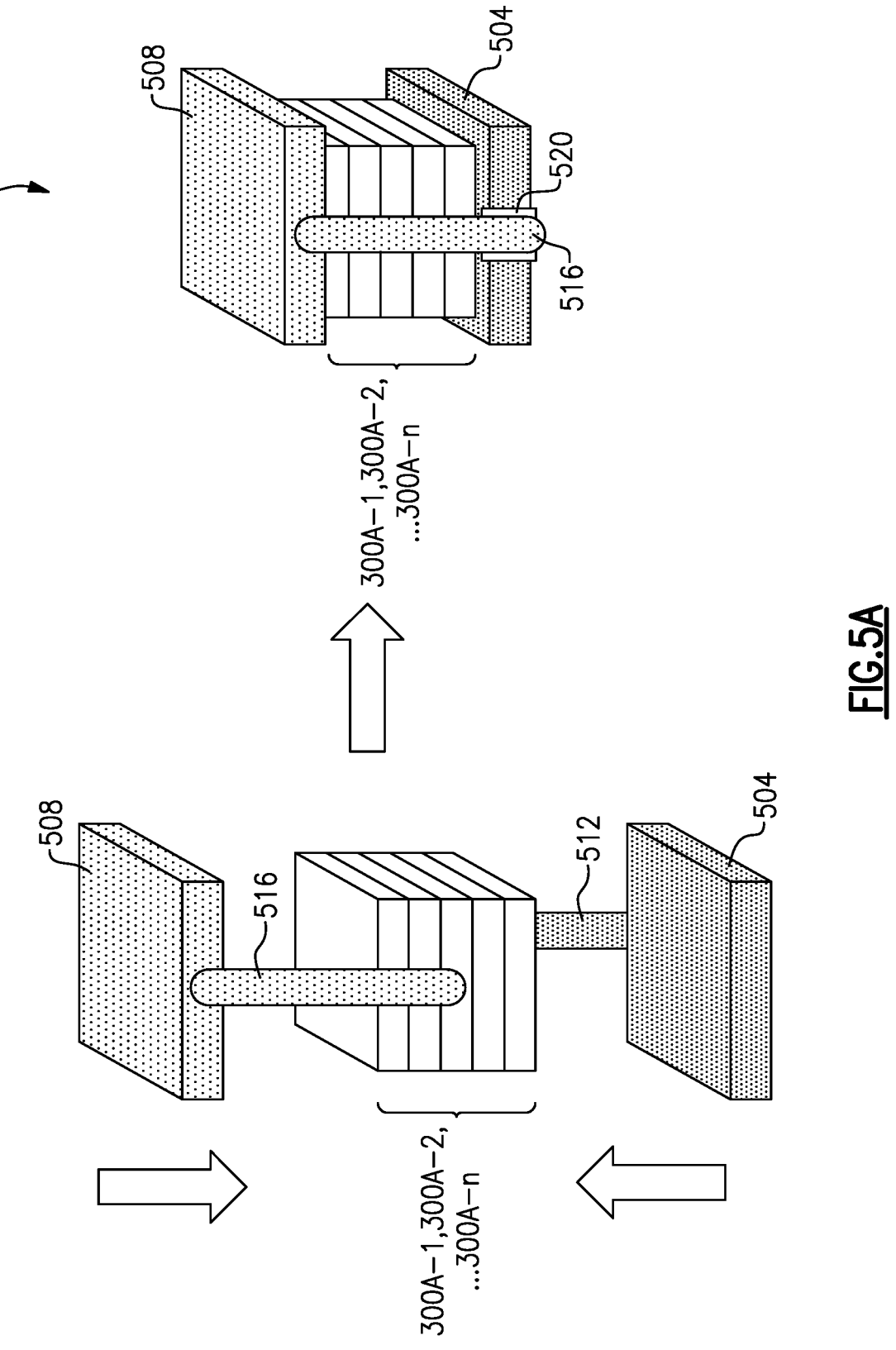
FIGS. 5A-5F schematically illustrate redox batteries each comprising a stack of redox battery cells between electrically conductive end plates connected to bus bars, according to embodiments.

The bus bar(s) can be disposed on any of the sides of the stack of redox battery cells. For example, referring to FIG. 5A illustrating redox battery 500A, the positive and negative bus bars 512, 516 can be disposed on opposing sides of the stack of redox battery cells. In the illustrated embodiment, the upper conductive end plate is electrically connected to the negative bus bar 516 and serves as a negative conductive end plate 508, and the lower conductive end plate is electrically connected to the positive bus bar 512 and serves as a positive conductive end plate 504. Each bus bar is directly connected to the conductive end plate having the same polarity, while being physically connected to but electrically insulated from the conductive end plate having the opposite polarity. Thus, the positive bus bar 512 is mechanically fixed to both first (lower) and second (upper) conductive end plates 504, 508, thereby serving as fastening means for mechanically fastening the stacked redox battery cells 300A-1, 300A-2, . . . , 300A-n in the stacking direction, while being electrically connected only to the first (lower) conductive end plate serving as the positive conductive end plate 504. Similarly, the negative conducting bus bar 516 is mechanically fixed to both first (lower) and second (upper) conductive end plates 504, 508, thereby serving as fastening means for mechanically fastening the stacked redox battery cells 300A-1, 300A-2, . . . , 300A-n in the stacking direction, while being electrically connected only to the second (upper) conductive end plate serving as the negative conductive end plate 508.

Figure 5B:
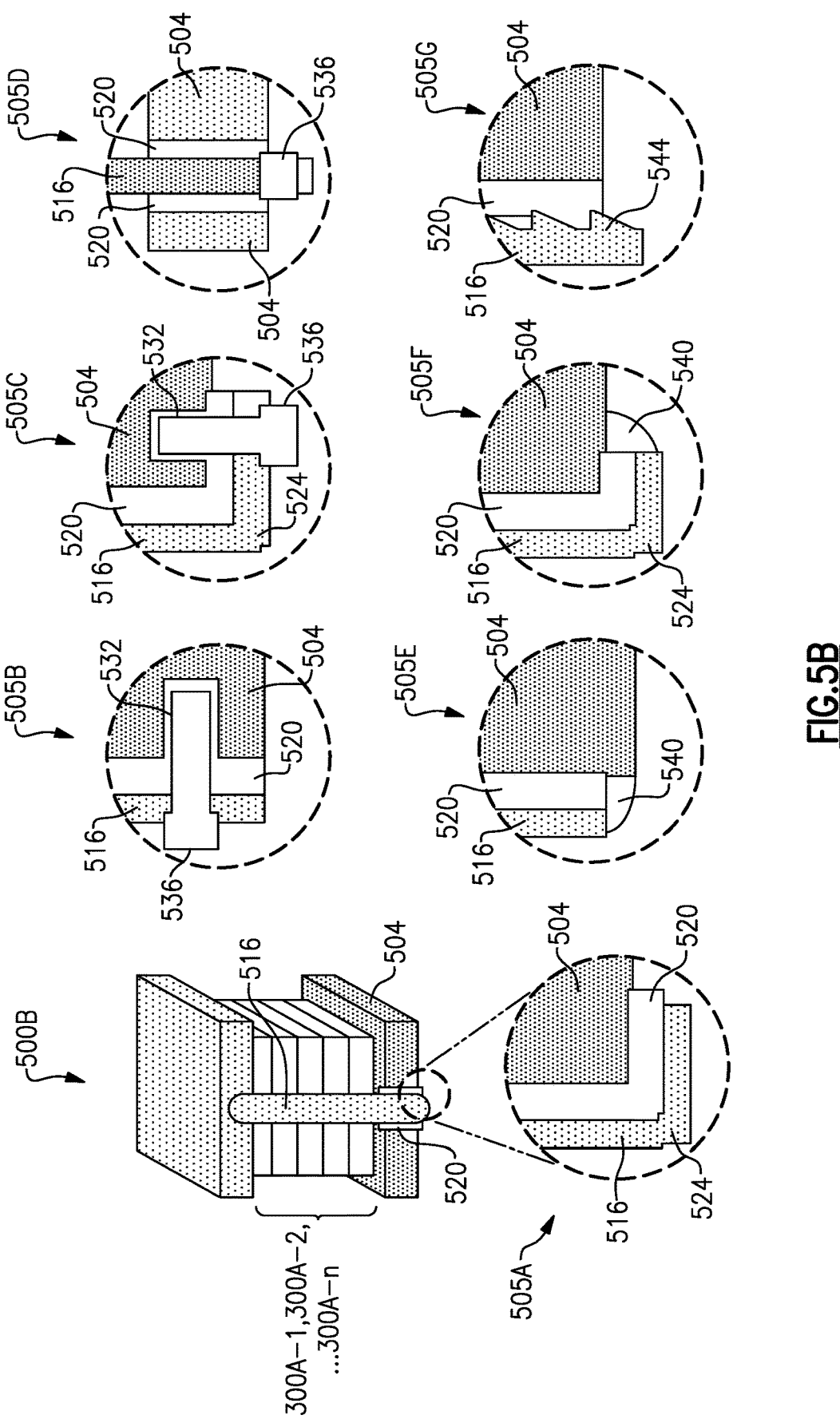

To serve as effective fastening means, the conducting bus bars 512, 516 can be fixedly connected or attached to the conductive end plates using suitable means. It will be appreciated that one of the ends of a bus bar having the same polarity as the conductive end plate can be attached to provide a high strength connection using a suitable technique such as welding. However, the other of the ends of the bus bar having the opposite polarity as the conductive end plate may not be welded, in order to maintain electrical insulation. FIG. 5B illustrates several example implementations of coupling or fixing means 505A-505G that can provide a high strength connections between bus bars 512, 516 and conductive end plates 504, 508 having opposite polarities. The high strength mechanical coupling means can include, without limitation, one or more of an L-shaped brace 524, a screw, a pin 532, a bolt 536, an adhesive or weld 540, a jagged or sawtooth-shaped anchor 544 and the like, as illustrated. The coupling means is used in conjunction with an insulator 520 to maintain electrical isolation between the bus bars 512, 516 and conductive end plates 504, 508 having opposite polarities. As illustrated, the mechanical coupling means can fix the bus bar 516 to one or both of side and bottom surfaces of the conductive end plate 504.

Figure 5D:
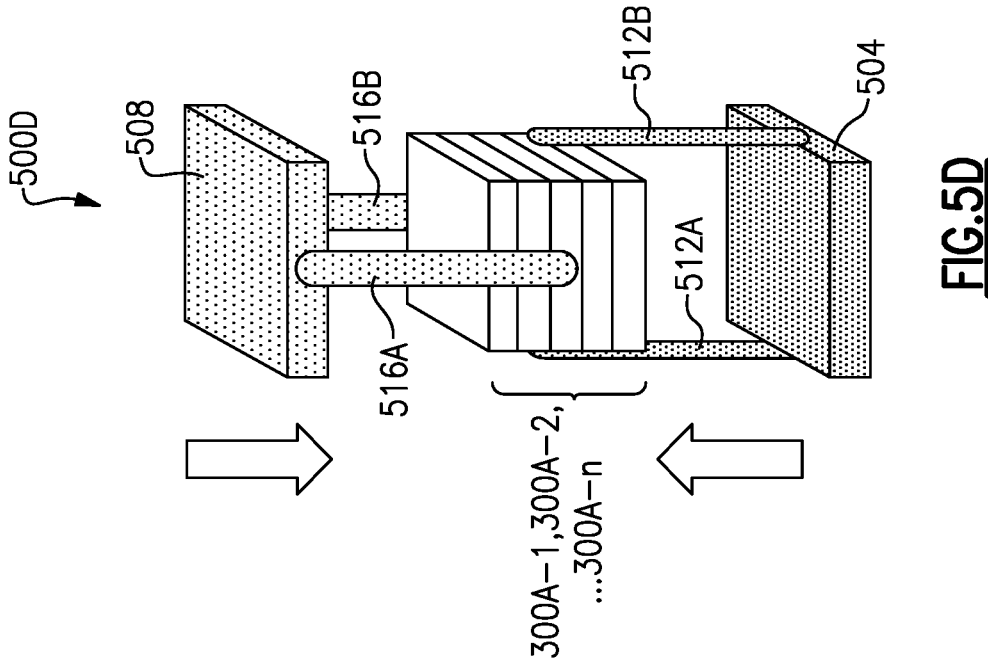
Figure 5C:
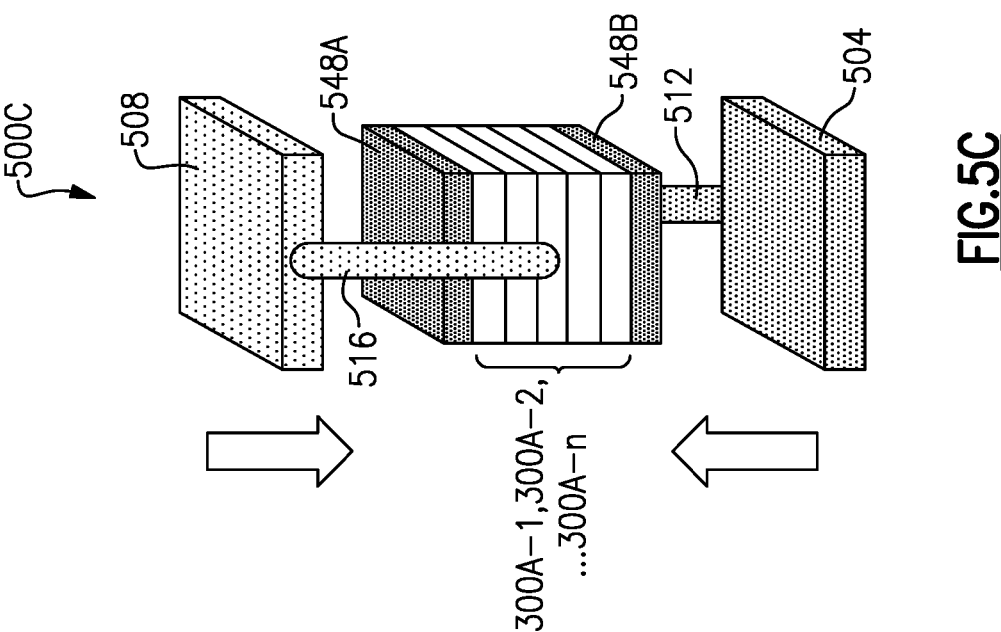

Referring to FIG. 5C, the illustrated redox battery 500C with electrically conductive end plates 504, 508 connected to bus bars 512, 216 is similar to that described above with respect to FIG. 5A, wherein the positive and negative conducting bus bars 512, 516 are disposed on opposing sides of the stack of redox battery cells 300A-1, 300A-2, . . . , 300A-n. Unlike the configuration of FIG. 5A, however, the illustrated redox battery 500C additionally includes insulating layers 548A, 548B between each conductive end plate 504, 508 and the closest cell of the stack of redox battery cells 300A-1, 300A-2, . . . , 300A-n. The insulating layers 548A, 548B may be inserted to provide additional electrical insulation between the cell stack 300A-1, 300A-2, . . . , 300A-n and the conductive end plates 504, 508, for improved safety in operation. In addition, the insulating layers 548A, 548B may further provide a mechanical functionality similar to that of a conductive end plate, including providing additional connection points for the bus bars 512, 516 to support the compressive force or pressure maintained in the cell stack.

Referring to FIG. 5D, the illustrated redox battery 500D is configured similarly as that described above with respect to FIG. 5C except, in the redox battery 500D, a pair of negative conducting bus bars 516A, 516B are disposed on a pair of opposing sides of the stack of redox battery cells 300A-1, 300A-2, . . . , 300A-n, and a pair of positive conducting bus bars 512A, 512B are disposed on another pair of opposing sides of the stack of redox battery cells 300A-1, 300A-2, . . . , 300A-n.

Figure 5F:
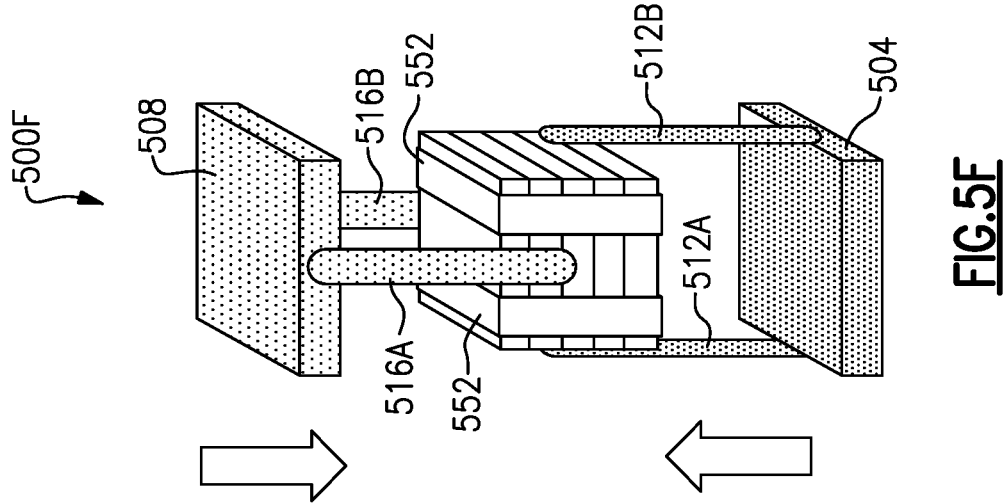
Figure 5E:
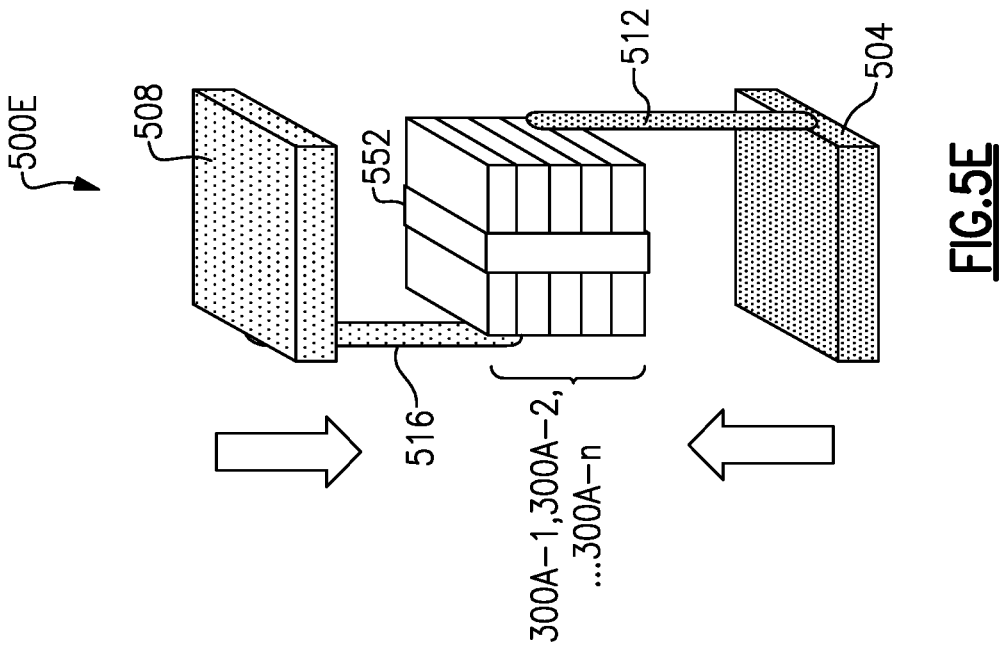

As described above with respect to FIGS. 4A-4D, the bus bars that are electrically connected to conductive end plates as described with respect to FIGS. 5A-5D may be configured to provide adequate compressive force and pressure across the stack of redox battery cells, e.g., to prevent leakage of electrolytes and/or to hold the cells together without being separated. As such, in some configurations, additional independent fastening means that do not provide electrical connectivity may be omitted. However, in some other configurations, additional supporting fastening means may be provided. FIGS. 5E and 5F illustrate redox batteries 500E, 500F with electrically conductive end plates 504, 508 securely connected to bus bars in a manner similar to that described above with respect to FIGS. 5C and 5D, respectively, to provide, among other things, a compressive force and pressure to the stack of cells 300A-1, 300A-2, . . . , 300A-n in the stacking direction. In addition, the illustrated redox batteries 500E, 500F additionally provide additional independent fastening means, e.g., one or more fastening tie strips or bands 552, that can be wound to form a loop around the stack in the stacking direction to provide additional compressive force and pressure to the stack of cells 300A-1, 300A-2, . . . , 300A-n. In the illustrated configuration of FIG. 5E, the fastening tie strip 552 forms a loop in a plane extending in the stacking direction or extension direction of the bus bars 512, 516. However, embodiments are not so limited and in other configurations, the fastening tie strips 552 can form a loop in a different plane, e.g., a plane crossing or perpendicular to the plane of the illustrated loop formed by the fastening tie strip 552. In the illustrated configuration of FIG. 5F, the fastening tie strips 552 form a loop in a plane parallel to the extension direction of the bus bars 512A, 512B. As described above with respect to the fastener in FIGS. 3C, 3D and 4D, the fastening tie strips 552 can serve to substantially provide sufficient mechanical force and pressure to hold the stacks together, without serving to provide electrical connections between the redox battery cells or batteries. As such, the fastening strips 552 can be formed of an electrically insulating material, e.g., polymeric material.

Figure 5G:
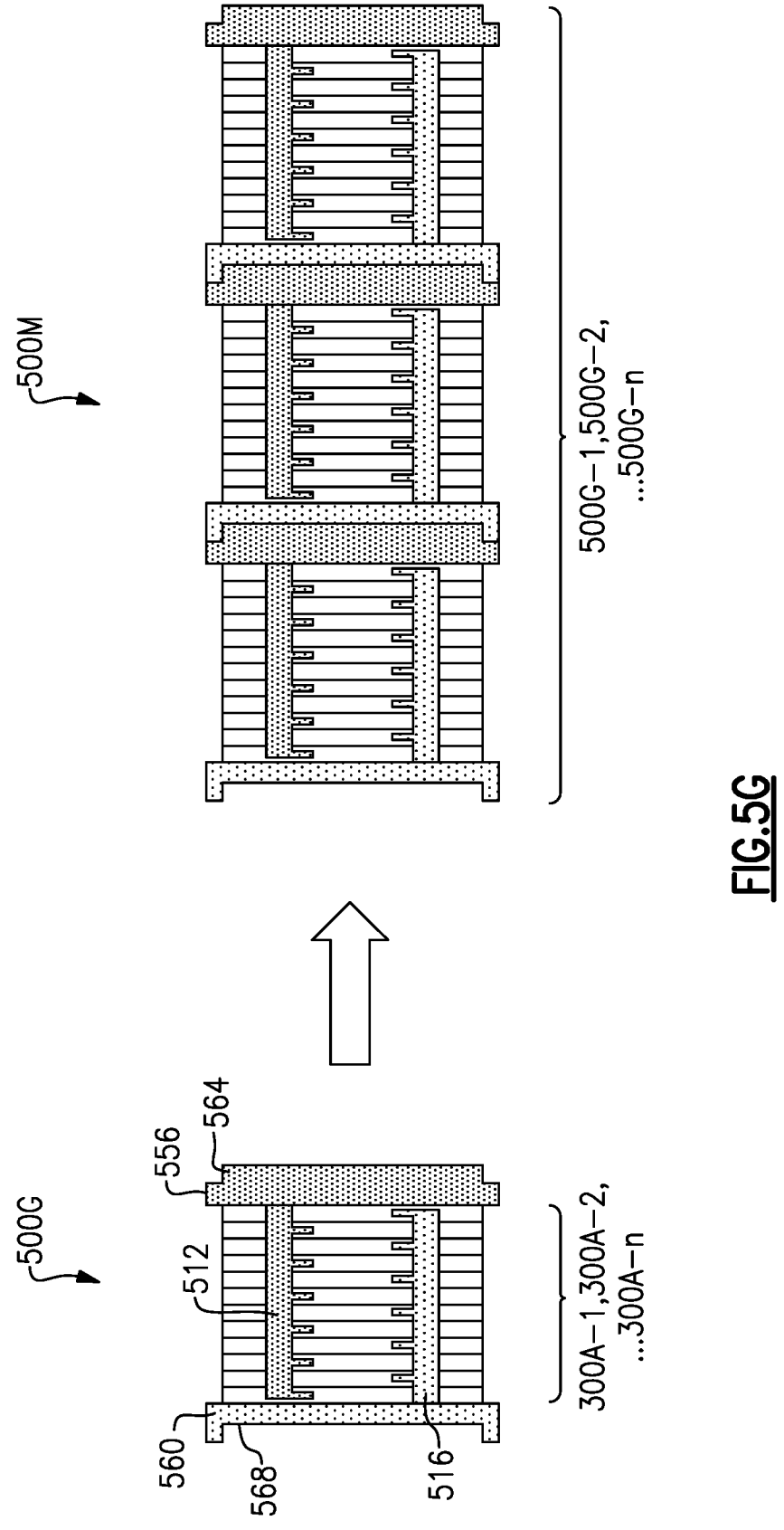
FIGS. 5G-5I schematically illustrate a plurality of redox batteries each comprising a stack of redox battery cells between conductive end plates, wherein the redox batteries themselves are stacked and electrically connected through conductive end plates, according to embodiments.
Figure 5H:
Figure 5I:

As described above, electrically conductive end plates 504, 508 can enable, among other things, a plurality of redox battery cells to be integrated with bus bars to provide electrical and mechanical functionalities. Further, according to various embodiments, the conductive end plates can be configured such that they further enable mechanical and electrical integration of a plurality of redox batteries. FIGS. 5G-5I schematically illustrate a plurality of redox batteries each comprising a stack of redox battery cells between a pair of conductive end plates, wherein the redox batteries themselves are stacked and electrically connected to each other through respective conductive end plates. Each of the redox batteries includes redox battery cells 300A-1, 300A-2, . . . , 300A-n between conductive end plates 556, 560. The individual ones of the redox batteries can be arranged according to any suitable configuration as described above, and the detailed description thereof is omitted for brevity.

In the example configuration of stacked redox batteries 500M shown in FIG. 5G, conductive end plates 556, 560 of immediately adjacent batteries having opposite polarities are coupled to each other, such that the batteries 500G-1, 500G-2, . . . , 500G-n are serially connected. The coupled ones of the conductive end plates 556, 560 may have suitable shapes to facilitate the mechanical coupling therebetween. The mechanical coupling may be such that the coupled conductive end plates 556, 560 are restricted in movement in at least one direction, e.g., one or both of the lateral directions orthogonal to the stacking direction of the redox battery cells. For example, referring to the illustrated redox battery 500G, pairs of positive and negative conductive end plates 556, 560 can be coupled through a protrusion 564 and a recess 568 that are shaped and sized to provide a snug fit therebetween, to prevent a lateral slippage and/or a secure vertical positioning of the vertically adjacent redox batteries.

In the example configuration of stacked redox batteries 500H shown in FIG. 5H, a plurality of vertical stacks or columns 510M-1, 510M-2, . . . , 510M-m of redox batteries are adjacently arranged in a lateral direction. Each of the vertical stacks 510M-1, 510M-2, . . . , 510M-m of redox batteries includes a plurality of redox batteries 500G-1, 500G-2, . . . , 500G-n each in turn comprising a stack of redox battery cells 300A-1, 300A-2, . . . , 300A-n as described above with respect to FIG. 5G. In the illustrated example, each of the columns 510M-1, 510M-2, . . . , 510M-m of redox batteries have the same number of redox batteries such that batteries at same vertical heights are arranged to form horizontal rows 510L-1, 510L-2, . . . , 510L-1 of redox batteries. Thus arranged, the vertical stacks 510M-1, 510M-2, . . . , 510M-m of redox batteries and the horizontal rows 510L-1, 510L-2, . . . , 510L-1 of redox batteries form a (mxn) array of redox batteries. The top conductive end plates 556 of each of the batteries having a first polarity may be electrically connected to each other through a top conductive parallel connect plate 572 of the first polarity. The bottom conductive end plates 560 of the batteries having a second polarity may be electrically connected to each other through a bottom conductive parallel connect plate 576 of the second polarity. A pair of side panels 580, which may be electrically insulating, may be disposed at and connected to both ends of the top and bottom conductive parallel connect plates 572, 576 and the vertical stacks 510M-1, 510M-2, . . . , 510M-m, thereby forming side panels of a rack structure to hold the (mxn) array of redox batteries in place. In this manner, the (mxn) array of redox batteries may be integrated into a single rack unit as illustrated. In the example illustrated in FIG. 5H, the redox batteries 500G-1, 500G-2, . . . , 500G-n in each vertical stack 510M-1, 510M-2, . . . , 510M-m are electrically connected in series, while adjacent vertical stacks are connected in electrical parallel by the he top and bottom conductive parallel connect plates 572, 576.

As described, the top and bottom conductive end plates 556, 560 of the redox batteries provide electrical and structural functionalities such that they enable efficient formation of arrays of redox batteries, such as the stacked redox batteries 500H described above with respect to FIG. 5H. It will be appreciated that alternative physical and electrical arrangements for forming an array of redox batteries are possible. By way of one alternative example, FIG. 5I shows one such alternative arrangement of stacked redox batteries 500I. The stacked redox batteries 500I are spatially arranged as a (mxn) array of redox batteries including vertical stacks or columns 510M-1, 510M-2, . . . , 510M-m of redox batteries and horizontal rows 510L-1, 510L-2, . . . , 510L-1 of redox batteries, in a spatially analogous manner as that described above with respect to FIG. 5H. However, unlike the stacked redox batteries 500H (FIG. 5H), in the stacked redox batteries 500I, the vertical stacks are not electrically connected in series. In the stacked redox batteries 500I, each of the redox batteries in vertically adjacent rows 510L-1, 510L-2, . . . , 510L-1 are electrically connected in parallel. This is achieved in part by flipping the redox batteries of every other row of redox batteries upside down such that vertically immediately adjacent ones of the redox batteries have conductive end plates having the same polarity that directly face each other are electrically connected to each other by a respective parallel connect plate. By way of illustration, in the stacked redox batteries 500I, the top conductive end plates 556 of the batteries of the first row 510L-1 having a first polarity are electrically connected to each other through a first conductive parallel connect plate 572A of the first polarity. In addition, the top conductive end plates 556 of the batteries of the second and third rows 510L-2, 510L-3 having the first polarity are electrically connected to each other through a second conductive parallel connect plate 572B of the first polarity. In an analogous manner, the bottom conductive end plates 560 of the batteries of the first and second rows 510L-1, 510L-2 having the second polarity are electrically connected to each other through a first conductive parallel connect plate 576A of the second polarity. In addition, the bottom conductive end plates 560 of the of the third row 510L-3 having the second polarity are electrically connected to each other through a second conductive parallel connect plate 576B of the second first polarity. Thus configured, all redox batteries of the stacked redox batteries 500I are electrically connected in parallel. It will be appreciated that, while two concrete example configurations of (mxn) arrays of redox batteries having different electrical configurations are demonstrated, a skilled artisan can make suitable modifications to form various other combinations of the redox batteries that may be physically stacked to form arrays having batteries that are electrically connected in any suitable combination of series and/or parallel connections.

As discussed above, the inventors have discovered that, according to various embodiments described above with respect to FIGS. 5A-5I, conductive end plates can be configured to serve as electrical connectors formed of an electrically conductive material that are connected with the bus bars as part of an overall electrical network of one or more redox batteries. In the example configurations described above with respect to FIGS. 5A-5I, conductive end plates having opposite polarities are disposed on opposite ends of the stacks of redox battery cells. However, embodiments are not so limited. In the configurations illustrated in FIGS. 5A-5I, because the bus bars have one of the polarities, one end of a bus bar is electrically and physical connected to one conductive end plate having one polarity, while the other end of the bus bar is physically but not electrically connected to the other conductive end plate having an opposite polarity. A physical-only (i.e., no electrical) connection can be achieved by, e.g., forming an electrical insulator between connection points (see, e.g., FIGS. 5A, 5B). In some designs, it may be desirable to omit physical-only connections between conductive end plates and bus bars, to enable easier integration by omitting the electrical insulators between bus bars and conductive end plates having opposite polarities and to improve the safety and reliability. In the following, various embodiments of conductive end plates that can be electrically integrated with bus bars as part of a network of connection paths for redox battery cell stacks are described, where the conductive end plates having the same polarity are formed on opposing sides of the redox battery cell stacks. Among other advantages, such configurations can enable omission of at least some physical-only connections between bus bars and conductive end plates for simplified integration of the redox battery cell stacks.

FIGS. 6A-6I schematically illustrate redox batteries 600A-600I with electrically conductive end plates connected to bus bars, according to alternative embodiments. In each of FIGS. 6A-6I, in a similar manner as described above with respect to FIGS. 5A-5F, each of redox batteries 600A-600I comprises a plurality of redox battery cells 300A-1, 300A-2, . . . , 300A-n that are stacked in a stacking direction, a detailed description of which is omitted herein for brevity. In addition, the redox batteries 600A-600I comprise a positive conducting bus bar extending in the stacking direction and electrically connecting the positive current collectors 108A of the redox battery cells 300A-1, 300A-2, . . . , 300A-n in parallel, and a negative conducting bus bar extending in the stacking direction and electrically connecting the negative current collectors 108B of the redox battery cells 300A-1, 300A-2, . . . , 300A-n in parallel. In a similar manner as the configurations described above with respect to FIGS. 5A-5F, the redox batteries 600A-600I illustrated in FIGS. 6A-6I further comprise conductive end plates that provide electrical functionalities, such as enabling electrical stacking of multiple redox battery cell stacks, as well as mechanical functionalities such as mechanical coupling mechanisms. However, unlike the redox batteries illustrated in FIGS. 5A-5F, the redox batteries 600A-600I illustrated in FIGS. 6A-6I further comprise conductive end plates having the same polarity formed on one or both ends of each of the battery cell stacks, or conductive end plates having opposite polarities formed on the same end of each of the battery cell stacks. The illustrated redox batteries 600A-600I comprise a first conductive end plate and a second conductive end plate, which may both have the same polarity, e.g., a positive polarity, disposed at opposing ends of the stacked redox battery cells, wherein the first and second conductive end plates are electrically conductive and connected to the positive conducting bus bar. The redox batteries 600A-600I further comprise a third conductive end plate and a fourth conductive end plate, which may both have the same polarity, e.g., a negative polarity, disposed at opposing ends of the stacked redox battery cells, wherein the third and fourth conductive end plates are electrically conductive and connected to the negative conducting bus bar. Alternatively worded, conductive end plates having opposite polarities may be formed at the send end of the stacked redox battery cells, or a given conductive end plate in the illustrated embodiments is split into at least two parts having opposite polarities. Thus configured, among other advantages, electrical connections of opposite polarities can be made to the same upper or lower side of the redox battery.

Figure 6A:
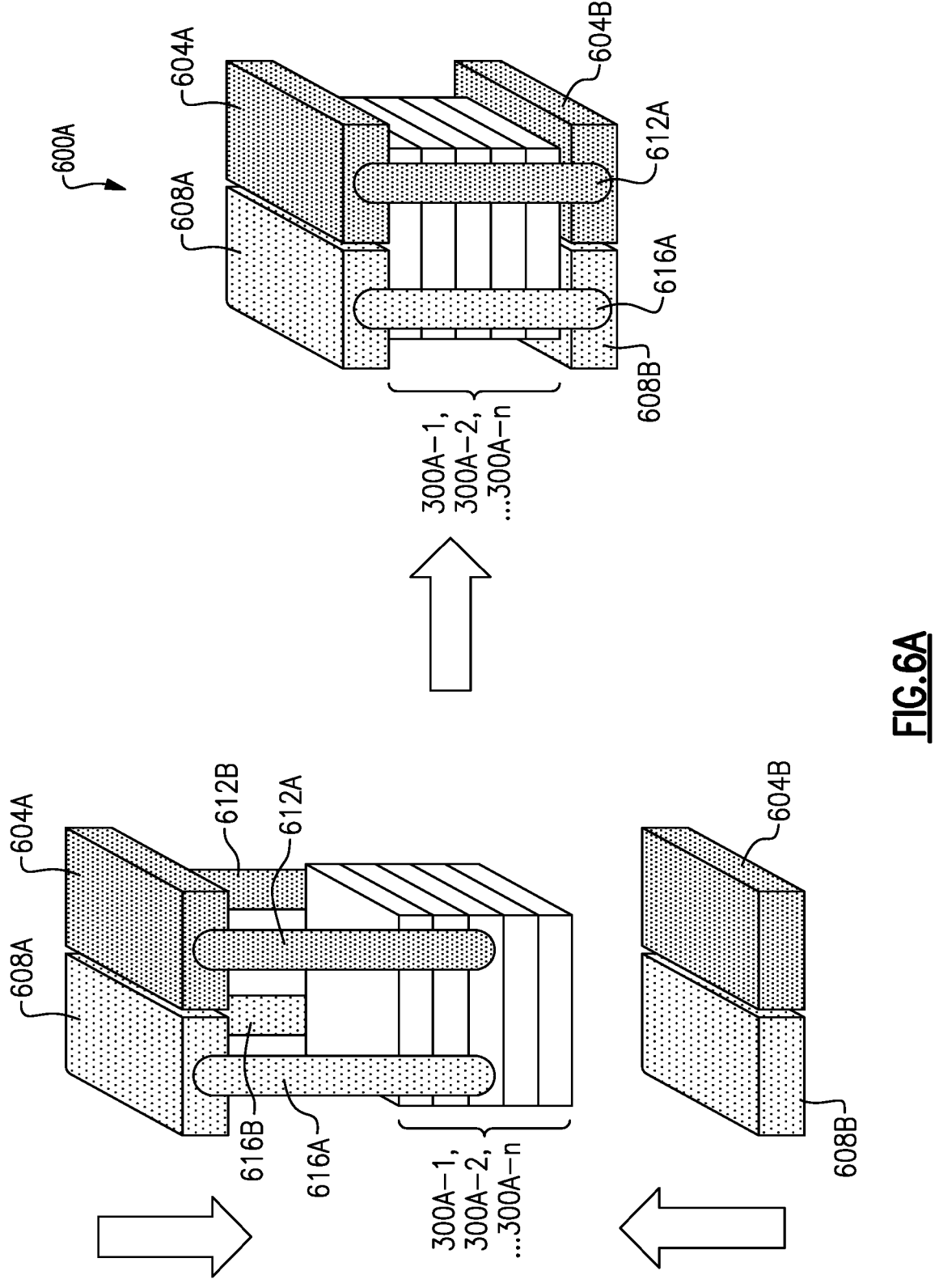
FIGS. 6A-6I schematically illustrate redox batteries with electrically conductive end plates connected to bus bars, according to some other embodiments.

Referring to the redox battery 600A shown in FIG. 6A, the first and third conductive end plates 604A, 608A are adjacently disposed on the same end, e.g., top end, of the stacked redox battery cells 300A-1, 300A-2, . . . , 300A-n. Because the first and third conductive end plates have opposite polarities, the first and third conductive end plates 604A, 608A may be electrically insulated from each other by a gap or an insulating layer therebetween (not shown). Similarly, the second and fourth conductive end plates 604B, 608B are electrically insulated from each other and adjacently disposed on the same end, e.g., bottom end, of the stacked redox battery cells 300A-1, 300A-2, . . . , 300A-n. Because the second and fourth conductive end plates have opposite polarities, the second and fourth conductive end plates 604B, 608B may also be electrically insulated from each other by a gap or an insulating layer therebetween (not shown). The first and third conductive end plates 604A, 608A may alternatively be referred to herein as being portions or parts of a split conductive end plate. Similarly, the second and fourth conductive end plates 604B, 60BA may alternatively be referred to herein as being portions or parts of a split conductive end plate.

Still referring to FIG. 6A, the positive conducting bus bars 612A, 612B are mechanically fixed and electrically connected to both first and second conductive end plates 604A, 604B, thereby serving as electrical connectors connecting positive current collectors, as well as fastening means for mechanically fastening the stacked redox battery cells 300A-1, 300A-2, . . . , 300A-n in the stacking direction. Similarly, the negative conducting bus bars 616A, 616B are mechanically fixed and electrically connected to both third and fourth conductive end plates 608A, 608B, thereby serving as electrical connectors connecting negative current collectors, as well as fastening means for mechanically fastening the stacked redox battery cells 300A-1, 300A-2, . . . , 300A-n in the stacking direction.

In a similar manner as the configurations described above with respect to FIGS. 4A-4D, the positive conducting bus bar(s) 612A, 612B and the negative bus bar(s) 616A, 616B can provide fastening means comprising a fastening strip. For example, the bus bars can provide a compressive force greater than about 1,000N, 5,000N, 10,000N, 15,000N, 20,000N or a value in a range defined by any of these values, to provide adequate fastening compressive pressure to effectively hold the stack together and to substantially prevent leakage of electrolytes. In some configurations, a separate fastener such as that described above with respect to FIG. 3C may not be needed and therefore can be omitted.

The bus bar(s) can be disposed over any of the sides of the stack. Referring to FIG. 6A, bus bars having the same polarity can be disposed on opposing sides of the stack. In the illustrated embodiment, the first and second (upper and lower) conductive end plates 604A, 604B having the positive polarity are electrically connected to the positive bus bars 612A, 612B on opposing side surfaces of the cell stack. Similarly, the third and fourth (upper and lower) conductive end plates 608A, 608B having the negative polarity are electrically connected to the negative bus bars 616A, 616B on opposing side surfaces of the cell stack. Unlike the arrangements illustrated with respect to FIGS. 5A-5F, each bus bar is directly connected, both physically and electrically, at both ends to the conductive end plates having the same polarity, thereby obviating a need for electrical insulation between the bus bar and a conductive end plate having opposite polarities. Thus, each bus bar 612A, 612B, 616A, 616B serves both as fastening means for mechanically fastening the stacked redox battery cells 300A-1, 300A-2, . . . , 300A-n in the stacking direction, while also serving as electrical connectors connected to conductive end plates on both sides of the stack having the same polarity as the bus bar. To serve as effective fasteners, the conducting bus bars can be connected to the conductive end plates using suitable means to provide high strength connections using a suitable technique such as welding, L-shaped brace, a screw, a pin, a bolt, an adhesive, a sawtooth-shaped anchor and the like, in a related manner as described above, e.g., FIG. 5B. While high strength mechanical coupling means such as an L-shaped brace, a screw, a pin, a bolt, an adhesive, a weld, a sawtooth-shaped anchor and the like, as illustrated in FIG. 5B may be used, an insulator to maintain electrical isolation between the bus bars and conductive end plates having opposite polarities may be omitted.

Figure 6C:
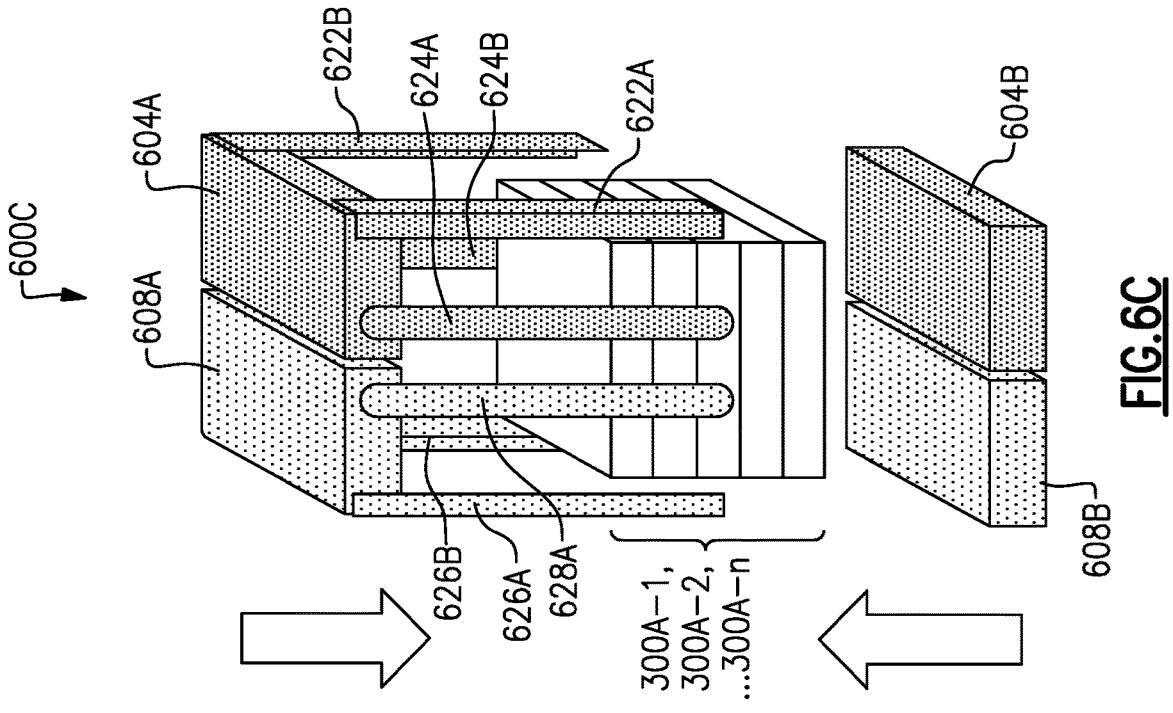
Figure 6B:
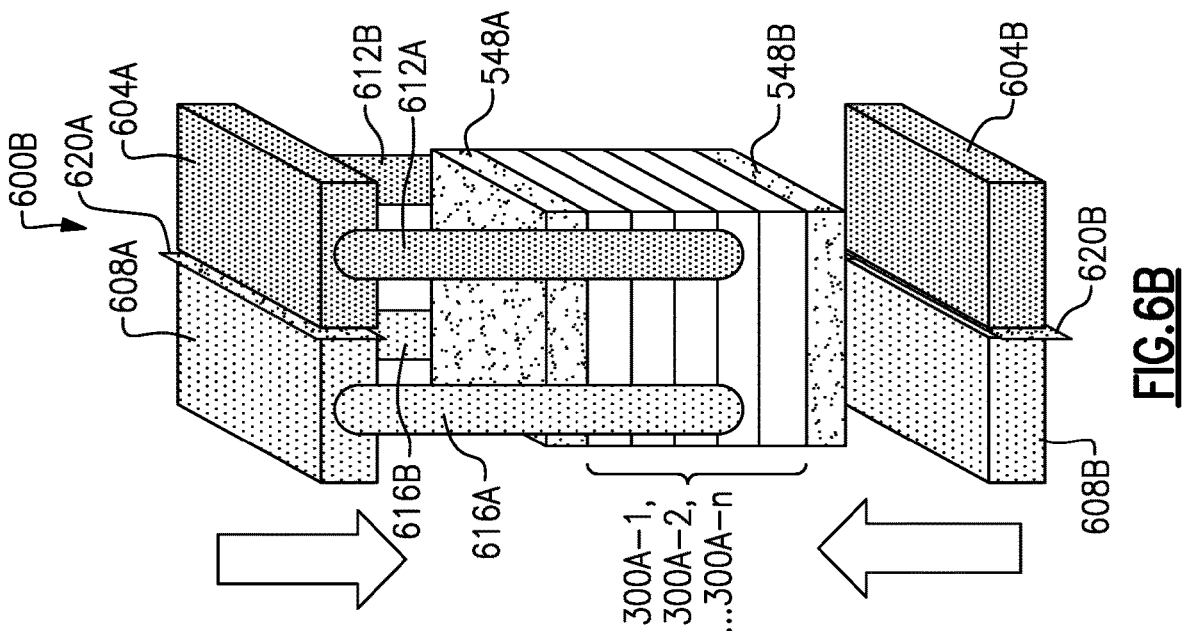

Referring to FIG. 6B, the illustrated redox battery 600B comprises conductive end plates having the same polarity formed on one or both ends of each of the redox battery cell stacks, conductive end plates having opposite polarities formed on the same end of each of the redox battery cell stacks, or conductive end plates that are each split into at least two parts having opposite polarities, in a similar manner as shown in FIG. 6A. Because the conductive end plates have opposite polarities, the first and third conductive end plates 604A, 608A may be electrically insulated from each other by an insulating layer 620A disposed therebetween, and the second and fourth conductive end plates 604B, 608B may be electrically insulated from each other by an insulating layer 620B disposed therebetween. In addition, unlike the redox battery described above with respect to FIG. 6A and in a similar manner as described above with respect to FIG. 5C, the illustrated redox battery 600B additionally includes insulating layers 548A, 548B vertically disposed between each conductive end plate and the closest respective redox battery cell of the redox battery cell stack. The insulating layers 548A, 548B may be inserted to provide additional electrical insulation between the cell stack and the conductive end plates, for improved safety in operation. In addition, the insulating layers 548A, 548B may further provide a mechanical functionality similar to that of a conductive end plate, including providing additional connection points for the bus bars to support the compressive force or pressure maintained in the redox battery cell stack.

Referring to FIG. 6C, the illustrated redox battery 600C comprises conductive end plates having the same polarity formed on one or both ends of each of the redox battery cell stacks, conductive end plates having opposite polarities formed on the same end of each of the redox battery cell stacks, or conductive end plates that are each laterally split into at least two parts having opposite polarities, in a similar manner as shown in FIG. 6A. However, unlike FIG. 6A, the conductive end plates having the same polarity are connected by more than one bus bar per side of the redox battery cell stack. In the illustrated configuration, the redox battery includes positive bus bars 624A, 624B and negative bus bars 628A, 628B each disposed on a side surface of the cell stack, in a similar manner as the redox battery described above with respect to FIGS. 6A and 6B. In addition, the redox battery 600C further comprises positive bus bars 622A, 622B and negative bus bars 626A, 626B each disposed at an edge of the cell stack.

Referring to FIGS. 6D-6G, the illustrated redox batteries 600D-600G comprise conductive end plates having the same polarity formed on one or both ends of each of the redox battery cell stacks, conductive end plates having opposite polarities formed on the same end of each of the redox battery cell stacks, or conductive end plates that are each split into at least two parts having opposite polarities, in a similar manner as shown in FIG. 6A. However, unlike FIG. 6A and in a similar manner as described above with respect to FIGS. 5E and 5F, in the illustrated redox batteries, additional supporting fastening means are provided, e.g., one or more fastening tie strips or bands that can be wound to form a loop around the stack in the stacking direction to provide additional compressive force and pressure to the stack of cells 300A-1, 300A-2, . . . , 300A-n. In the illustrated configurations, without limitation, the fastening tie strips form a loop in a plane parallel to the extension direction of the bus bars. In the illustrated configuration of FIG. 6D, the redox battery 600D comprises fastening tie strips 552 forming a loop in a plane parallel to the extension direction of the bus bars 612A, 612B, 616A, 616B.

Figure 6E:
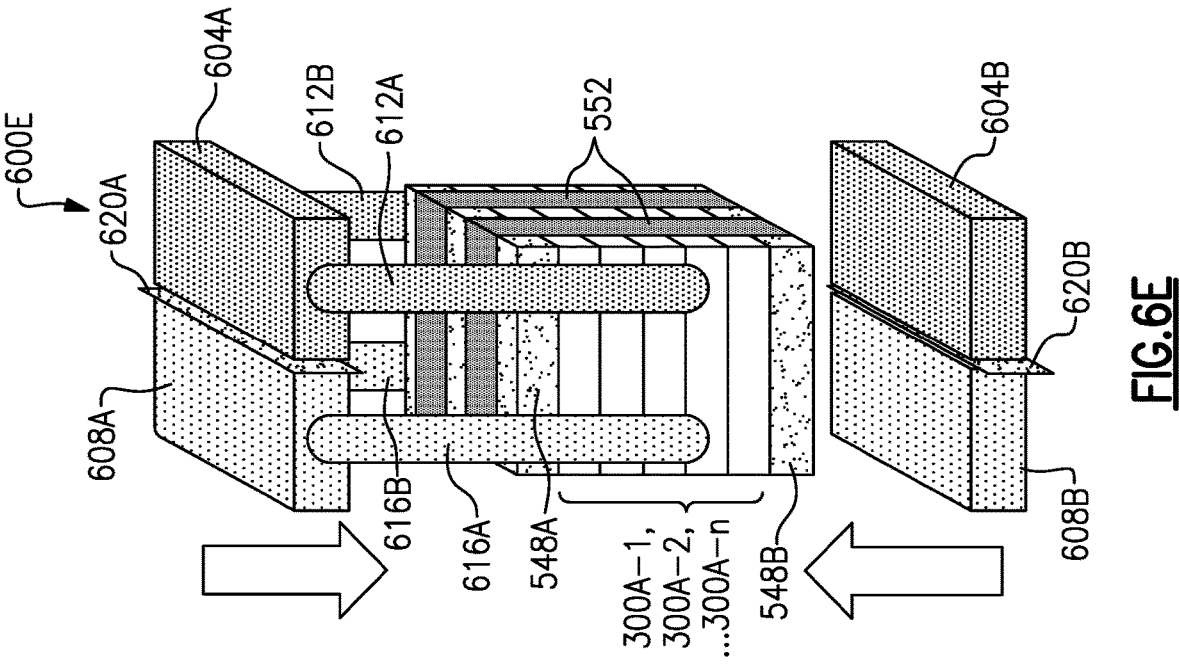
Figure 6D:
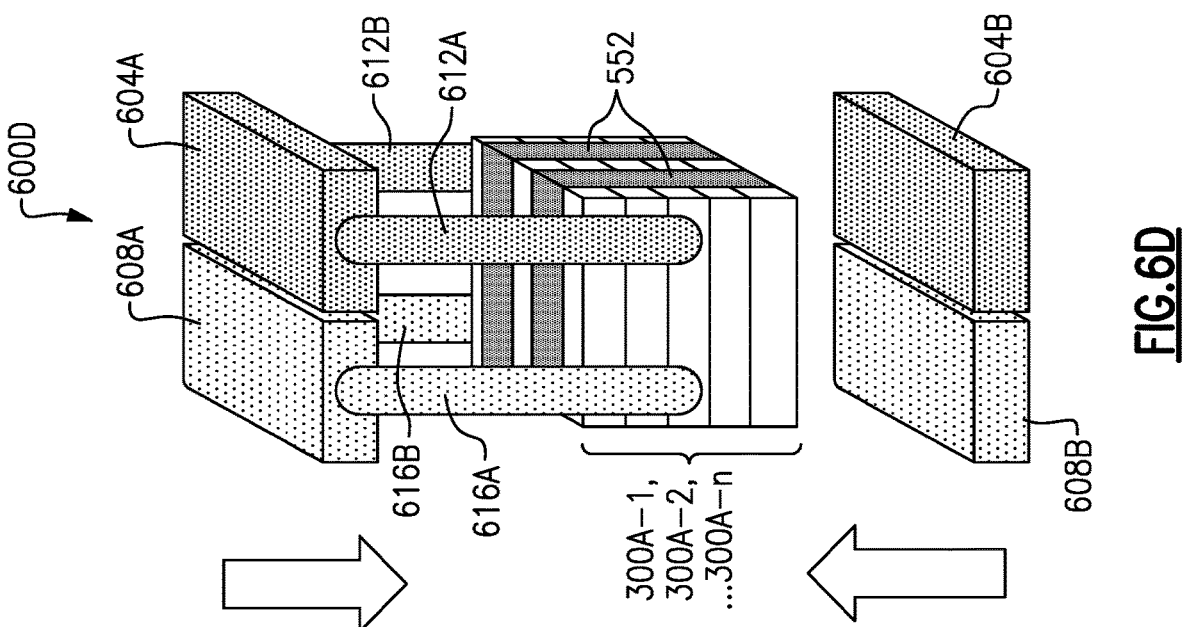

In the illustrated configuration of FIG. 6E, the redox battery 600E additionally includes insulating layers 548A, 548B disposed vertically between each conductive end plate and the closest cell of the stack, as well as insulating layers 620A, 620B disposed laterally between the end plates having opposite polarities, in a similar manner as described above with respect to FIG. 6B. The fastening tie strips 552 may form a loop around the stack of cells 300A-1, 300A-2, . . . , 300A-n, as well as the insulating layers 548A, 548B.

Figures 6F, 6G:
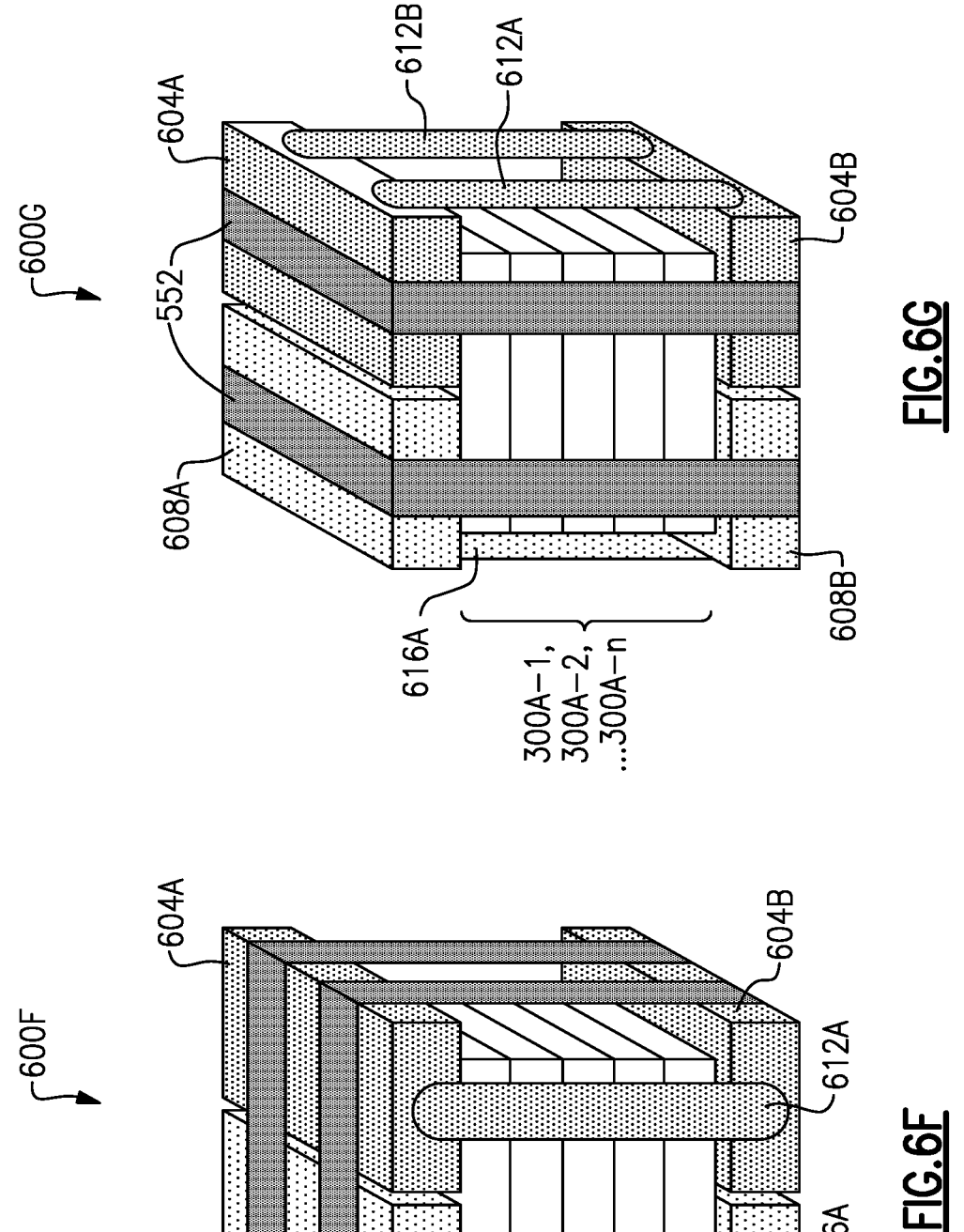

In the illustrated configuration of FIGS. 6F and 6G, the additional supporting fastening means, e.g., strips or bands, are formed around the entire stack of redox batteries including the conductive end plates. The strips or bands can form a loop in any direction. In the illustrated configuration of FIG. 6F, the redox battery 600F comprises fastening strips 552 forming a loop around the redox battery stack and the conductive end plates having different polarities. In the illustrated configuration of FIG. 6G, the redox battery 600G comprises fastening strips 552 forming a loop around the redox battery stack and the conductive end plates having the same polarities.

Other structurally separated arrangements between conductive end plates having opposite polarities formed on the same end of the redox battery cell stack are possible. Referring to FIG. 6H, the illustrated redox battery 600H comprises conductive end plates that are each split laterally into at least two parts having opposite polarities, according to an alternative embodiment. The illustrated redox battery 600H comprises a top conductive end plate that is split into parts 632A, 636A having opposite polarities and a bottom conductive end plate that is split into parts 632B, 636B having opposite polarities. The parts 632A and 632B have the same polarity, e.g., a positive polarity, and the parts 636A and 636B have the same polarity, e.g., a negative polarity. The conductive end plates of the same polarity are connected by more than one bus bars of the same polarity, including bus bars 612A-612D that may have, e.g., the positive polarity and 616A-616D that may have, e.g., the negative polarity, that extend over side surfaces of the redox battery cell stack in the stacking direction. Unlike the conductive end plates having opposite polarities formed on the same end of the redox battery cell stack described with respect to FIGS. 6A-6G in which the conductive end plates on the same end are split along a lengthwise direction, in the illustrated embodiment in FIG. 6H, at least one conductive end plate can be split along a direction different from a lengthwise direction, e.g., an oblique direction or a diagonal direction, to illustrate a couple of examples. In further contrast to the arrangements illustrated in FIGS. 6A-6G, at least one conductive end plate can be split into three or more parts. For example, each of the parts 632A, 636A, 632B, 636B are illustrated to be split into two diagonal end portions that are connected by bridging portion extending in the diagonal direction.

Figure 6I:
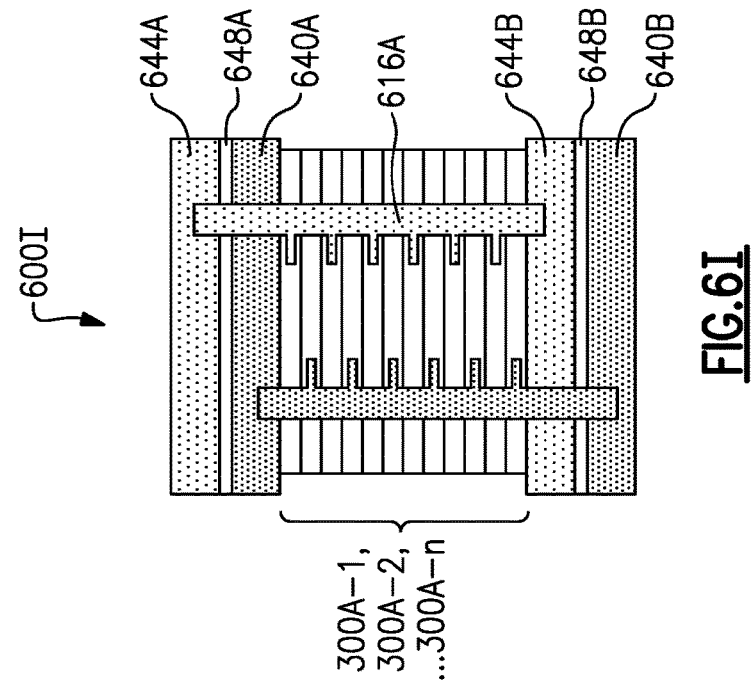
Figure 6H:
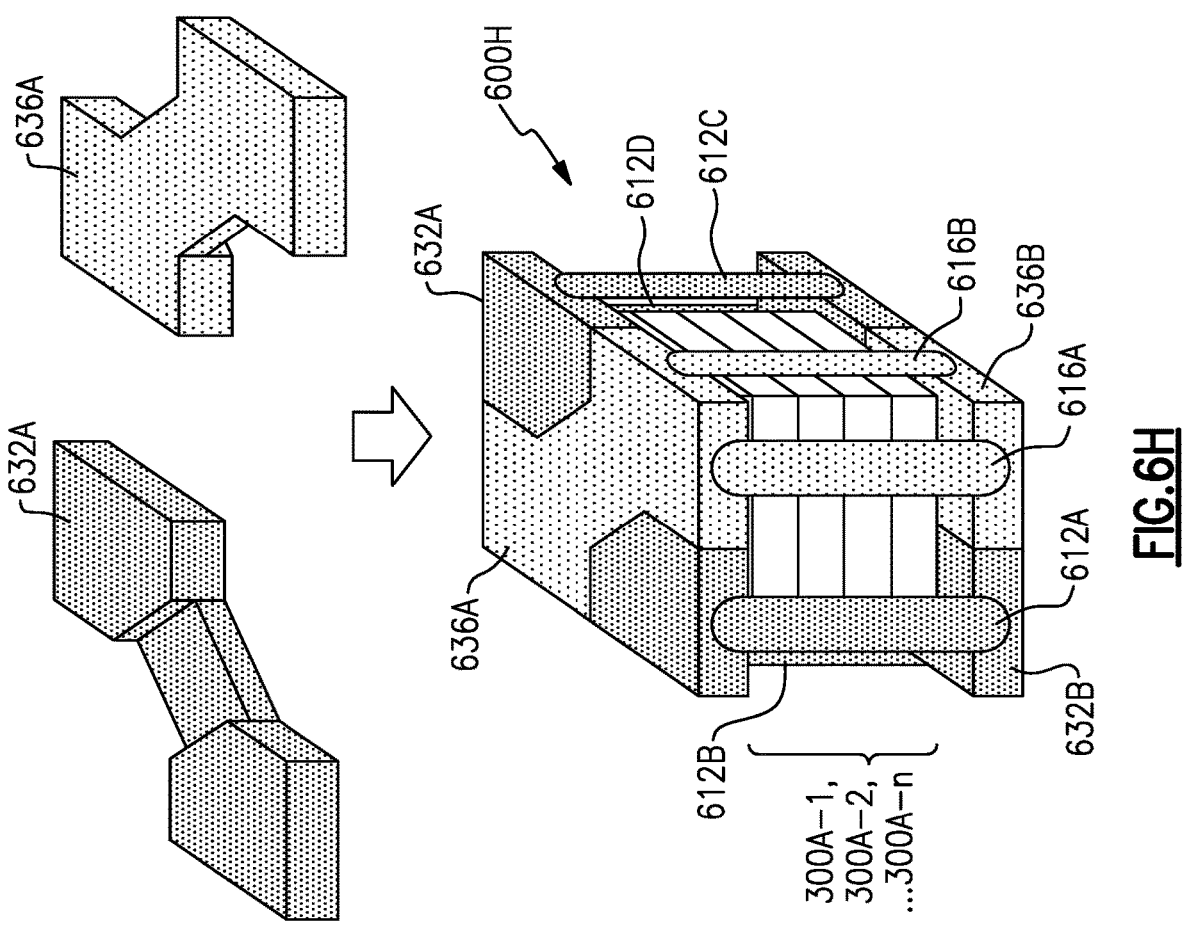

Referring to FIG. 6I, the illustrated redox battery 600I comprises conductive end plates that are each split in a vertical direction into at least two parts having opposite polarities, according to yet another alternative embodiment. The illustrated redox battery 600I comprises a top conductive end plate vertically split into parts 640A, 644A having opposite polarities and a bottom conductive end plate vertically split into parts 640B, 644B having opposite polarities.

In the arrangements illustrated in FIGS. 6A-6H, each conductive end plate is split laterally into at least two parts along a lateral direction. In contrast, in the illustrated embodiment in FIG. 6I, at least one conductive end plate can be split into two or more parts along a vertical direction, e.g., in a stacking direction, such that the two or more parts can have a stacked configuration. In further contrast to the arrangements illustrated in FIGS. 6A-6H, the vertically stacked parts 640A, 644A and 640B, 644B of the conductive end plates are separated by insulators 648A, 648B interposed therebetween.

As described above, e.g., with respect to FIGS. 5G-5H, electrically conductive end plates can enable, among other things, a plurality of stacks to be electrically integrated and stacked in an efficient manner. Similarly efficient stacking arrangements are possible with redox batteries having conductive end plates having opposite polarities formed on the same end of each of the redox battery cell stack. FIGS. 6J-6N schematically illustrate a plurality of redox batteries each comprising a stack of redox battery cells 300A-1, 300A-2, . . . , 300A-n between conductive end plates, wherein the redox batteries themselves are stacked and electrically connected through conductive end plates according to embodiments. The illustrated arrangements 600J-600N include conductive end plates that are split into parts, e.g., parts having opposite polarities as described above with respect to FIGS. 6A-6I, such that further integration flexibility can be realized.

In the example configuration of stacked redox batteries 600J shown in FIG. 6J, each conductive end plate is split into a conductive portion and an insulating portion. For example, in the individual redox battery 600J-1 shown in FIG. 6J, the top conductive end plate is split into a conductive portion 652A and an insulating portion 660A, and the bottom conductive end plate is split into a conductive portion 656B and an insulating portion 660B. The conductive portions 652A, 656B having a positive polarity and a negative polarity, respectively, are electrically connected to current collectors 612A, 616A of the redox battery cells 300A-1, 300A-2, . . . , 300A-n having the corresponding polarity. The conductive end plate portions 652A, 656B of immediately adjacent batteries having opposite polarities are physically and electrically coupled to each other, such that the batteries 600J-1, 600J-2, . . . , 600J-n are serially connected. The insulating conductive end plate portions 660A, 660B of the immediately adjacent batteries are physically coupled to each other without affecting the electrical connectivity between the adjacent batteries. The coupled ones of the conductive end plates may have suitable shapes to facilitate the mechanical coupling therebetween, e.g., a protrusion-recess couple, in a manner similar to that described above with respect to FIG. 5G. The mechanical coupling may be such that the coupled conductive end plates portions 652A, 656B of vertically adjacent ones of the batteries are restricted in movement in at least one direction, e.g., one or both of the lateral directions orthogonal to the stacking direction of the redox battery cells.

Figure 6K:
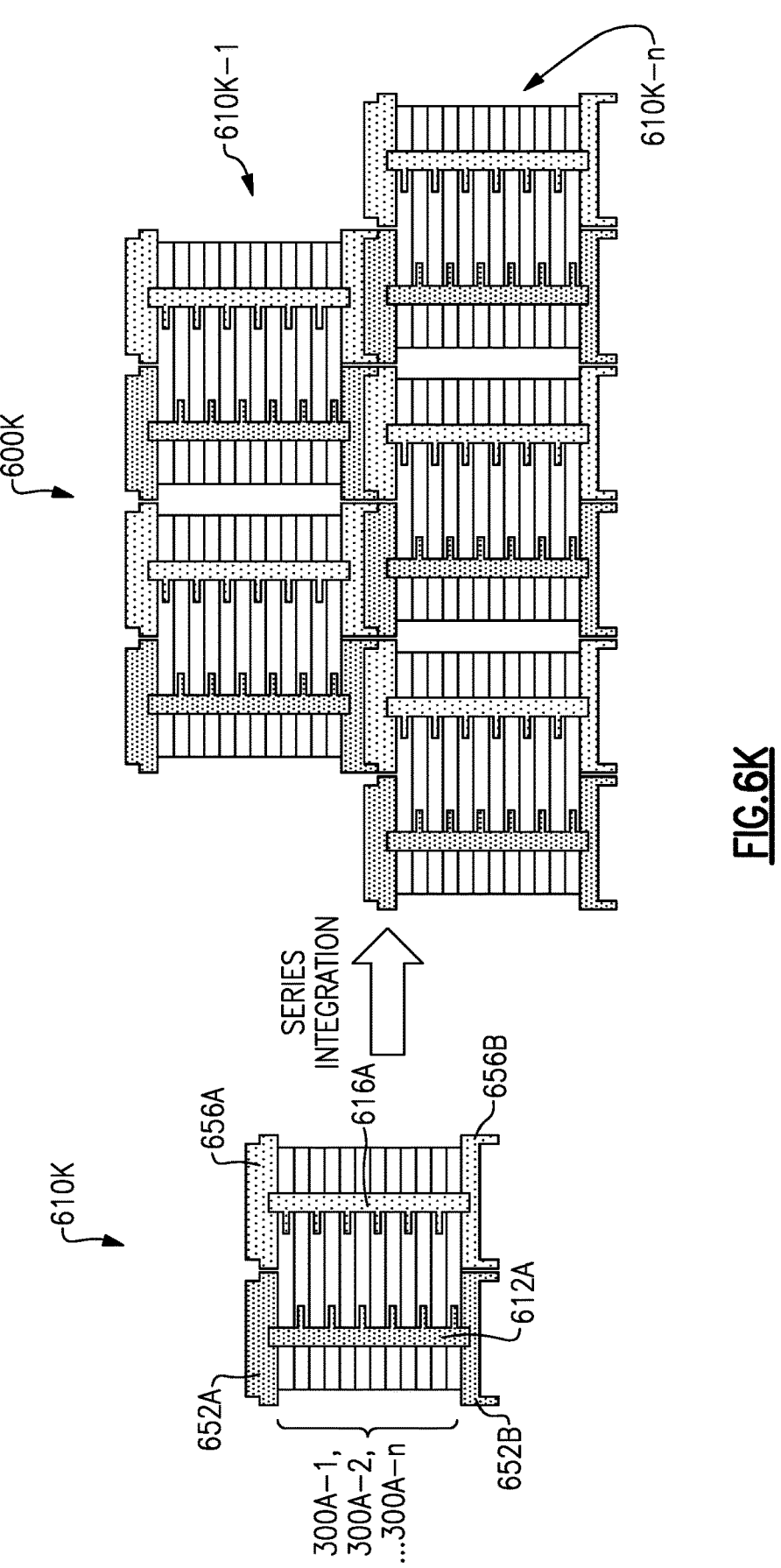

In the example configuration of stacked redox batteries 600K shown in FIG. 6K, a plurality of rows 610K-1, . . . , 610K-n of redox batteries may be arranged to form a rack comprising an array of redox battery cells, in an analogous manner as described above with respect to FIGS. 5I and/or FIG. 5J. For example, in the redox battery 600K shown in FIG. 6K, each individual redox battery 610K includes the top conductive end plate that is split into conductive end plate portions 652A, 656A having opposite polarities, and the bottom conductive end plate that is split into conductive portions 652B, 656B having opposite polarities. The portions 652A, 652B having the same polarity, e.g., a positive polarity, are electrically connected to each other and to positive current collectors of the redox battery cells 300A-1, 300A-2, . . . , 300A-n through the positive bus bar 612A. Similarly, the portions 656A, 656B having the same polarity, e.g., a negative polarity, are electrically connected to each other and to negative current collectors of the redox battery cells 300A-1, 300A-2, . . . , 300A-n through the negative bus bar 616A. Unlike the arrangement shown in FIG. 5I and/or FIG. 5J, the batteries of an upper row 610K-1 of batteries are offset laterally relative to the batteries of a lower row 610K-n of batteries, such that split bottom conductive end plates 652B, 656B of the batteries of the upper row6 610K-1 are electrically connected to split top conductive end plates 652A, 656A of the batteries of the lower row 610K-n of batteries having opposite polarities. In this manner, an array of redox batteries may be compactly integrated into a single rack unit in an analogous manner as described above with respect to FIGS. 5I and/or 5H.

Figure 6L:
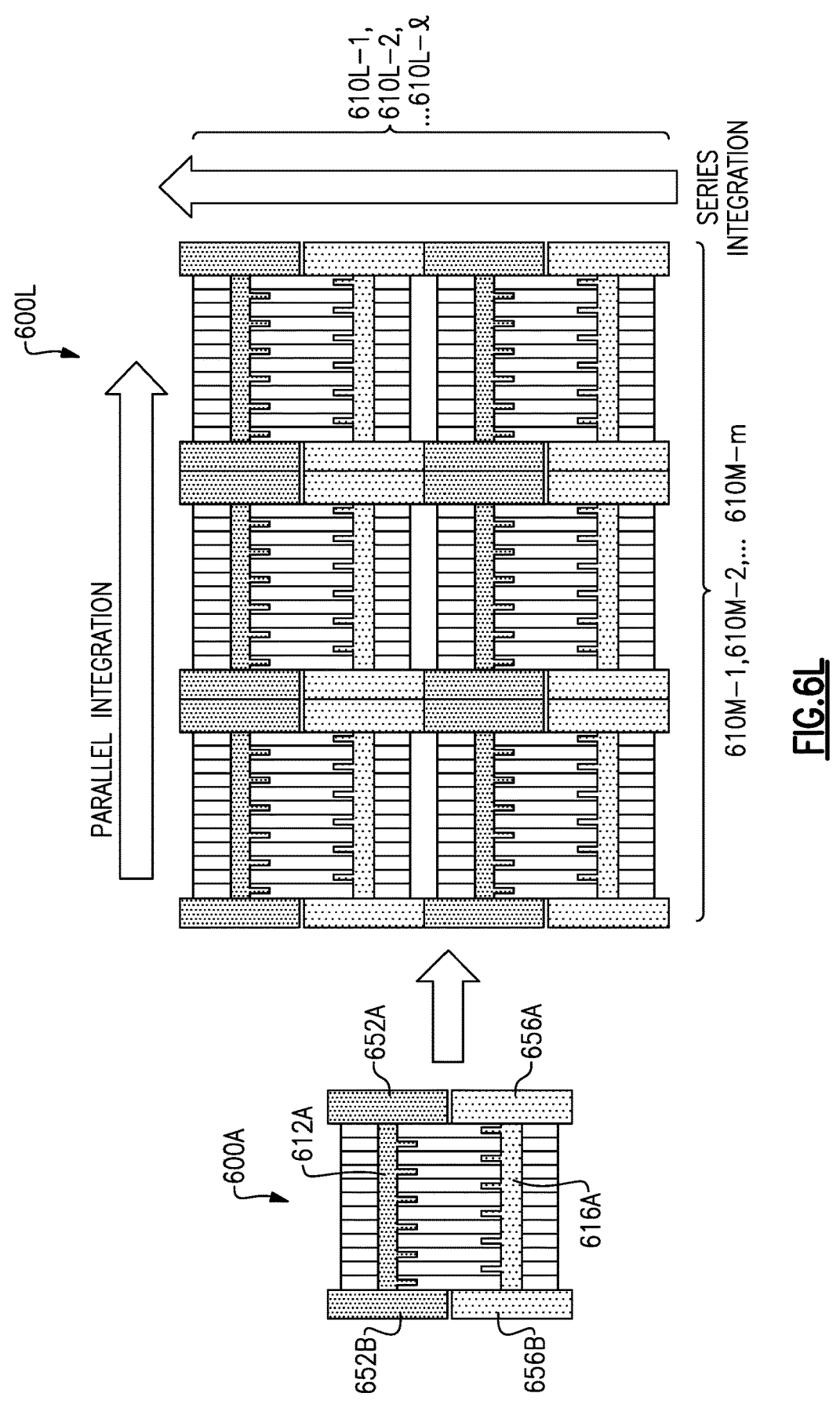

For illustrative purposes only, in FIG. 6K, the redox batteries are electrically connected in electrical series. However, it will be appreciated that alternative arrangements are possible. By way of example, FIG. 6L shows one such alternative arrangement of stacked redox batteries 600L. The redox batteries of the stacked redox batteries 600L are arranged as a (m×n) array, in an analogous manner as the arrays of batteries described above with respect to FIGS. 5H and 5I. Each individual redox battery 600A includes the top conductive end plate that is split into conductive end plate portions 652A, 656A having opposite polarities, and the bottom conductive end plate that is split into conductive portions 652B, 656B having opposite polarities. The portions 652A, 652B having the same polarity, e.g., a positive polarity, are electrically connected to each other and to positive current collectors of the redox battery cells 300A-1, 300A-2, . . . , 300A-n through the positive bus bar 612A. Similarly, the portions 656A, 656B having the same polarity, e.g., a negative polarity, are electrically connected to each other and to negative current collectors of the redox battery cells 300A-1, 300A-2, . . . , 300A-n through the negative bus bar 616A. In the stacked redox batteries 600L, the redox batteries within each of the rows 610L-1, 610L-2, . . . , 610L-1 are electrically connected in series, via adjacent ones of the portions 652A and 652B and/or adjacent ones of the portions 656A and 656B of laterally adjacent ones of the batteries, while the redox batteries within each of the columns 610M-1, 610M-2, . . . , 610M-m are electrically connected in parallel, via adjacent ones of the portions 652A and 656A and/or the portions 652B and 656B of vertically adjacent ones of the batteries. It will be appreciated that, while two concrete example configurations of (m×n) arrays of redox batteries having different electrical configurations are demonstrated, a skilled artisan can make suitable modifications to form various other combinations of the redox batteries that may be physically stacked to form arrays having batteries that are electrically connected in any suitable combination of series and parallel connections.

Figure 6M:
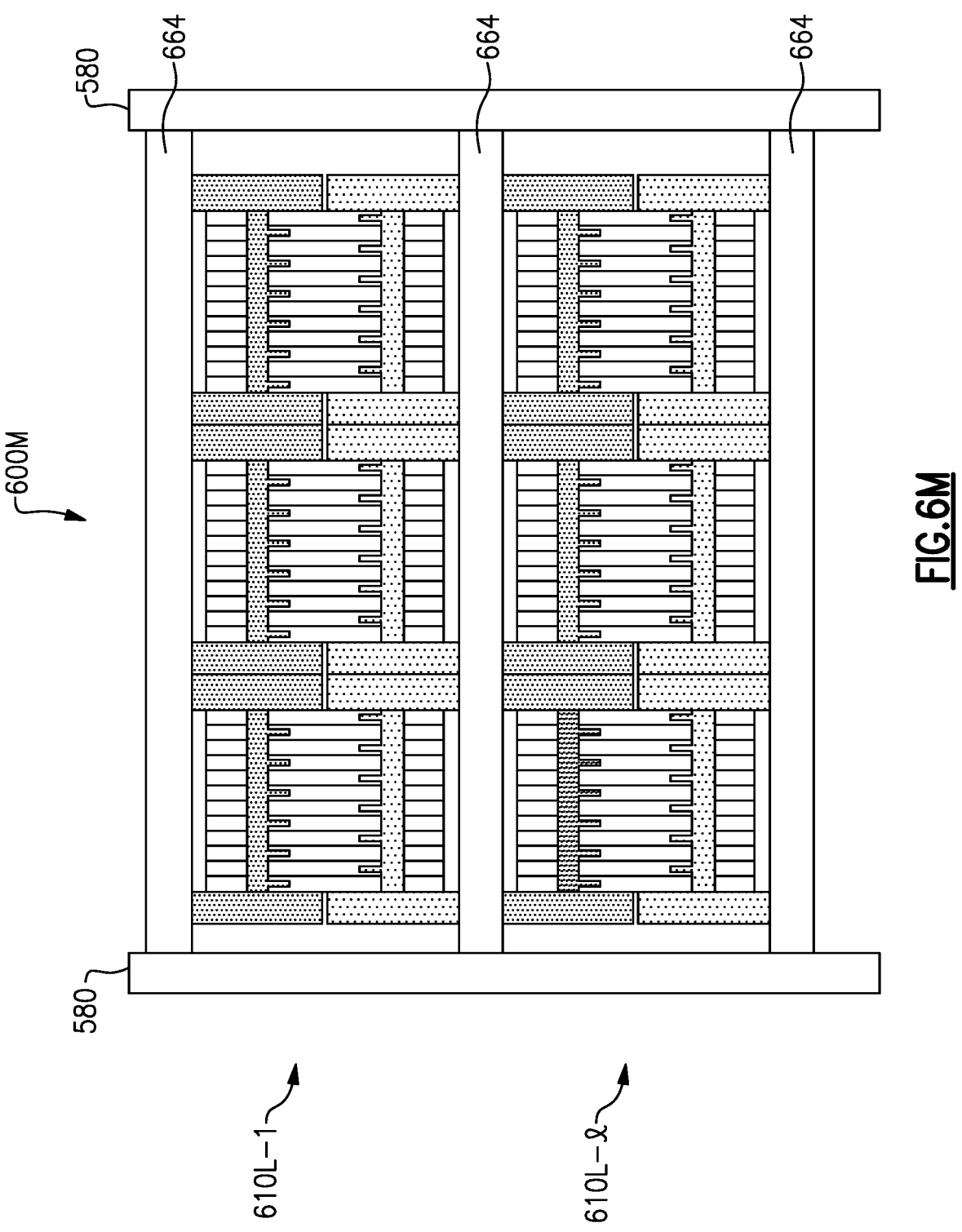

In an analogous manner as described above with respect to FIGS. 5H and 5I, in the illustrated arrangement 600M in FIG. 6M, the redox batteries in each of the rows 610L-1, . . . , 610L-n may be electrically connected to each other in parallel through top and bottom conductive parallel connect plates 664. The redox batteries of the stacked redox batteries 600M are arranged as a (m×n) array, in an analogous manner as the arrays of batteries described above with respect to FIG. 6L. Each individual redox battery 610A is similarly arranged to that described above with respect to FIG. 6L, a detailed description of which is omitted herein for brevity. The redox batteries within each of the rows 610L-1, 610L-2, . . . , 610L-1 are electrically connected in parallel. The top conductive end plates 652A, 652B of each of the batteries having a first polarity may be electrically connected to each other through a top conductive parallel connect plate 664 of the first polarity. The bottom conductive end plates 656A, 656B of the batteries having a second polarity may be electrically connected to each other through a bottom conductive parallel connect plate 576 of the second polarity. A pair of side panels 580, which may be electrically insulating, may be disposed at and connected to both ends of the top and bottom conductive parallel connect plates 664 thereby forming side panels of a rack structure to hold the (m×n) array of redox batteries in place. In this manner, a (n×m) array of redox batteries may be integrated into a single rack unit as illustrated, in an analogous manner as described above with respect to FIGS. 5H and SI.

Advantageously, various integration schemes for redox battery cell stacks as described herein enable compact integration thereof. FIG. 6N illustrates an energy storage device 600N comprising a plurality of packaged redox batteries, as a user may receive. The energy storage device 600N may include a box casing 676, a pair of positive electrodes 668A, 668B on the outside of the casing 676 and connected to the positive conductive end plate portions 652A, 652B, and a pair of negative electrodes 672A, 672B on the outside of the casing 676 and connected to the negative conductive end plate portions 656A, 656B. A plurality of energy storage devices 600N may themselves be stacked, e.g., to form a stack of serially connected energy storage devices 600N.

Three-Dimensionally Stacked Redox Batteries

As described above, according to various embodiments, a plurality of redox battery cells can be stacked with electrical connections therebetween to form a redox battery. The electrical connections formed by one or both of conducting bus bars and conducting end plates can provide mechanical robustness in addition to the electrical connections. In addition, a plurality of redox batteries each having the bus bars and/or the conducting end plates can be stacked or integrated to form, e.g., a one-dimensional or two dimensional stack of redox batteries. The redox batteries are shaped and arranged such that efficient stacking arrangements of the redox battery cells described herein can be extended to two and three dimensions, as described herein.

FIGS. 7A-7C each schematically illustrate redox battery systems 700A-700C comprising a plurality of redox batteries. Each of the redox batteries comprises a stack of redox battery cells 300A-1, 300A-2, . . . , 300A-n between conductive end plates 704A, 704B, 708A, 708B, wherein the redox batteries themselves are stacked and electrically connected through conductive end plates, according to some embodiments. Each of the redox batteries can each be configured according to any of example configurations described above. In each of FIGS. 7A-7C, in a similar manner as described above with respect to FIGS. 6A-6H, each of the redox batteries 700 comprise a plurality of redox battery cells 300A-1, 300A-2, . . . , 300A-n that are stacked in a stacking direction, the details of the similarities of which are not repeated herein for brevity. In particular, each of the redox batteries 700 comprises a pair of conductive positive end plates 704A, 704B disposed at opposing ends of the redox battery cells stacked in a cell stacking direction and electrically connected to the positive conducting bus bar (not shown). In addition, each of the redox batteries comprises a pair of conductive negative end plates 708A, 708B disposed at opposing ends of the redox battery cells stacked in the cell stacking direction and electrically connected to the negative conducting bus bar 716. For each of the redox batteries, one of the pair of conductive positive end plates 704A, 704B and one of the pair of conductive negative end plates 708A, 708B form a pair of adjacently disposed conductive end plates having opposite polarities that are disposed on the same end of the redox battery cell stack, in accordance with any of various embodiments described above with respect to FIGS. 6A-6L.

The redox batteries according to various embodiments form redox batteries that are stacked in at least one other direction orthogonal to the cell stacking direction and electrically connected to each other. According to various embodiments described herein, the size and shape of the batteries are adapted for form efficient stacking and electrical connections therebetween. For example, the conductive end plates of the illustrated embodiment have rectangular shapes, the combined pairs of adjacently disposed conductive end plates having opposite polarities can have the same dimensions, such that the redox batteries can be stacked vertically and/or horizontally.

Referring to FIG. 7A, the illustrated redox battery system 700A includes a plurality of columns 710M-1, 710M-2, . . . , 710M-m of redox batteries that are stacked in a lateral or horizontal direction orthogonal to the cell stacking direction of the redox battery cells 300A-1, 300A-2, . . . , 300A-n. Each of the columns 710M-1, 710M-2, . . . , 710M-m of redox batteries includes redox batteries that may be arranged in a similar manner as a column of the array of redox batteries 600L illustrated in FIG. 6L. By way of example, the first column 710M-1 includes a plurality of redox batteries, where each redox battery 700 is arranged in a similar manner as the redox battery 600A illustrated in FIG. 6L. The redox batteries of the first column 710M-1 is arranged in a similar manner as the column 610M-1 of the array of redox batteries 600L described above with respect to FIG. 6L, and are stacked in a vertical direction. The redox batteries of the first column 710M-1 are stacked in the vertical direction such that the conductive positive end plates 704A, 704B and the conductive negative end plates 708A, 708B of the first column 710M-1 of redox batteries alternate in the vertical direction. The illustrated first column 710M-1 of redox batteries 710M-1 can be electrically connected in series. Due to the redox batteries having a suitable shape such as a rectangular shape, adjacent ones of the first column of redox batteries are directly electrically connected by adjacent ones of the conductive positive end plate and the conductive negative end plate that physically contact each other. In addition, advantageously, the conductive end plates of the vertically stacked redox batteries can provide substantially sufficient electrical connections therebetween by gravitational force.

Still referring to FIG. 7A, in the illustrated redox battery system 700A, the plurality of columns 710M-1, 710M-2, . . . , 710M-m of redox batteries are in turn horizontally stacked in a lateral or horizontal direction orthogonal to the cell stacking direction. The redox batteries of different ones of the columns 710M-1, 710M-2, . . . , 710M-m that are disposed at corresponding vertical heights are arranged to form a plurality of rows 710L-1, 710L-2, . . . , 710L-1 of redox batteries that are stacked in the vertical direction orthogonal to the cell stacking direction. The rows 710L-1, 710L-2, . . . , 710L-1 of redox batteries are stacked in the vertical direction such that the conductive positive end plates 704A, 704B of a given row are adjacently or linearly arranged in the lateral or horizontal direction and the conductive negative end plates 708A, 708B of the given row are adjacently or linearly arranged in the same lateral or horizontal direction. By way of example, the redox batteries of a given one of rows 710L-1, 710L-2, . . . , 710L-1 of redox batteries are electrically connected in parallel. Due to the redox batteries having a suitable shape such as a rectangular shape, adjacent ones of the second subset of redox batteries are directly electrically connected by adjacent ones of the conductive positive end plates that physically contact each other and/or by adjacent ones of the conductive positive end plates that physically contact each other.

Still referring to FIG. 7A, as arranged, the illustrated redox batteries of the redox battery system 700A are vertically stacked in a vertical direction and horizontally stacked in a horizontal direction such that when viewed in the cell stacking direction (into the page), the plurality of redox batteries form an array comprising a plurality of rows 710L-1, 710L-2, . . . , 710L-1 of redox batteries extending in the horizontal direction and a plurality of columns 710M-1, 710M-2, . . . , 710M-m of redox batteries extending in the vertical direction. As arranged, the batteries are arranged to form a three-dimensional array. At least some of the redox batteries of one or more rows can be electrically connected in parallel and/or at least some of the redox batteries of one or more columns can be electrically connected in series.

Advantageously according to various embodiments described herein, the size and shape of the batteries are adapted for form efficient stacking in one or more directions such that electrical connections in between stacked redox batteries can be substantially provided simply by physically arranging the redox batteries to contact each other. In the vertical direction, the connections are further assisted by gravity. The stacked redox batteries can further be removably be fixed to each other through a suitable fixing structure, such as a clip, a band and the like.

The stacking arrangement as described herein further provides the advantage that individual ones of the redox batteries can be removed (e.g., for replacement or service) from the stack with relative ease, e.g., by pulling out in the cell stacking direction. FIG. 7B illustrates another arrangement of a redox battery system 700B that can provide further advantages in this regard. In the illustrated example in FIG. 7B, vertically adjacent ones of the rows 710L-1, 710L-2, . . . , 710L-1 of redox batteries are horizontally offset in the horizontal direction by a fraction of a length of the conductive end plates of the redox batteries. As configured, different ones of the rows 710L-1, 710L-2, . . . , 710L-1 of redox batteries may not have the same number of batteries. Some of the spaces formed by offset portions of the rows may be filled by insulators 720 to provide structural support. The redox batteries also comprise openings 724A, 724B configured to allow for removal of the redox battery, further described infra. As configured, removal of one or more of the redox batteries does not result in collapse of the arrangement.

As described above, electrical connections between vertically adjacent redox batteries can be made with relative ease according to embodiments by physically vertically disposing one conductive end plate on another. However, unlike the vertical direction in which gravity aids in keeping the electrical connection between vertically adjacent conductive end plates, in the horizontal direction, horizontally adjacent conductive end plates may more easily lose electrical contact. FIG. 7C illustrates an example configuration to mitigate this effect. In the arrangement 700C shown in FIG. 7C, further electrical connection between horizontally adjacent redox batteries is provided through conductive parallel connect plates 664 contacting each of the conductive positive end plates or each of the conductive negative end plates. In these configurations, vertically adjacent rows of redox batteries 710L-1, 710L-2, . . . , 710L-1 are not in direct contact with each other but are physically separated and interposed by the conductive parallel connect plates 664. The conductive parallel connect plates 664 are connected at both ends by side panels in a manner similar to that described above with respect to FIGS. 5H, 5I and 6M, such that the redox batteries are integrated into a single unit by a rack structure 728.

As described above, the electrical connection and/or the physical stability of vertically stacked redox batteries may be aided by gravity. However, the inventors have discovered that horizontal slippage may still occur, e.g., due to external vibrations. To address these and other effects, FIGS. 7D and 7E schematically illustrate an example coupling mechanism for preventing coupled redox batteries from sliding relative to one another and allowing for compact integration, according to some other embodiments. Referring to FIGS. 7D and 7E, vertically adjacent ones of the redox batteries may be configured to be physically coupled by a coupling structure for preventing vertically stacked and coupled redox batteries from laterally sliding relative to one another, or limiting relative lateral movements therebetween in at least one direction. The redox battery 700 is configured in a similar manner as described above with respect to FIGS. 6A-6H, and comprises a plurality of redox battery cells 300A-1, 300A-2, . . . , 300A-n that are stacked in a stacking direction and includes, the details of the similarities of which are not repeated herein for brevity. The redox battery 700 comprises a pair of conductive positive end plates 704A, 704B disposed at opposing ends of the redox battery cells stacked in a cell stacking direction and electrically connected to the positive conducting bus bar (not shown). In addition, each of the redox batteries comprises a pair of conductive negative end plates 708A, 708B disposed at opposing ends of the redox battery cells stacked in the cell stacking direction and electrically connected to the negative conducting bus bar 716. In addition, the example redox battery 700 illustrated in FIG. 7D comprises slots 736 formed at a bottom edge of the conductive positive end plates 704A, 704B, and protrusions or rails 732, which are correspondingly shaped to couple to the slots 736, formed at a top edge of the conductive negative end plates 708A, 708B. However, it will be understood that embodiments are not so limited, and that the slots 736 may be formed on any one of the conductive positive and negative end plates 704A/704B, 708A/708B of a redox battery, and the protrusions or rails 732 may be formed on the other of the positive and negative conductive end plates 704A/704B, 708A/708B of the redox battery. The protrusions or rails 732 are configured to slide into the slots 736 in the cell stacking direction and snugly fit therein, wherein the protrusions or rails 732 and the slots 736 have vertical and lateral dimensions such that the vertically adjacent ones of the redox batteries 700 are substantially prevented from substantially sliding relative to one another in the lengthwise direction of the protrusions or rails 732 and the slots 736.

In the example redox battery 700 illustrated in FIG. 7D, the protrusions or rails 732 and the slots 736 are formed as part of the corresponding conductive end plates 708A/708B, 704A/704B to provide electrical and mechanical coupling between conductive end plates, embodiments are not so limited. In the example arrangement of coupled redox batteries 700E shown in FIG. 7E, the rails 740 and slots 744 extend through the entire stack of battery cells. Furthermore, the rails 740 and slots 744 are configured, in addition to serving as coupling structures similar to those described above with respect to FIG. 7D, the rails 740 and 744 also serve as positive and negative conducting bus bars of the redox batteries 710. Thus, in the illustrated arrangement, separate bus bars may advantageously be omitted.

Redox Batteries with Conductive End Plates that are Configured to be Electrically Shorted.

As described above, according to various embodiments, a plurality of redox battery cells can be stacked with electrical connections therebetween to form a redox battery. In addition, a plurality of redox batteries themselves can be stacked to form, e.g., a stack or array of redox batteries with parallel and/or serial electrical connections therebetween. Among other advantages, the stacked configurations allow for modular arrangements of the redox batteries, such that individual ones of the redox batteries can be removed and replaced with convenience, which in turn allows for efficient servicing for replacement and/or repairs. For example, when one or more redox batteries are in need of repair or replacement, it may be safer to at least partly discharge them before their removal from the stack or array. Before removing an individual redox battery from a stack or array, it may be safer to at least partly discharge the redox battery. To address these and other needs, in some embodiments, redox batteries according to some embodiments include conductive end plates that are configured to be electrically shorted to one another, e.g., for discharging the redox batteries therethrough. Such configurations can be useful, e.g., for fast and/or complete discharging or charge balancing of the redox batteries to improve the battery capacity. Furthermore, such configurations can be useful for reconfiguring parallel/serial connections of the redox batteries without removing the redox batteries from the stack or array.

FIGS. 8B-8D each schematically illustrate a redox battery system comprising one or more redox batteries, wherein at least one redox of the batteries comprises a conductive end plate that is configured to be electrically shorted with another conductive end plate. Each of the redox batteries of the redox battery systems 800A-800D comprises, in a similar manner as described above with respect to FIGS. 7A-7C, a plurality of redox battery cells 300A-1, 300A-2, . . . , 300A-n that are stacked in a stacking direction, the details of the similarities of which are not repeated herein for brevity. In the illustrated redox battery systems 800A-800D, the redox batteries themselves are stacked and electrically connected through respective conductive end plates, according to some embodiments. Each of the redox batteries can each be configured according to any one of example configurations described above.

In each of the redox batteries of the redox battery systems 800A-800D respectively illustrated in FIGS. 8A-8D, conductive end plates having the same polarity formed on one or both ends of each of the redox battery cell stacks, conductive end plates having opposite polarities formed on the same end of each of the redox battery cell stacks, or conductive end plates that are each split into at least two parts having opposite polarities, in a similar manner as shown in FIG. 6A. The redox battery systems 800A-800D additionally comprise a conductive shorting or electrical connection structure configured to form a direct electrical connection or an electrical short between conductive end plates connected by a first end and a second end of the conductive structure. The first end of the conductive shorting structure is configured to be removably fixed and electrically connected to one of the conductive positive and negative end plates of the plurality of redox batteries, and the second end of the conductive shorting structure is configured to be removably fixed and electrically connected to another one of the conductive positive and negative end plates. The conductive shorting structure is configured to form the electrical short between conductive positive and/or negative end plates of the same redox battery or of different redox batteries, which can be formed on the same side of the redox batteries.

FIG. 8A schematically illustrates a redox battery system 800A including a redox battery having conductive end plates of opposite polarities that are configured to be electrically shorted using a conductive shorting structure. In the illustrated redox battery 700, in a similar manner as those described above with respect to FIGS. 7A-7C, one of the pair of conductive positive end plates 704A, 704B and one of the pair of conductive negative end plates 708A, 708B form a pair of adjacently disposed conductive end plates at each end of the same redox battery cell stack. Additionally, the conductive shorting structure 804 is configured to form the electrical short between adjacently disposed positive and negative conductive end plates 704A, 708A having opposite polarities. To protect a user, the conductive shorting structure 804 comprises a conductive inner structure 808 covered by an insulating outer structure 812 except for exposed ends of the conductive inner structure 808. The openings 724A, 724B formed on the conductive end plates are configured to receive the conductive shorting structure 804 to provide the conductive path.

As configured, the redox battery system 800A illustrated in FIG. 8A allows for substantially complete discharging of the redox batteries to a state of charge (SoC) of about 0%. Substantially complete discharging improves safety during removal of the redox batteries for service or replacement. In addition, a substantially complete discharging of all redox batteries of a stack or array of redox batteries allows for the redox batteries to be reset, such that they can start charging from an SoC of about 0%, which can improve the uniformity of the SoC of the redox batteries of the stack or array of redox batteries. This in turn improves the overall capacity of the system by reducing or preventing undercharging of some redox batteries that may have had higher SoC values relative to others.

FIG. 8B schematically illustrates a redox battery system 800B including a plurality of vertically stacked redox batteries 700 each having conductive end plates of opposite polarities at each end thereof. The conductive end plates of vertically adjacent redox batteries having opposite polarities are configured to be electrically shorted using a conductive shorting structure 804. The illustrated arrangement includes a stacked column of a plurality of redox batteries 700 that are stacked in a vertical direction such that the conductive positive and negative end plates 704A, 708A at a first end of the stacked column of redox batteries 700 alternate in the vertical direction, and likewise, the conductive positive and negative end plates 704B, 708B at a second end of the stacked column of redox batteries 700 alternate in the vertical direction. The conductive shorting structure 804 is configured to form an electrical short between a conductive positive end plate 704A and a conductive negative end plate 708A of vertically adjacent ones of the redox batteries. As configured, vertically adjacent redox batteries, which are connected by the shorting structure 804 shorting conductive end plates of the adjacent redox batteries having opposite polarities, can be electorally connected in series.

FIG. 8C schematically illustrates a redox battery system 800C including a plurality of horizontally stacked redox batteries 700 each having conductive end plates of opposite polarities at each end thereof. The conductive end plates of horizontally adjacent redox batteries having the same polarity are configured to be electrically shorted using a conductive shorting structure 804. The illustrated arrangement includes a stacked row of a plurality of redox batteries 700 that are stacked in a horizontal direction such that the conductive positive and negative end plates 704A, 708A at a first end of the stacked row of redox batteries 700 are linearly arranged in the horizontal direction, and likewise, the conductive positive and negative end plates 704B, 708B at a second end of the stacked row redox batteries 700 are linearly arranged in the horizontal direction. The conductive shorting structure 804 is configured to form an electrical short between the conductive positive end plates 704A of horizontally adjacent ones of the redox batteries 700. Additionally, the conductive shorting structure 804 is configured to form an electrical short between the conductive negative end plates 708A of horizontally adjacent ones of the redox batteries 700. As configured, horizontally adjacent redox batteries, which are connected by the shorting structure 804 shorting conductive end plates of the adjacent redox batteries having the same polarity, can be electrically connected in parallel FIG. 8D schematically illustrates a redox battery system 800D a plurality of horizontally and vertically stacked redox batteries 700 each having conductive end plates of opposite polarities at each end thereof. The illustrated redox batteries are arranged in a similar manner as those described above with respect to FIG. 7C, and a detailed description thereof is omitted. The redox battery system 800D includes vertically adjacent rows of redox batteries 810L-1, 810L-2, . . . , 810L-1 that are not in direct contact with each other but are physically separated and interposed by a conductive parallel connect plates 664. The conductive parallel connect plates 664 are connected at both ends by side panels in a manner similar to that described above with respect to FIGS. 5H, 5I and 6M, such that the redox batteries are integrated into a single unit by a rack structure 728. The redox batteries within a given row may be electrically connected in parallel. In addition, electrical connections between vertically adjacent redox batteries are provided through conductive shorting structures 804 arranged in a similar manner as those described above with respect to FIG. 8B. Thus redox batteries connected by the shorting structure 804 can be electrically connected in series.

In each of the configurations of redox battery systems described above with respect to FIGS. 8A-8D, the conductive shorting structure 804 has a U shape, or a shape of a handle for easy hand grip by a user. In addition, the conductive positive and/or negative end plates 704A, 708A electrically shorted by the conductive shorting structure 804 has formed thereon an opening 724A, 724B configured to receive one of the first and second ends 816A, 816B of the conductive shorting structure. In addition, the conductive shorting structure 804 may serve as a handle for removing a redox battery 700 from the redox battery system. In these embodiments, the conductive shorting structure 804 may be formed by coating the conductive material 808 with an insulating film 812 at portions configured to be in contact with a hand. However, embodiments are not so limited, and it will be appreciated that the shorting structure 804 can take on any suitable shape, and the insulating film 812 may be omitted.

While not illustrated, various sensors may be connected to the conductive shorting structure. Examples of sensors include a voltage sensor, a current sensor, a temperature sensor. In addition, the conductive shorting structure may communicatively couple the redox batteries with a battery management system (BMS). In addition, the conductive shorting structure may include other functional components, such as a current or voltage regulator or a rectifier, e.g., diode to substantially allow current flow in one but not the other direction between, e.g., 0.6-1.2V.

Redox Batteries Including Bus Bars Extending Over Top Surfaces

As described above, bus bars according to embodiments enable compact integration of redox battery cells within a redox battery as well as a plurality of redox batteries within an energy storage system. In various embodiments described above, redox batteries include bus bars that extend over side surfaces thereof, e.g., in a stacking direction of the redox battery cells. However, embodiments are not so limited and in the following, various embodiments of redox batteries including bus bars that extend over the side surfaces thereof and further extend over top and/or bottom surfaces thereof are described, according to various other embodiments. For example, an end portion of the positive conducting bus bar is bent and disposed at an end of the stack of redox battery cells, and an end portion of the negative conducting bus bar is bent and disposed at the end or another end of the stack of redox battery cells.

FIGS. 9A and 9B illustrate a disassembled perspective view and a side view of a redox battery cell 10, respectively, according to some embodiments. The redox battery cell 10 includes a frame or a casing 11b, an anode or a negative electrode 12, a cathode or a positive 13, a separator or an ion exchange membrane 19 separating the anode 12 and the cathode 13, The anode 12, which may be disposed in a negative electrolyte reservoir formed by a volume between the separator 19 and a first bipolar plate 17a, is electrically connected to an anode current collector 14. The cathode 13, which may be disposed in a positive electrolyte reservoir formed by a volume between the separator 19 and a second bipolar plate 17b, is electrically connected to a cathode current collector 15. The frame or casing 11, the first bipolar plate 17a and the second bipolar plate 17b defines an enclosed or sealed volume, which is divided into two spaces by the separator 19, namely the negative electrolyte reservoir accommodating the anode 12 and the positive electrolyte reservoir accommodating the cathode 13. The negative electrolyte reservoir includes an electrolyte in which an anode redox couple is dissolved, and may further include a conductive material such as carbon felt as part of the anode 12, in a manner similar to that described above with respect to FIG. 2A. For example, the anode redox couple can include is one or more of vanadium (V), zinc (Zn), bromine (Br), chromium (Cr), manganese (Mn), titanium (Ti), iron (Fe), cerium (Ce) and cobalt (Co). In one embodiment, the anode redox couple can be a $V^{2+}/V^{3+}$ redox couple. The electrolyte may be an acidic aqueous solution, which is a solution that conducts an electric current through ionization, and preferably contains sulfuric acid. In one embodiment, the electrolyte may be prepared by dissolving $VOSO_4$ (vanadylsulfate) in $H_2SO_4$. The positive electrolyte reservoir includes an electrolyte in which a cathode redox couple is dissolved, and may further include a conductive material such as carbon felt as part of the cathode 13, in a manner similar to that described above with respect to FIG. 2A. For example, the cathode redox couple can include one or more of vanadium (V), zinc (Zn), bromine (Br), chromium (Cr), manganese (Mn), titanium (Ti), iron (Fe), cerium (Ce) and cobalt (Co). In one embodiment, the cathode redox couple can be a $V^{4+}/V^{5+}$ redox couple. The electrolyte is preferably the same between the positive electrolyte reservoir and the negative electrolyte reservoir. The anode current collector 14 and the cathode current collector 15 may be made of a metal having high electrical conductivity, such as copper or aluminum, and allow current to flow during charging and discharging processes. The anode current collector 14 and the cathode current collector 15 may protrude from the frame 11, and configured to be connected to a bus bar described herein. The bipolar plates 17a, 17b may be disposed between the anode current collector 14 and the anode, and between the cathode current collector 15 and the cathode, respectively. The bipolar plates 17a, 17b serves to prevent, among other things, the current collectors 14, 15 from being oxidized. In some implementations, the bipolar plates 17a, 17b may be coatings formed on the current collectors 14, 15, respectively.

FIGS. 10A and 10B illustrate a side view and a perspective view of a redox battery comprising a plurality of stacked redox battery cells, according to some embodiments. The redox battery 20 according to an embodiment includes a plurality of redox battery cells 10 stacked in a stacking direction. The anode 12 of any one of the redox battery cells 10 is stacked with the anode 12 of an immediately adjacent redox battery cell 10, and the cathode 13 of any one of the redox battery cells 10 stacked with the cathode 13 of an immediately adjacent redox battery cell 10. As configured, immediately adjacent ones of the redox battery cells 10 share one anode current collector 14 or a cathode current collector 15. That is, the plurality of redox battery cells 10 are stacked such that the anode 12 of the first redox battery cell 10a is stacked adjacent to the anode 12 of the second redox battery cell 10b with the anode current collector 14 interposed therebetween. Similarly, the cathode 13 of the second redox battery cell 10b is stacked adjacent to the cathode 13 of the third redox battery cell 10c with the cathode current collector 15 interposed therebetween. The redox battery 20 generally has a six-sided rectangular parallelepiped shape that may be stacked in the stacking direction of the redox battery cells 10. The anode current collector 14 and the cathode current collector 15 protrude from the sides of the frame 11, and are configured to be connected to a positive bus bar and a negative bus bar, respectively, as described infra.

FIGS. 11A and 11B illustrate a side view and a top view of a redox battery comprising a plurality of stacked redox battery cells, according to some embodiments. The illustrated redox battery 30 according to an embodiment includes a plurality of redox battery cells 10 stacked in a stacking direction, and a pair of conductive end plates 130, 140 disposed at both ends of the stacked redox battery cells 10. The redox battery 30 additionally comprises a pair of bus bars 110 and 120 that electrically connect the plurality of redox battery cells 10. The pair of conductive end plates 130 and 140 serve, among other functions described herein, to protect the ends of the stacked redox battery cells 10, and apply a pressure to the plurality of redox battery cells 10 in conjunction with the pair of bus bars 110 and 120, as described above. As described above, application of the pressure provides, among other things, a leak-tight seal between the frame 11 (FIGS. 9A, 9B) and the bipolar plates 17a, 17b (FIGS. 9A, 9B) or current collectors 14, 15 (FIGS. 10A, 10B). In some implementations, each of the conductive end plates 130 and 140 has a chamfer formed at an outer edge thereof. For example, a chamfer may be formed at an edge portion of one or both of the conductive end plates 130, 140 corresponding to a bent portion of one or both of the bus bars 110 and 120. When present, the chamfer can serve to reduce friction between the conductive end plates 130, 140 and the bus bars 110, 120. The pair of conductive end plates 130 and 140 includes a first conductive end plate 130 disposed at one end of the stacked redox battery cells 10 and a second conductive end plate 140 disposed at the other end of the stacked redox battery cells 10. Each of the bus bars 110 and 120 electrically and physically connects the plurality of redox battery cells 10. Each of the pair of bus bars 110 and 120 is formed in the form of a bar elongated in the stacking direction of the plurality of redox battery cells 10. Each of the pair of bus bars 110 and 120 is arranged in a longitudinal direction in a stacking direction of the stacked redox battery cells 10. One end of each of the pair of bus bars 110 and 120 is bent and disposed on any one of the pair of conductive end plates 130 and 140. The pair of bus bars 110 and 120 are coupled to the pair of conductive end plates 130 and 140 to apply a pressure to the stacked redox battery cells 10. Each of the pair of bus bars 110 and 120 have suitable curvatures at the bent portions to prevent them from being easily damaged.

Still referring to FIGS. 11A and 11B, the pair of bus bars 110 and 120 includes a negative bus bar 110 electrically connecting the anode current collectors 14 of the plurality of redox battery cells 10 to each other, and a positive bus bar 120 electrically connecting the cathode current collectors 15 of the plurality of redox battery cells 10. An end portion of the negative bus bar 110 is bent to cover a portion of the second conductive end plate 140 and is electrically and/or physically coupled thereto. Similarly, an end portion of the positive bus bar 120 is bent to cover a portion of the first conductive end plate 130 and is electrically and/or physically coupled to the first conductive end plate 130. In implementations where the pair of conductive end plates 130 and 140 is omitted, the pair of bus bars 110 and 120 is formed on the frames 11 of the redox battery cells 10 disposed at the ends of the stack of redox battery cells 10. In these implementations, portions of the bus bars 110 and 120 connected to the respective frames 11 of the redox battery cells 10 at the ends of the stack may serve as conductive end plates. In addition, in some implementations, the pair of bus bars 110 and 120 may be coupled to the anode current collector 14 and/or the cathode current collector 15 of the redox battery cells 10 over which the bent portions are disposed at the ends of the stack of redox battery cells 10.

In the redox battery described above with respect to FIGS. 11A and 11B, the conductive end plate 140, e.g., a positive conductive end plate, may have a bent portion over one end of the stack of batteries 10, e.g., over the second conductive end plate 120 when present, and the conductive end plate 130, e.g., negative conductive end plate, may have a bent portion over the other end of the stack of batteries 10, e.g., over the first conductive end plate 130 when present. However, embodiments are not so limited. FIGS. 12A and 12B illustrate a side view and a top view of a redox battery comprising a plurality of stacked redox battery cells, according to some other embodiments. The illustrated redox battery 40 according to an embodiment includes a plurality of redox battery cells 10 stacked in a stacking direction, and a pair of conductive end plates 130, 140 disposed at both ends of the stacked redox battery cells 10, in a similar manner as the redox battery 30 described above with respect to FIGS. 11A and 11B. However, unlike the redox battery 30 (FIGS. 11A and 11B), in the illustrated redox battery 40, each of the pair of bus bars 110 and 120 is bent and coupled over the same one of the conductive end plates 130 or 140. In the illustrated embodiment, both the negative bus bar 110 and the positive bus bar 120 are bent over and coupled to the first conductive end plate 130. Further unlike the redox battery the redox battery 30 (FIGS. 11A and 11B), in which the bent portions of the negative and positive bus bars 110, 120 substantially cover the surface areas (e.g., >50%) of the respective ones of the conductive end plates 130, 140, in the illustrated redox battery 40, the bent portions of the negative and positive bus bars 110, 120 cover a smaller (e.g., <50%) surface area of the respective one of the conductive end plate 130 or 140.

FIG. 13 illustrates a top view of an energy storage device comprising a plurality of redox batteries, according to some embodiments. The energy storage device 400 includes first and second redox batteries 100, 200 each comprising a plurality of redox battery cells 10 that are stacked in a respective stacking direction and configured in a manner similar to, e.g., without limitation, the redox battery described above with respect to FIGS. 11A and 11B. The first and second redox batteries 100, 200 are stacked in a direction orthogonal to the stacking direction and may contact each other. The energy storage device 400 additionally includes a common bus bar 150 that electrically and physically connects the plurality of the redox battery cells 10 of the first and second redox batteries 100 and 200. The first redox battery 100 includes a plurality of redox battery cells 10 stacked in a first stacking direction and the positive bus bar 120 electrically connects the cathode current collectors 15 of the redox battery cells 10 to each other. The second redox battery 200 includes a plurality of redox battery cells 10 stacked in a second stacking direction opposite to the first stacking direction, and the negative bus bar 110 electrically connects the anode current collectors 14 of the redox battery cells 10 to each other. Because the redox battery cells 10 of the first and second redox batteries 100, 200 are arranged in opposite redox battery stacking directions, when viewed in the stacking direction as shown in FIG. 13, front views of the first redox battery 100 and the second redox battery 200 show the positive bus bar 120 over the conductive end plate 130 and the negative bus bar 110 over the conductive end plate 140, respectively. The common bus bar 150 connects the first redox battery 100 and the second redox battery 200 physically and electrically in series. The common bus bar 150 is connected to one of the conductive end plates 130 and 140 of the first redox battery 100, and further connected to one the conductive end plates 130 and 140 of the second redox battery 200, thereby physically connecting the first redox battery 100 and the second redox battery 200.

FIG. 14 illustrates a top view of an energy storage device comprising a plurality of redox batteries, according to some embodiments. The energy storage device 500 comprises first to fourth redox batteries 100, 200, 300, 400 each comprising a plurality of redox battery cells 10 that are stacked in a respective stacked direction and configured in a manner similar to, e.g., without limitation, the redox battery described above with respect to FIGS. 11A and 11B. The first to fourth redox batteries 100, 200, 300, 400 are stacked in a direction orthogonal to the stacking direction. The redox battery cells 10 of the first and third redox batteries 100, 300 are stacked in a first battery stacking directions while the redox battery cells 10 of the second and fourth redox batteries 200, 400 are stacked in a second battery stacking direction opposite to the first stacking direction. Because of the alternating battery cell stacking directions, when viewed in the stacking direction as shown in FIG. 14, front views of first to fourth redox batteries 100, 200, 300, 400 show alternating positive and negative bus bars 120, 110. The energy storage device 500 additionally includes a common bus bar 150 that electrically and physically connects the plurality of the redox battery cells 10 of adjacent redox batteries, e.g., first and second redox batteries 100, 200, and third and fourth redox batteries 300, 400. The energy storage device 500 further includes a connection bus bar 160 connecting the positive and negative bus bars 110, 120 of adjacent redox batteries, e.g., second and third redox batteries 200, 300. In the illustrated arrangement, the connection bus bar 160 electrically connects the redox batteries 200 and 300, which are not connected to the common bus bar 150. The first redox battery 100 and the second redox battery 200 are connected by a common bus bar 150, and the third redox battery 300 and the fourth redox battery 400 are connected to the common bus bar 150. The connection bus bar 160 connects the second redox battery 200 and the third redox battery 300, which are not connected by the common bus bar 150 in series. The connection bus bar 160 is electrically connected to the negative bus bar 110 of the second redox battery 200 and the positive bus bar 120 of the third redox battery 300. The connection bus bar 160 is connected to a portion of the negative bus bar 110 disposed on the second conductive end plate 140 of the second redox battery 200. Similarly, the connection bus bar 160 is connected to a portion of the positive bus bar 120 disposed on the first conductive end plate 130 of the third redox battery 300.

FIG. 15A illustrates a side view of a storage device comprising a plurality of redox batteries, according to some embodiments. FIG. 15B illustrates a top and bottom view of the storage device illustrated in FIG. 15A. Analogously to the energy storage device described above with respect to FIG. 13, the energy storage device 600 includes first and second redox batteries 100, 200 each comprising a plurality of redox battery cells 10 that are stacked in a respective stacking direction and configured in a manner similar to, e.g., without limitation, the redox battery described above with respect to FIGS. 11A and 11B. The first and second redox batteries 100, 200 are stacked in a direction orthogonal to the stacking direction and may contact each other. However, unlike the energy storage device described above with respect to FIG. 13 in which the bus bars 120, 110 extending over the sidewalls adjacent redox batteries 100, 200 do not face each other, in the storage device 600, the negative bus bar 110 extending over the a sidewall of the first redox battery 100 is arranged to face the negative bus bar 110 extending over a sidewall of the adjacently disposed second redox battery 200. In the illustrated embodiment, the negative bus bar 110 along a sidewall of the first redox battery 100 is in contact with the positive bus bar 120 along a sidewall of the second redox battery 200, such that the first redox battery 100 and the second redox battery 200 are electrically connected in series. In addition, the negative bus bar 110 and the positive bus bar 120 contacting each other can further be electrically connected by the connection bus bar 160 at rear ends of the first and second redox batteries 100, 200. In addition, the negative bus bar 110 and the positive bus bar 120 over opposite non-contacting sidewalls of the first and second redox batteries 100, 200, respectively, can further be configured to be electrically connected to further redox batteries (not shown) by the connection bus bars 160 extending away from the first and second redox batteries 100, 200 at front ends of the first and second redox batteries 100, 200.

FIG. 16 illustrates side views of an energy storage device comprising a plurality of redox batteries, according to some embodiments. The energy storage device 700 comprises first, second and third redox batteries 100, 200, 300 each comprising a plurality of redox battery cells 10 that are stacked in a respective stacking direction and configured in a manner similar to, e.g., without limitation, the redox battery described above with respect to FIGS. 11A and 11B. The energy storage device 700 additionally comprises a common bus bar 150 configured to electrically and physically connect the redox battery cells 10 of the redox batteries 100 and 200 and configured to be bent 180 degrees at any portion thereof. The common bus bar 150 is electrically connected to anode current collectors 14 of the battery cells 10 of the first redox battery 100, and further electrically connected to cathode current collectors 15 of the redox battery cells 10 of the second redox battery 200. The common bus bar 150 is configured to be bent by 180 degrees and folded onto itself, such that the common bus bar 150 extending over the sidewalls of the first and second redox batteries 10, 200 contact each other, in a similar manner as described above with respect to FIGS. 15A and 15B, thereby electrically connecting the first and second redox batteries 100 and 200 in series. As configured, the common bus bar 150 is not connected to the conductive end plates 130 and 140 of the first and second redox batteries 100, 200. The energy storage device 700 further comprises a connection bus bar 160 electrically connecting the redox batteries 200 and 300, which are not connected to the common bus bar 150.

FIGS. 17A and 17B illustrate top views of two different states of an energy storage device comprising a plurality of redox batteries, according to some embodiments. The energy storage device 800 comprises first, second and third redox batteries 100, 200, 300 each comprising a plurality of redox battery cells 10 that are stacked in a respective stacking direction and configured in a manner similar to, e.g., without limitation, the redox battery described above with respect to FIGS. 11A and 11B. The energy storage device 800 additionally comprises a common bus bar 150 configured to electrically and physically connect the redox battery cells 10 of the first and second redox batteries 100 and 200. The energy storage device 800 comprises a reconfigurable connection bus bar 160 that can alternatingly electrically connect the first and second redox batteries 100 and 200 connected by the common bus bar 150 (FIG. 17B), or the second and third redox batteries 200 and 300 (FIG. 17A) that are not connected to the common bus bar 150. According to embodiments, the connection bus bar 160 is configured to be toggled between the two illustrated positions using a suitable switching or reconfiguration mechanism. In some embodiments, the connection bus bar 160 is configured to be physically detached from the second and third redox batteries 200 and 300 that are not connected to the common bus bar 150, and subsequently physically attached to the first and second batteries 100, 200 that are connected to the common bus bar 150. In some other embodiments, the connecting bus bar 160 may be configured to rotate about one of the ends thereof serving as a pivot. In yet some other embodiments, the connecting bus bar 160 may linearly slide from one position to the other. The connection bus bar 160 is configured to electrically connect the redox batteries 100 and 200, which are connected to the common bus bar 150, to short-circuit and discharge the redox batteries 100 and 200. Advantageously, after the first and second redox batteries 100 and 200 are short-circuited and discharged by the connection bus bar 160, a user can safely remove one or both of the first and second redox batteries 100, 200, e.g., for replacement or maintenance of the energy storage device 800. In some embodiments as described above, the positive and negative electrolyte reservoirs of the redox battery cell 10 may contain the same electrolyte, and the connection bus bar 160 may electrically short circuit the anode 12 and the cathode 13 reliably and safely. In a similar manner as described above, the connection bus bar 160 may serve as a handle when removing the first and second redox batteries 100 and 200.

FIGS. 18A and FIGS. 18B and 18C illustrate top views of energy storage devices comprising a plurality of redox batteries, according to some embodiments. The energy storage devices 900A (FIG. 18A) and 900B (FIGS. 18B, 18C) comprise first and second redox batteries 100, 200 each comprising a plurality of redox battery cells 10 that are stacked in a respective stacking direction and configured in a manner similar to, e.g., without limitation, the redox battery described above with respect to FIGS. 12A and 12B. The redox battery cells of the first and second redox batteries 100, 200 are stacked in the same stacking direction, such that the front surfaces of both of the first and second redox batteries 100, 200 have the same arrangement. Unlike the redox batteries of the energy storage devices described above with respect to FIGS. 14-17B, each of the first and second redox batteries 100, 200 of the energy storage devices 900A, 900B comprises portions of both the positive and negative bus bars 120, 110 over a front surface thereof. Each of the energy storage devices 900A, 900B comprises a reconfigurable connecting bus bar 160 disposed over the conductive end plates 130 and 140 to which a pair of bus bars 110 and 120 are coupled, to electrically connect the first and second redox batteries 100 and 200 that are adjacent to each other. The arrangement direction and the switching or reconfiguration mechanism of the connection bus bars 160 may vary depending on the lateral stacking arrangement of the redox batteries 100 and 200, as described below.

Referring to FIG. 18A, the first and second redox batteries 100, 200 of the energy storage device 900A are laterally stacked such that the negative bus bars 110 and the positive bus bars 120 are linearly arranged in the lateral stacking direction of the first and second redox batteries 100, 200. Both the negative bus bar 110 and the positive bus bar 120 are bent over and coupled to the first conductive end plate 130, and the connecting bus bar 160 is disposed over the first conductive end plate 130 to electrically connect the negative bus bar 110 of the first redox battery 100 and the positive bus bar 120 of the second redox battery 200. Because the resulting portion of the negative bus bar 110 of the first redox battery 100 and the portion of the positive bus bar 120 of the second redox battery 200 are disposed diagonally, the connecting bus bar 160 extends diagonally.

Referring to FIG. 18B, the first and second redox batteries 100, 200 of the energy storage device 900B are laterally stacked such that the negative bus bars 110 and the positive bus bars 120 are alternatingly arranged in the lateral stacking direction of the first and second redox batteries 100, 200. As described with respect to FIGS. 12A and 12B, The illustrated energy storage device 900B comprises a reconfigurable connection bus bar 160 that is arranged horizontally and analogous to that described above with respect to FIGS. 17A and 17B. As illustrated, the connection bus bar 160 is configured to move between a state in which the connection bus bar 160 electrically connects the negative and positive bus bars 110 and 120 of the same redox battery 100 and a state in which the connection bus bar 160 electrically connects a negative bus bar 110 of the second redox battery 200 to a positive bus bar 120 of the first redox battery 100. In a similar manner as described above with respect to FIGS. 17A and 17B, the connection bus bar 160 may be reconfigured or switched using a suitable mechanism, and may be detachable, rotatable or slidable. When the connection bus bar 160 electrically connects the negative and positive bus bars 110 and 120 of the first redox battery 100, the first redox battery may be short-circuited. As described above with respect to FIGS. 17A and 17B, after the first and second redox batteries 100 and 200 are short-circuited and discharged by the connection bus bar 160, a user can safely remove one or both of the first and second redox batteries 100, 200, e.g., for replacement or maintenance of the energy storage device 900B. Furthermore, the connection bus bar 160 may serve as a handle when removing the first and second redox batteries 100 and 200.

FIGS. 19A and 19B illustrate top views of energy storage devices comprising a one or more rows of redox batteries, according to some embodiments. The energy storage device 1000 comprises a plurality of first redox batteries 100a and a plurality of second redox batteries 100b each comprising a plurality of redox battery cells 10 that are stacked in a respective stacking direction and configured in a manner similar to, e.g., without limitation, the redox battery described above with respect to FIGS. 11A and 11B. The plurality of first redox batteries 100a are arranged in a first row extending in a row extension direction, and the plurality of second redox batteries 100b are arranged in the same row extension direction as the first redox batteries 100a. The row direction is orthogonal to the stacking direction of the redox battery cells 10. A plurality of bus bars 160 electrically connects pairs of the first redox batteries 100a and/or the second redox batteries 100b. The connection bus bars 160 connecting the same ones of the first redox batteries 100a or the second redox batteries 100b are arranged in a direction parallel to the row extension direction of the first redox batteries 100a or the second redox batteries 100b, or orthogonal to the connection direction between the first and second redox batteries 100a and 100b. Referring to FIG. 19A, in some arrangements, the first redox batteries 100a of the first row and the second redox batteries 100b of the second row are positioned in corresponding horizontal positions. In this arrangement, the connection bus bar 160 at the end connecting the last one of the first redox batteries 100a and the last one of the second redox batteries 100b extends in a direction orthogonal to the row extension direction. Referring to FIG. 19B, in some other arrangements, the first redox batteries 100a of the first row and the second redox batteries 100b of the second row are positioned in horizontally offset positions. In this arrangement, the connection bus bar 160 at the end connecting the last one of the first redox batteries 100a and the last one of the second redox batteries 100b extends in a slanted direction relative to a direction orthogonal to the row extension direction.

Still referring to FIGS. 19A and 19B, the energy storage device 1000 may further include a supporter 210 disposed between the plurality of first redox batteries 100a and the second redox batteries 100b. The supporter 210 may be made of an insulating material to insulate the first redox batteries 100a from the second redox batteries modules 100b. The supporter 210 guides the arrangement of the first redox batteries 100a and the second redox batteries 100b. The supporter 210 serves as guide when some of the first redox batteries 100a and/or the second redox batteries 100b are removed or inserted. The connection bus bar 160 may cross the supporter 210 as shown.

FIG. 20 illustrates a top view of an energy storage device comprising one or more rows of redox batteries, according to some embodiments. The energy storage device 1200 comprises a plurality of redox batteries 100, 200, 300, 400, 500 each comprising a plurality of redox battery cells 10 that are stacked in a respective stacking direction and configured in a manner similar to, e.g., without limitation, the redox battery described above with respect to FIGS. 11A and 11B. The redox batteries 100, 200, 300, 400, 500 are arranged in a row extending in a row extension direction. The row direction is orthogonal to the stacking direction of the redox battery cells 10. The energy storage device 1200 comprises a plurality of connection bus bars 160a, 160b. In a manner similar to that described above with respect to FIG. 19, the connection bus bars 160a, 160b electrically connect pairs of the redox batteries 200, 300 and 400, 500. The energy storage device 1200 additionally includes a short-circuit bus bar 170 electrically connecting the plurality of connection bus bars 160a and 160b. The short-circuit bus bar 170 electrically connects the connection bus bars 160a and 160b connected to the redox batteries 300 and 400 connected by the common bus bar 150. The shorting bus bar 170 electrically short-circuits the redox batteries 200, 300, 400, 500 that are electrically connected by the connection bus bars 160a and 160b. In this embodiment, the first connection bus bar 160a electrically connects the second and third redox batteries 200, 300 in series, and the second connection bus bar 160b electrically connects the fourth and fifth redox batteries 400, 500 in series. The short-circuit bus bar 170 electrically connects the first connection bus bar 160a and the second connection bus bar 160b to short-circuit the third and fourth redox batteries 300, 400. Advantageously, when a failure occurs in any one of the third and fourth batteries 300, 400, they can be short-circuited using the short-circuiting bus bar 170 without interrupting the operation of the energy storage device 1200. While short-circuiting some redox batteries using the short-circuiting bus bar 170 may reduce the overall performance of the energy storage device 1200, it may nevertheless be advantageous to continue to the operation thereof without complete interruption. In some implementations, the shorted third and fourth batteries 300, 400 may serve as resistors to generate heat, where the generated heat may be used for thermal management of the redox batteries.

FIG. 21 illustrates a top view of an energy storage device comprising one or more rows of redox batteries, according to some embodiments. The energy storage device 1300 comprises a plurality of redox batteries 100, 200, 300, 400, 500 each comprising a plurality of redox battery cells 10 that are stacked in a respective stacking direction and configured in a manner similar to, e.g., without limitation, the redox battery described above with respect to FIGS. 11A and 11B. The redox batteries 100, 200, 300, 400, 500 are arranged in a row extending in a row extension direction. The row direction is orthogonal to the stacking direction of the redox battery cells 10. The energy storage device 1300 comprises a plurality of connection bus bars 160a, 160b. In a manner similar to that described above with respect to FIG. 19, the connection bus bars 160a, 160b electrically connect pairs of the redox batteries 200, 300 and 400, 500. The energy storage device 1300 additionally comprises a short-circuit bus bar 170 connected to the connection bus bars 160a and 160b. The short-circuit bus bar 170 may be controlled by, e.g., a battery management system 1100, to electrically connect the connection bus bars 160a and 160b. The short-circuit bus bar 170 includes a bus bar body 171 connected to a plurality of connection bus bars 160, a bus bar switch 172 for controlling current flow through the bus bar body 171, and a bus bar resistor 173 for adjusting the amount of current flow through the bus bar body 171. At least a portion of the bus bar body 171 is formed of a conductor to electrically connect the plurality of connection bus bars 160 when the bus bar switch 172 is short-circuited (ON). The bus bar switch 172 is configured to be controlled by the battery management system 1100 for controlling the energy storage device 1300 to short-circuit (ON) or open (OFF) the bus bar body 171. The bus bar resistor 173 is configured to adjust the amount of current flowing through the bus bar body 171, such that a too large of current is prevented from flowing when the bus bar switch 172 is short-circuited (ON). Heat generated from the bus bar resistor 173 may be used for thermal management of at least one of the plurality of redox batteries 100, 200, 300, 400, 500. According to an embodiment, the short-circuited bus bar 170 may include a plurality of bus bar switches 172 and a plurality of bus bar resistors 173 to adjust the amount of current and the amount of heat in stages.

FIG. 22 illustrates a top view of an energy storage device comprising one or more rows of redox batteries, according to some embodiments. The energy storage device 1400 comprises a plurality of redox batteries 100, 200, 300, 400, 500 each comprising a plurality of redox battery cells 10 that are stacked in a respective stacking direction and configured in a manner similar to, e.g., without limitation, the redox battery described above with respect to FIGS. 12A and 12B. The redox batteries 100, 200, 300, 400, 500 are arranged in a row extending in a row extension direction. The row direction is orthogonal to the stacking direction of the redox battery cells 10. Unlike the redox batteries of the energy storage devices described above with respect to FIGS. 19A-21, each of the redox batteries 100, 200, 300, 400, 500 of the energy storage device 1400 comprises portions of both the positive and negative bus bars 120, 110 over a front surface thereof. The energy storage device 1400 additionally comprises connection bus bars 160 connecting a negative bus bar 110 of one of the redox batteries, e.g., the redox battery 100, to a positive bus bar 120 of an adjacent one of the redox batteries, e.g., the redox battery 200. The energy storage device 1400 additionally comprises a short-circuited bus bar 170 connected to the pair of bus bars 110 and 120 of each of the redox batteries. The short-circuited bus bar 170 includes a bus bar body 171 connected to a pair of bus bars 110 and 120, a bus bar switch 172 for controlling current flow through the bus bar body 171, and a bus bar resistor 173 for controlling the amount of current flow through the bar body 171.

Example Embodiments

1. A redox battery comprising:
   a plurality of redox battery cells stacked in a stacking direction, wherein each of the redox battery cells comprises a first half cell contacting a positive current collector, a second half cell contacting a negative current collector and an ion exchange membrane separating the first and second half cells;
   a positive conducting bus bar extending in the stacking direction and electrically connecting the positive current collectors of the redox battery cells in parallel; and
   a negative conducting bus bar extending in the stacking direction and electrically connecting the negative current collectors of the redox battery cells in parallel,
   wherein one or both of the positive and negative bus bars are configured as fastening means for mechanically fastening the stacked redox battery cells in the stacking direction.

2. The redox battery of Embodiment 1, wherein one or both of the positive and negative bus bars exert a compressive force exceeding about 1,000N along the stacking direction.

3. The redox battery of one of Embodiments 1-2, wherein a separate fastener providing a compressive force without providing electrical connectivity is omitted.

4. The redox battery of any one of the above Embodiments, wherein positive and negative bus bars are disposed on opposing sides of the stack of redox battery cells.

5. The redox battery of any one of the above Embodiments, wherein positive and negative bus bars are disposed on adjacent sides of the stack of redox battery cells that share an edge.

6. The redox battery of any one of the above Embodiments, wherein the fastening means comprise a fastening strip forming a loop around the redox battery along the stacking direction.

7. The redox battery of any one of the above Embodiments, wherein the loop is formed around opposing side surfaces and outer major surfaces of the first and second end plates.

8. The redox battery of any one of the above Embodiments, further comprising a first end plate and a second end plate disposed at opposing ends of the stacked redox battery cells, wherein both of the positive and negative bus bars form loop, wherein the positive and negative bus bars cross each other over outer major surfaces of the first and second end plates.

9. The redox battery of any one of the above Embodiments, further comprising a first end plate and a second end plate disposed at opposing ends of the stacked redox battery cells, wherein the loop is formed around adjacent side surfaces and corners of outer major surfaces of the first and second end plates.

10. A redox battery comprising:
    a plurality of redox battery cells stacked in a stacking direction, wherein each of the redox battery cells comprises a first half cell contacting a positive current collector, a second half cell contacting a negative current collector and an ion exchange membrane separating the first and second half cells;
    a positive conducting bus bar extending in the stacking direction and electrically connecting the positive current collectors of the redox battery cells in parallel;
    a negative conducting bus bar extending in the stacking direction and electrically connecting the negative current collectors of the redox battery cells in parallel; and
    a first end plate and a second end plate disposed at opposing ends of the stacked redox battery cells,
    wherein the first end plate is electrically conductive and connected to the positive conducting bus bar, and wherein the second end plate is electrically conductive and connected to the negative conducting bus bar.

11. The redox battery of Embodiment 10, wherein one or both of the positive and negative bus bars exert a compressive force exceeding about 1,000N along the stacking direction.

12. The redox battery of one of Embodiments 10-11, wherein a separate fastener providing a compressive force without providing electrical connectivity is omitted.

13. The redox battery of any one of Embodiments 10-12, wherein the positive conducting bus bar is mechanically fixed to both first and second end plates, thereby serving as fastening means for mechanically fastening the stacked redox battery cells in the stacking direction, while being electrically connected only to the first end plate.

14. The redox battery of any one of Embodiments 10-13, wherein the negative conducting bus bar is mechanically fixed to both first and second end plates, thereby serving as fastening means for mechanically fastening the stacked redox battery cells in the stacking direction, while being electrically connected only to the second end plate.

15. The redox battery of any one of Embodiments 10-14, wherein the positive and negative conducting bus bars are mechanically fixed to both first and second end plates using one or more mechanical coupling means selected from an L-shaped brace, a screw, a pin, a bolt, an adhesive, a weld, a sawtooth-shaped anchor and the like.

16. The redox battery of any one of Embodiments 10-15, wherein an insulating layer is interposed between the stack of redox battery cells and one or both of first and second end plates, 17. The redox battery of any one of Embodiments 10-16, wherein the negative and positive conducting bus bars are disposed on opposing sides of the stack of redox battery cells.

18. The redox battery of any one of Embodiments 10-17, wherein a pair of negative conducting bus bars are disposed on a pair of opposing sides of the stack of redox battery cells, and wherein a pair of positive conducting bus bars are disposed on another pair of opposing sides of the stack of redox battery cells.

19. The redox battery of any one of Embodiments 10-11 and 13-18, further comprising a tie band forming a loop around the stack of redox battery cells.

20. A redox battery comprising a plurality of battery cell stacks each comprising the plurality of redox battery cells arranged according to any one of Embodiments 10-19, wherein the battery cells stacks are stacked in the stacking direction.

21. The redox battery of Embodiment 20, wherein immediately adjacent ones of the battery stacks are vertically stacked and electrically coupled though respective ones of end plates having opposite polarities.

22. A redox battery comprising a plurality of battery stacks arranged laterally adjacent to each other, wherein each battery stack comprises a plurality of battery cell stacks arranged according to any one of Embodiments 20-22.

23. A redox battery comprising:
   a plurality of redox battery cells stacked in a stacking direction, wherein each of the redox battery cells comprises a first half cell contacting a positive current collector, a second half cell contacting a negative current collector and an ion exchange membrane separating the first and second half cells;
   a positive conducting bus bar extending in the stacking direction and electrically connecting the positive current collectors of the redox battery cells in parallel;
   a negative conducting bus bar extending in the stacking direction and electrically connecting the negative current collectors of the redox battery cells in parallel;

a first end plate and a second end plate disposed at opposing ends of the stacked redox battery cells, wherein the first and second end plates are electrically conductive and connected to the positive conducting bus bar; and
   a third end plate and a fourth end plate disposed at opposing ends of the stacked redox battery cells, wherein the third and fourth end plates are electrically conductive and connected to the negative conducting bus bar.

24. The redox battery of Embodiment 23, wherein one or both of the positive and negative bus bars exert a compressive force exceeding about 1,000N along the stacking direction.

25. The redox battery of one of Embodiments 23-24, wherein a separate fastener providing a compressive force without providing electrical connectivity is omitted.

26. The redox battery of any one of Embodiments 23-25, wherein the first and third end plates are electrically insulated from each other and adjacently disposed on the same end of the stacked redox battery cells.

27. The redox battery of one of Embodiments 23 and 26, wherein the second and fourth end plates are electrically insulated from each other and adjacently disposed on the same end of the stacked redox battery cells.

28. The redox battery of any one of Embodiments 23-27, wherein the positive conducting bus bar is mechanically fixed and electrically connected to both first and second end plates, thereby serving as fastening means for mechanically fastening the stacked redox battery cells in the stacking direction.

29. The redox battery of any one of Embodiments 23-28, wherein the negative conducting bus bar is mechanically fixed and electrically connected to both third and fourth end plates, thereby serving as fastening means for mechanically fastening the stacked redox battery cells in the stacking direction.

30. The redox battery of any one of Embodiments 23-29, wherein the positive and negative conducting bus bars are mechanically fixed to first and second end plates and third and fourth end plates, respectively, using one or more mechanical coupling means selected from an L-shaped brace, a screw, a pin, a bolt, an adhesive, a weld, a sawtooth-shaped anchor and the like.

31. The redox battery of any one of Embodiments 23-24 and 26-30, further comprising a tie band forming a loop around the stack of redox battery cells.

32. A redox battery system, comprising:
   a plurality of redox batteries, wherein each of the redox batteries is in accordance with any of the above Embodiments and comprises:
      a pair of conductive positive end plates disposed at opposing ends of the redox battery cells stacked in a cell stacking direction and electrically connected to the positive conducting bus bar, and
      a pair of conductive negative end plates disposed at opposing ends of the redox battery cells stacked in the cell stacking direction and electrically connected to the negative conducting bus bar,
   wherein one or more subsets of the redox batteries are stacked in at least one other direction orthogonal to the cell stacking direction and electrically connected to each other.

33. The redox battery system of Embodiment 32, wherein one of the pair of conductive positive end plates and one of the pair of conductive negative end plates form a pair of adjacently disposed end plates having opposite polarities that are disposed on the same end of the same redox battery cell stack.

34. The redox battery system of Embodiments 32 or 33, wherein the cell stacking direction is a first horizontal direction and a first subset of redox batteries are stacked in a vertical direction.

35. The redox battery system of Embodiment 34, wherein the first subset of redox batteries are stacked in the vertical direction such that the conductive positive end plates and the conductive negative end plates of the first subset of redox batteries alternate in the vertical direction.

36. The redox battery system of Embodiment 35, wherein the first subset of redox batteries are electrically connected in series.

37. The redox battery system of Embodiment 35, wherein adjacent ones of the first subset of redox batteries are directly electrically connected by adjacent ones of the conductive positive end plate and the negative end plate that physically contact each other.

38. The redox battery system of any of Embodiments 32-37, wherein the cell stacking direction is a first horizontal direction and a second subset of redox batteries are stacked in a second horizontal direction.

39. The redox battery system of any of Embodiments 32-38, wherein the second subset of redox batteries are stacked in the second horizontal direction such that the conductive positive end plates of the second subset are adjacently arranged in the second horizontal direction and the conductive negative end plates pf the second subset are adjacently arranged in the second horizontal direction.

40. The redox battery system of Embodiment 39, wherein the second subset of redox batteries are electrically connected in parallel.

41. The redox battery system of Embodiment 40, wherein adjacent ones of the second subset of redox batteries are directly electrically connected by adjacent ones of the conductive positive end plates that physically contact each other and/or by adjacent ones of the conductive positive end plates that physically contact each other, 42. The redox battery system of any of Embodiments 32-41, wherein the plurality of redox batteries are vertically stacked in a vertical direction and horizontally stacked in a second horizontal direction such that when viewed in the cell stacking direction, the plurality of redox batteries form an array comprising a plurality of rows of redox batteries extending in the second horizontal direction and a plurality of columns of redox batteries extending in the vertical direction.

43. The redox battery system of Embodiment 42, wherein vertically adjacent ones of the rows of redox batteries are horizontally offset in the second horizontal direction by a fraction of a length of a pair of oppositely charged end plates of the redox batteries.

44. The redox battery system of Embodiments 42 or 43, wherein horizontally adjacent columns of redox batteries are in direct contact with each other.

45. The redox battery system of Embodiments 42-44, wherein vertically adjacent rows of redox batteries are in direct contact with each other.

46. The redox battery system of Embodiments 42 or 43, wherein vertically adjacent rows of redox batteries are in physically separated from each other.

47. The redox battery system of Embodiment 46, wherein the redox batteries of each row are electrically connected to each other through a conductive plate contacting each of the conductive positive end plates or each of the conductive negative end plates.

48. The redox battery system of any of Embodiments 32-47, wherein vertically adjacent ones of the redox batteries are physically coupled by a slot formed on one of the conductive positive and negative end plates of one of the adjacent ones, and a rail formed on the other of the positive and negative conductive negative end plates formed on the other of the adjacent ones.

49. The redox battery system of Embodiment 48, wherein the rail is configured to slide into the slot in the cell stacking direction, wherein the rail and slot have vertical dimensions such that the vertically adjacent ones of the redox batteries are prevented from substantially sliding relative to one another in the second horizontal direction.

50. The redox battery system of Embodiments 48 and 49, wherein one of the rail and the slot serves as one of the positive and negative conducting bus bars of one of the adjacent ones of the redox batteries, and the other of the rail and the slot serves as the other of the positive and negative conducting bus bars of the other of the adjacent ones of the redox batteries.

51. A redox battery system, comprising:
a plurality of redox batteries, wherein each of the redox batteries is in accordance with any of the above Embodiments and comprises one or more conductive positive end plates and one or more conductive negative end plates; and
a conductive shorting structure configured to form an electrical short between structures connected by a first end and a second end thereof, wherein the first end is configured to be removably fixed and electrically connected to one of the conductive positive end plates or the conductive negative end plates of the plurality of redox batteries, and wherein the second end is configured to be removably fixed and electrically connected to another one of the conductive positive end plates or the conductive negative end plates of the plurality of redox batteries.

52. The redox battery system of Embodiment 51, wherein each of the redox batteries comprises:
a pair of conductive positive end plates disposed at opposing ends of the redox battery cells stacked in a cell stacking direction and electrically connected to the positive conducting bus bar; and
a pair of conductive negative end plates disposed at opposing ends of the redox battery cells stacked in the cell stacking direction and electrically connected to the negative conducting bus bar.

53. The redox battery system of Embodiments 51 or 52, wherein the conductive shorting structure is configured to form the electrical short between conductive positive and/or negative end plates formed on the same side of the redox batteries.

54. The redox battery system of any one of Embodiments 51-53, wherein one of the pair of conductive positive end plates and one of the pair of conductive negative end plates form a pair of adjacently disposed end plates having opposite polarities that are disposed on the same end of the same redox battery cell stack, and the conductive shorting structure is configured to form the electrical short between the pair of adjacently disposed end plates.

55. The redox battery system of any of Embodiments 51-54, wherein a first subset of redox batteries are stacked in a vertical direction such that the conductive positive end plates and the conductive negative end plates of the first subset of redox batteries alternate in the vertical direction, and wherein the conductive shorting structure is configured to form the electrical short between a conductive positive end plate and a conductive negative end plate of vertically adjacent ones of the redox batteries.

56. The redox battery system of any of Embodiments 51-54, wherein a second subset of redox batteries are stacked in a second horizontal direction such that the conductive positive end plates of the second subset are adjacently arranged in the second horizontal direction, and wherein the conductive shorting structure is configured to form the electrical short between the conductive positive end plates of horizontally adjacent ones of the redox batteries.

57. The redox battery system of any of Embodiments 51-54, wherein a second subset of redox batteries are stacked in a second horizontal direction such that the conductive negative end plates of the second subset are adjacently arranged in the second horizontal direction, and wherein the conductive shorting structure is configured to form the electrical short between the conductive negative end plates of horizontally adjacent ones of the redox batteries.

58. The redox battery system of any of Embodiments 51-57, wherein the conductive shorting structure has a U shape.

59. The redox battery system of any of Embodiments 51-58, wherein the conductive positive and/or negative end plates electrically shorted by the conductive shorting structure has formed thereon an opening configured to receive one of the first and second ends of the conductive shorting structure.

60. The redox battery system of any of Embodiments 51-59, wherein the conductive shorting structure serves as handle for removing a redox battery from the redox battery system.

61. A redox battery comprising:
a plurality of redox battery cells stacked in a stacking direction, wherein each of the redox battery cells comprises a first half cell connected to a positive current collector, a second half cell connected to a negative current collector and an ion exchange membrane separating the first and second half cells;
a positive conducting bus bar extending in the stacking direction and electrically connecting the positive current collectors of the redox battery cells in parallel; and
a negative conducting bus bar extending in the stacking direction and electrically connecting the negative current collectors of the redox battery cells in parallel,
wherein an end portion of the positive conducting bus bar is bent and disposed at an end of the stack of redox battery cells, and
wherein an end portion of the negative conducting bus bar is bent and disposed at the end or another end of the stack of redox battery cells.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A redox battery comprising:
a plurality of redox battery cells stacked in a stacking direction, wherein each of the redox battery cells comprises a first half cell connected to a positive current collector, a second half cell connected to a negative current collector and an ion exchange membrane separating the first and second half cells;
a positive conducting bus bar extending in the stacking direction and electrically connecting the positive current collectors of the redox battery cells in parallel;
a negative conducting bus bar extending in the stacking direction and electrically connecting the negative current collectors of the redox battery cells in parallel;
a first positive end plate and a second positive end plate disposed at opposing ends of the stacked redox battery cells, wherein the first and second positive end plates are connected to the positive conducting bus bar; and a first negative end plate and a second negative end plate disposed at opposing ends of the stacked redox battery cells, wherein the first and second negative end plates are connected to the negative conducting bus bar.

2. The redox battery of claim 1, wherein the first and second positive end plates are electrically conductive to the positive conducting bus bar, and wherein the first and second negative end plates are electrically conductive to the negative conducting bus bar.

3. The redox battery of claim 1, wherein the first positive and first negative end plates are electrically insulated from each other and adjacently disposed on a same end of the stacked redox battery cells.

4. The redox battery of claim 1, wherein the second positive and second negative end plates are electrically insulated from each other and adjacently disposed on a same end of the stacked redox battery cells.

5. The redox battery of claim 1, wherein the positive conducting bus bar is mechanically fixed to both first positive and second positive end plates.

6. The redox battery of claim 1, wherein the negative conducting bus bar is mechanically fixed to both first negative and second negative end plates.

7. The redox battery of claim 1, wherein the positive and negative conducting bus bars are mechanically fixed to first positive and second positive end plates and first negative and second negative end plates, respectively, using one or more mechanical coupling structures.

8. The redox battery of claim 1, further comprising a tie band forming a loop around the stack of redox battery cells.

9. The redox battery of claim 1, wherein an insulating layer is interposed between the stack of redox battery cells and one or both of positive and negative end plates.

10. The redox battery of claim 1, wherein the first positive end plate and the first negative end plate form a pair of adjacently disposed end plates having opposite polarities that are disposed on a same end of a same redox battery cell stack.

11. The redox battery of claim 1, further comprising:

a second positive conducting bus bar extending in the stacking direction and electrically connecting the positive current collectors of the redox battery cells in parallel; and a second negative conducting bus bar extending in the stacking direction and electrically connecting the negative current collectors of the redox battery cells in parallel.

12. The redox battery of claim 11, wherein the positive and negative conducting bus bars are disposed on an opposing side of the stack of redox battery cells to the second positive bus bar and the second negative conducting bus bar, respectively.

13. The redox battery of claim 1, wherein one or both of the positive and negative conducting bus bars serve as a fastener to compress the redox battery cells stacked along the stacking direction.

14. The redox battery of claim 13, wherein the redox battery does not include an additional fastener providing a further compressive force compressing the stacked redox battery cells along the stacking direction.

15. The redox battery of claim 1, further comprising an fastener forming a loop around the stacked redox battery cells and the first and second positive and negative end plates.

* * * * *